US006682578B2

(12) United States Patent
Sower

(10) Patent No.: US 6,682,578 B2
(45) Date of Patent: *Jan. 27, 2004

(54) METHODS FOR PRODUCING FERTILIZERS AND FEED SUPPLEMENTS FROM AGRICULTURAL AND INDUSTRIAL WASTES

(75) Inventor: Larry P. Sower, Albany, MO (US)

(73) Assignee: Crystal Peak Technologies, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/236,525

(22) Filed: Sep. 6, 2002

(65) Prior Publication Data

US 2003/0084693 A1 May 8, 2003

Related U.S. Application Data

(63) Continuation of application No. 10/139,827, filed on May 7, 2002, which is a continuation of application No. 09/235,461, filed on Jan. 22, 1999, now Pat. No. 6,409,788.
(60) Provisional application No. 60/072,372, filed on Jan. 23, 1998.

(51) Int. Cl.[7] ............................... C01F 1/00; C01F 3/00
(52) U.S. Cl. ..................... 71/11; 71/12; 71/14; 71/15; 71/21; 71/23; 71/25; 71/28
(58) Field of Search .................. 71/14, 18, 19, 71/25, 28, 63, 64.05, 21, 11, 12, 15, 23, 64.13

(56) References Cited

U.S. PATENT DOCUMENTS

| | | |
|---|---|---|
| 2,893,957 A | 7/1959 | Genter et al. |
| 3,677,405 A | 7/1972 | Keith, Jr. ..................... 210/71 |

(List continued on next page.)

FOREIGN PATENT DOCUMENTS

| | | |
|---|---|---|
| EP | 0005113 A1 | 10/1979 |
| EP | 0114038 A2 | 7/1984 |
| WO | WO 9728101 A1 * | 8/1997 ............. C05F/3/00 |

OTHER PUBLICATIONS

Liao et al, Chemical Precipitation of Phosphate and Ammonia from Swine Wastewater, Apr. 1993, Bio–Resource Engineering Department, University of British Columbia, Biomass and Bioenergy, vol. 4, No. 5, pp 365–371.*

(List continued on next page.)

*Primary Examiner*—Stanley G. Silverman
*Assistant Examiner*—Maribel Medina
(74) *Attorney, Agent, or Firm*—Workman Nydegger

(57) ABSTRACT

Integrated waste treatment and fertilizer and feed supplement production methods to be implemented at organic waste source sites, at remote treatment sites, or partially at the organic waste source site and at a remote location, whether in small or large scale operations. The methods are suitable for retrofitting existing organic waste sources and for treating the organic waste generated by a single source or by a plurality of sources. These methods provide: Reduction or elimination of emissions of acrid and greenhouse gases; effluents that meet discharge standards and that can be used in wetland and irrigation projects; organic based, granular, slow release NPK fertilizer of standard composition and size that can be supplemented with micronutrients and soil amendment materials and whose composition can be adjusted to meet demands and needs of specific markets; methane-rich biogas recovery for its subsequent use for heating, for power generation or for catalytic and synthetic processes, and feed supplement including feed supplement for cattle. The methods comprise steps for thoroughly separating suspended and dissolved materials, preventing gas emissions and capturing gases, and minimizing waste disposal. Fertilizer base is produced by mixing waste with at least one of a phosphate precipitating agent, a base, a flocculant, and optionally with an ammonia retaining agent and a densifier, subsequently separating and drying the precipitate. Pathogen-free, odor-free and dust-free fertilizer is obtained by temperature controlled incineration.

49 Claims, 19 Drawing Sheets

U.S. PATENT DOCUMENTS

| | | | |
|---|---|---|---|
| 3,773,659 A * | 11/1973 | Carlson et al. | 210/606 |
| 3,892,662 A | 7/1975 | Stout | 210/66 |
| 3,939,280 A | 2/1976 | Karnemaat | 426/2 |
| 3,981,800 A | 9/1976 | Ort | 210/6 |
| 4,128,946 A | 12/1978 | Maffet | 34/12 |
| 4,193,206 A | 3/1980 | Maffet | 34/12 |
| 4,245,396 A | 1/1981 | Maffet | 34/12 |
| 4,262,633 A | 4/1981 | Taboga | 119/1 |
| 4,519,831 A | 5/1985 | Moore | 71/13 |
| 4,642,131 A | 2/1987 | Hoitink | 71/6 |
| 4,710,300 A | 12/1987 | Kristoufek | 210/603 |
| 4,743,287 A | 5/1988 | Robinson | 71/12 |
| 4,765,900 A | 8/1988 | Schwoyer et al. | 210/603 |
| 4,769,149 A * | 9/1988 | Nobilet et al. | 210/603 |
| 4,795,711 A | 1/1989 | Nockemann | 435/316 |
| 4,872,993 A | 10/1989 | Harrison | 210/666 |
| 4,900,348 A | 2/1990 | Hoitink | 71/6 |
| 4,997,469 A | 3/1991 | Moore | 71/11 |
| 5,021,077 A | 6/1991 | Moore | 71/17 |
| 5,021,247 A | 6/1991 | Moore | 426/69 |
| 5,055,124 A | 10/1991 | Nguyen et al. | 71/34 |
| 5,071,559 A | 12/1991 | Bleeker | 210/605 |
| 5,087,474 A | 2/1992 | Moore | 426/646 |
| 5,093,262 A | 3/1992 | Kimura | 435/290 |
| 5,118,336 A | 6/1992 | Biez | 71/6 |
| 5,200,080 A | 4/1993 | Bergman, Jr. et al. | 210/607 |
| 5,266,201 A | 11/1993 | Letourneux et al. | 210/620 |
| 5,378,257 A | 1/1995 | Higashida | 71/12 |
| 5,393,317 A | 2/1995 | Robinson | 71/12 |
| 5,407,809 A | 4/1995 | Finn | 435/41 |
| 5,411,568 A | 5/1995 | Moore | 71/22 |
| 5,422,015 A | 6/1995 | Angell et al. | 210/751 |
| 5,443,613 A | 8/1995 | Robinson | 71/12 |
| 5,482,528 A | 1/1996 | Angell et al. | 71/12 |
| 5,545,326 A | 8/1996 | Petering | 210/605 |
| 5,593,099 A | 1/1997 | Langenecker | 241/46.02 |
| 5,614,107 A | 3/1997 | Mallia, Jr. | 210/771 |
| 5,630,942 A | 5/1997 | Steiner | 210/603 |
| 5,725,772 A | 3/1998 | Shirodkar | 210/622 |
| 5,810,903 A | 9/1998 | Branconnier et al. | 71/9 |
| 5,865,143 A | 2/1999 | Moore, Jr. | 119/442 |
| 5,914,104 A | 6/1999 | Moore, Jr. | 424/76.6 |
| 6,136,185 A | 10/2000 | Sheaffer | 210/153 |
| 6,245,121 B1 * | 6/2001 | Lamy et al. | 71/1 |
| 6,409,788 B1 * | 6/2002 | Sower | 71/11 |
| 6,470,828 B1 * | 10/2002 | Townsend et al. | 119/447 |
| 6,497,741 B2 * | 12/2002 | Sower | 71/11 |

OTHER PUBLICATIONS

Sauchelli, Conversion of Ammonia to Fertilizer Materials, Chemistry and Technology of Fertilizrs, pp. 33–34, 1960.*

Changing World Technoligies, Inc., The TDP Process and How It Compares to Pyrolysis and Gasification, Technical Bulletin 101, No date available.

Brionne, E. et al., Nutrient Removal From Wastewaters, Non–Destructive Technique for Elimination of Nutrients From Pig Manure, pp. 33–37, 1994.

Fischer, J.R. et al., Energy, Argiculture and Waste Management, Anaerobic Digestion in Swine Wastes, pp. 307–353, 1975.

Hanna, M. et al, Agricultural Waste Management Utilization and Management, Chemical Coagulation of Methane Producing Solids From Flushing Wastewaters, pp. 632–637, Dec. 16–17, 1985.

Sievers, D.M., Biological Wastes, Rapid Mixing Influences on Chemical Coagulation of Manures, vol. 28, pp. 103–114, 1989.

Webb, K. M., et al.,Sci. Tech, Struvite ($MgNH_4 PO_4 6H_2O$) Solubility and Its Application to a Piggery Effluent Problem, Vo. 26, No. 9–11, pp.–2229–2232, 1992.

Gao, Y.C., Ph.D., et al., J. Environ. Sci. Health, Chemical Treatment of Swine Wastewater, vol. A28(4), pp. 795–807, 1993.

Liao, P.H., et al., Biomass and Bioenergy, Chemical Precipitation of Phosphate and Ammonia From Swine Wastewater, vol. 4, No. 5, pp. 365–371, 1993.

Piccinini, S., Material Engineering, Application of a Phillipsite Rich Zeolitite During the Composting of Solid Fractions of Pig Slurry, vol. 5, n. 2, pp. 375–381, 1994.

Liberti, L. et al., Nutrient Removal From Wastewaters, Applications of a New Physicochemical Method for Removal and Recovery of Nutrients from Wastewater, pp. 371–378, 1994.

Jewell, William J., American Scientist, Resource–Recovery Wasterwater Treatment, vol. 82, pp. 367–375. Jul.–Aug. 1994.

Vincini, M. et al., Bioresource Technology, Use of Alkaline Fly Ash As An Amendment For Swine Manure, vol. 49, pp. 213–222, 1994.

Waste Management and Utilization in Food Production and Processing, Task Force Report No. 124, Swine production–Waste Management and Utilization, pp. 42–54, 110–121, Oct. 1995.

Liberti, L. et al., Natural Zeolites '93, Ammonium and Phosphorus Removal From Wastewater Using Clinoptilolite: A Review of the Rim–Nut Process, pp. 351–362, 1995.

Kang, Shin Joh, Ph.D., P.E. et al, South Lyon, Michigan Study, Nutrient Removal and Recovery From Muncipal Wastewater By Selective Ion Exchange, pp. 1149–1171, No date available.

abstract, Norman, J., Conference Title: Bioenergy 84, Anaerobic treatment of piggery waste—thermophilic digestion of the solids phase and mesophilic treatment of the liquid phase, vol. III Biomass conversion, Jun. 15–21, 1984, Goteborg, Sweden.

abstract, Ghederim, V. et al., Conference Title: Agricultural waste utilization and management, Present state and trends in animal farm wastes, Dec. 16–17, 1985, Chicago, Illinois.

abstract, Sievers, D.M., Biological Wastes, Rapid Mixing influences on chemical coagulation of manures, vol. 28, No. 2, pp–103–114, 1989.

abstract, Provolo, G. et al, Genio Rurale, Technical–economic evaluation of the options for the digestion of pig slurry, vol. 56 (2), pp. 19–26, 1993.

* cited by examiner

METHODS FOR PRODUCING FERTILIZERS AND FEED SUPPLEMENTS FROM AGRICULTURAL AND INDUSTRIAL WASTES

RELATED APPLICATIONS

This application is a continuation of U.S. patent application Ser. No. 10/139,827, filed on May 7, 2002, which is a continuation of U.S. patent application Ser. No. 09/235,461, filed on Jan. 22, 1999, now U.S. Pat. No. 6,409,788 B1, which claims priority to U.S. Provisional Patent Application Serial No. 60/072,372, filed on Jan. 23, 1998, all of which are incorporated herein by reference.

BACKGROUND OF THE INVENTION

1. The Field of the Invention

The present invention relates generally to the production of commercial fertilizers by treating agricultural and industrial wastes. More specifically, the present invention relates to methods for producing organic-based, slow release fertilizers by processing wastes such as organic-based and industrial wastes.

2. The Relevant Technology

Feedlots, animal barns, agroindustrial plants, municipal sewage, and farms that keep large numbers of animals are sources of enormous quantities of organic waste. The expression "organic waste source" will hereinafter refer to any of these sources of organic waste or to any source that similarly produces organic waste, although perhaps in different quantities or by different activities.

The disposal of untreated organic waste causes serious pollution problems which include those due to the waste's high content of chemically oxidizable components (expressed as COD, or chemical oxygen demand) and biochemically decomposable components (expressed as BOD, or biochemical oxygen demand). When these pollutants reach bodies of water, either because they leach from disposal sites or as a consequence of being directly released or transported into water bodies, they deoxygenate the receiving waters and impair the receiving waters' capability to support aquatic life.

Acridity and high pathogen content add to the COD and BOD problems of untreated waste disposal. Acrid gases released into the atmosphere are not only unpleasant but they can also contribute to acid deposition, global greenhouse effects, and ozone depletion.

According to background material provided by the US Environmental Protection Agency (EPA), "animal waste, if not managed properly, can run off farms and pollute nearby water bodies. Agricultural run off, rich in nutrients like nitrogen and phosphorous has been linked to dangerous toxic microorganisms such as *Pfisteria piscicida*. Pfisteria is widely believed to be responsible for major fish kills and disease events in several mid-Atlantic states and may pose a risk to human health." Draft Strategy for Animal Feeding Operations, EPA Memorandum, Mar. 4, 1998. See also EPA To Better Protect Public Health and The Environment From Animal Feeding Operations, EPA release of Mar. 5, 1998. In particular, the relationship between swine production and waste management problems has been reported in the Task Force Report No. 124, Council for Agricultural Science and Technology, *Waste Management and Utilization in Food Production and Processing*, Oct. 1995, pp. 42–54, 110–121.

Notwithstanding the problems referred to above and other detrimental effects of the disposal of untreated organic waste, organic waste has nutritional value for plants. Nevertheless, untreated organic waste cannot be used directly as fertilizer because of the afore-mentioned problems. The alternative use of synthetic fertilizers is often adopted for increasing crop yield, but this solution carries at least two undesirable implications. First, a strategy that relies only on the use of synthetic fertilizers neglects the problem of organic waste disposal. Second, the manufacture of synthetic fertilizers frequently requires consumption of considerable amounts of energy and possibly expensive synthesis materials, sometimes involves polluting subprocesses, and may produce additional waste whose safe disposal is often expensive. In addition, the fast release of most synthetic fertilizers causes leaching, which in turn leads to wasted fertilizer and the ensuing pollution problems when the leached fertilizer accumulates in canals and other bodies of water.

The problems inherent to organic waste production and subsequent treatment require economical processes which avoid the afore-mentioned environmental problems. The efficiency of these processes is considerably enhanced when, in addition to providing a practical disposal of organic waste, the processes convert the organic waste into a useful product, such as commercial fertilizer, preferably a slow-release fertilizer. This conversion requires the recovery of the nitrogenous products in the waste and their conversion into a fertilizer that can slowly release nitrogen in a form that plants can absorb. Because of the diversity of variables that determine the economic, chemical, and environmental aspects of this conversion problem, a variety of attempts to treat organic waste have been undertaken. The patents and other works referred to hereinbelow relate to methods that address aspects of the problem of converting organic waste into useful fertilizer.

Methods for producing fertilizer have been disclosed in references that include the following patents and articles.

U.S. Pat. No. 5,593,099 describes a method for producing fertilizer from liquid manure or from sludge that includes mixing the manure or sludge with harvest leftovers and then grinding the mixture to a particle size such that the particles adsorb and absorb the liquid substance fully. An apparatus for producing the solid fertilizer is also disclosed.

U.S. Pat. No. 5,482,528 describes a pathogenic waste treatment process to produce a useful product such as an amendment to agricultural land. In the process, waste is combined with an acid and a base which react exothermically to thermally pasteurize the waste and add mineral value to the product. Materials such as fly ash agglomerate the product, and after grinding, the particles can aerate the soil. This patent is a division of U.S. Pat. No. 5,422,015 that also discloses a pathogenic waste treatment. The use of alkaline fly ash as an amendment for swine manure has been studied by M. Vincini, F. Carini, and S. Silva, *Use of Alkaline Fly Ash as an Amendment for Swine Manure, Bioresource Technology*, Vol. 49 (1994), pp. 213–22.

U.S. Pat. No. 5,443,613 describes a method for producing suspension fertilizer by first preparing an aqueous initial suspension of the organic material and transforming it into colloidal form. An ammoniacal compound, such as anhydrous or aqueous ammonia, and supplemental compound or compounds for providing the other desired inorganic plant nutrients are added to and admixed with the acidified suspension to produce a finished suspension fertilizer having the desired analysis.

U.S. Pat. No. 5,411,568 describes a method for preparing granular slow release nitrogen fertilizer from nitrogenous organic wastes by coreacting particulate dry conditioned nitrogenous organic waste and reactive ureaformaldehyde oligomer.

U.S. Pat. No. 5,393,317 describes a method and apparatus for making organic based fertilizer, the method including mixing organic material with phosphate, potash, or other inorganics and water if necessary. Acid and ammonia are also added to the mixture, and quantities of the various ingredients are adjusted to provide a fertilizer that has a desired percentage of the major fertilizer elements for a specific crop.

U.S. Pat. No. 5,378,257 describes a process for organic fertilizer production that comprises mixing a batch of the waste matter with nitric acid, crushing the waste water mixed with nitric acid to make sludge, adding quicklime to the sludged waste matter, thereby neutralizing the waste water, and drying the neutralized waste matter. An apparatus for the production thereof is also disclosed.

U.S. Pat. No. 5,071,559 discloses a method for processing manure by adding an organic carrier liquid to the manure, concentrating the mixture of manure and carrier liquid, condensing the formed vapor, anaerobically treating the condensate, and aerobically treating the effluent from the anaerobic treatment.

U.S. Pat. Nos. 5,021,247, 5,021,077, and 4,997,469 disclose methods for preparing high integrity natural nitrogenous granules for agriculture by processes that include the heating of natural nitrogenous materials under alkaline conditions until the materials develop adhesive properties.

U.S. Pat. No. 4,710,300 describes a method for processing of organic materials containing nitrogen compounds, where the organic material undergoes an anaerobic digestion with simultaneous liberation of biogas which contains methane and carbon dioxide. In this process, the liquid product obtained after anaerobic digestion is heated to boiling temperature, ammonia is bonded as carbonate which is distilled off, and the tail product from distillation is further processed to the valuable product and clear water or is discharged as prepurified wastewater. Biogas production and anaerobic lagoon digesters have been described by L. M. Safley, Jr., S. L. Crawford, and W. R. McLeod, *Capturing Methane for Fuel and Other Strategies for Managing Swine Lagoon Waste*, pp. 38–41; L. M. Safley, Jr., S. L. Crawford, D. Nichols, and W. R. McLeod, *Low Temperature Lagoon Digester for Biogas Production from Swine Manure*; L. M. Safley, Jr., and P. D. Lusk, *Low Temperature Anaerobic Digester*, published by the Energy Division of the North Carolina Department of Economic and Community Development; J. R. Fischer, D. M. Sievers, and C. D. Fulhage, "Anaerobic Digestion in Swine Wastes", and E. J. Krocker, H. M. Lapp, D. D. Schulte, and A. B. Sparling, "Cold Weather Energy Recovery from Anaerobic Digestion of Swine Manure", in: *Energy, Agriculture and Waste Management*, edited by W. A. Jewell, (Ann Arbor Science, 1975) pp. 307–16, 337–52.

European Patent Application No. 79400246.9 discloses a method and facility for deodorizing waste from pig farms and for transforming it into manure. A mixture of the waste and a calcareous solution is decanted and the separated liquid component is oxygenated by compressed air. Odor control methods have been described by S. Barrington and K. El Moueddeb, "Zeolite to Control Swine Manure Odours and Nitrogen Volatilization", in: *New Knowledge in Livestock Odor Solutions*, International Livestock Odor Conference '95, pp. 65–68, and S. Piccinini, *Application of a Phillipsite Rich Zeolite During the Composting of Solid Fractions of Pig Slurry, Materials Engineering*, Vol. 5 no. 2 (1994), pp. 375–81.

Methods for treating wastewater have been disclosed in references that include the following patents and articles.

U.S. Pat. No. 5,545,326 describes a pressurized process for the treatment of high-solids wastewater having relatively high BOD and phosphorous concentration that includes anaerobic and aerobic treatment. The treated wastewater effluent is discharged in an environmentally safe manner such that the residue BOD and phosphorous are concentrated in the solid fraction which may be a source of protein. U.S. Pat. No. 5,266,201 describes a process for the purification of aqueous solutions polluted by nitrate ions, such as municipal wastewater, factory effluents, and liquid manure.

U.S. Pat. No. 4,872,993 discloses processes and techniques for treating wastewater to remove organic matter and heavy metals. In the treatment, clay and flocculating agent are added to the wastewater to cause separation of a sludge. Research on unsettleable material removal by chemical coagulation and flocculation has been reported by M. Hanna, D. M. Sievers, and J. R. Fischer, "Chemical Coagulation of Methane Producing Solids from Flushing Wastewaters", in: *Agricultural Waste Utilization and Management*, Proceedings of the Fifth Int. Symposium on Agricultural Wastes, Dec. 16–17, 1985, pp. 632–37, and by D. M. Sievers, *Rapid Mixing Influences on Chemical Coagulation of Manures, Biological Wastes*, Vol. 28 (1989), pp. 103–14.

U.S. Pat. No. 4,519,831 describes a method of converting sewage sludge solids into dense controlled release, attrition resistant fertilizer agglomerates. The method uses acidic material and uncondensed liquid ureaform. U.S. Pat. No. 4,245,396 discloses a process for drying and granulating sewage sludge either mechanically or by application of heat. This patent is related to U.S. Pat. No. 4,193,206 on processes for drying sewage sludge and filtering water, and to U.S. Pat. No. 4,128,946 on a drying organic waste process.

European Patent Application No. 83830277.6 discloses a method for removing and recovering ammonium, potassium and phosphate ions from wastewater by selective nutrient removal using ion-exchange resins, resin regeneration and recovery of nutrients and precipitation of hydrous $MgNH_4PO_4$ and/or $MgKPO_4$. This is a RIM-NUT process, where RIM-NUT stands for "removal of nutrients." This process has also been disclosed in other publications, such as L. Liberti, A. Lopez, V. Amicarelli, and G. Boghetich, "Ammonium and Phosphorous Removal from Wastewater Using Clinoptilolite: A Review of the RIM-NUT Process", in: *Natural Zeolites '93*, pp. 351–62; S. J. Kang, T. W. King, P. J. Horvatin, A. Lopez, L. Liberti, and L. Beebe, *Nutrient Removal and Recovery from Municipal Wastewater by Selective Ion Exchange*, and L. Liberti and A. Lopez, "Applications of a New Physicochemical Method for Removal and Recovery of Nutrients from Wastewater", in: *Nutrient Removal from Wastewater*, edited by N. J. Horan, P. Lowe, and E. I. Stentiford (1994), pp. 371–78. The formation of magnesium ammonium phosphate hexahydrate (struvite) has been studied by C. Maqueda, J. L. Perez Rodriguez, and J. Lebrato, *Study of Struvite Precipitation in Anaerobic Digesters, Water Research* Vol. 28 (1994), pp. 411–16, and by K. M. Webb and G. E. Ho, Struvite ($MgNH_4PO_4.6H_2O$) *Solubility and its Application to a Piggery Effluent Problem, Water Science and Technology* Vol. 26 (1992), pp. 2229–32. The precipitation of phosphate and ammonia and nutrient removal from swine wastewater has been studied by E. Brione, G. Martin, and J. Morvan, "Non-Destructive Technique for Elimination of Nutrients from Pig Manure", in: *Nutrient Removal from Wastewater*, edited by N. J. Horan, P. Lowe and E. I. Stentiford, (Technomic Pub., 1994) pp. 33–37; P. H. Liao, Y. Gao, and K. V. Lo, *Chemical Precipitation of Phosphate and Ammonia from Swine Wastewater, Biomass and Bioenergy*, Vol. 4 no. 5 (1993), pp. 365–71, and by Y. C. Gao, P. H. Liao, and K. V. Lo, *Chemical Treatment of Swine Wastewater, Journal of Environmental Science and Health*, Vol. A28 no. 4 (1993), pp. 795–807.

Fertilizer compositions and/or fertilizer components have been disclosed in references that include the following patents.

U.S. Pat. No. 5,549,730 relates to a compression molded tablet fertilizer capable of slowly releasing active ingredients and is suitable for use in horticulture and afforestation, and a method for the production thereof.

U.S. Pat. No. 4,845,888 describes a multilayer degradable and controlled release multinutrient mulch film, and a process of preparing it. U.S. Pat. No. 4,832,728 reveals fertilizer compositions, processes of making them, and processes of using them. This patent is a division of U.S. Pat. No. 4,560,400 that relates to a fertilizer in granular form, and processes for making and using it. U.S. Pat. No. 4,743,287 discloses a fertilizer and a method for making a complex humic acid fertilizer by mixing a select organic material, water, and measured amounts of major inorganic elements of nitrogen, phosphate, potash and sulfur.

U.S. Pat. No. 5,433,766 reveals a synthetic apatite containing agronutrients and a method for making the apatite. The apatite comprises crystalline calcium phosphate having agronutrients dispersed in the crystalline structure, and it can optionally comprise a carbonate and/or silicon solubility control agent. The agronutrients are released slowly as the apatite dissolves. U.S. Pat. No. 5,055,124 reveals the production of potassium phosphate useful as a low-chloride content fertilizer by reacting phosphoric acid, commercial or technical grade, with fertilizer-grade potassium chloride. The reaction product is used to produce various types as well as grades of fertilizers.

Methods that include fermentation or the use of certain microorganisms have been disclosed in references that include the following patents.

U.S. Pat. No. 5,118,336 discloses a method for valorizing liquid manure from pigs by elaboration of biological amendments. The method includes fermentation of a biomass based on a mixture of pig liquid manure and a carbonaceous medium. U.S. Pat. No. 4,795,711 describes the fermentation of organic materials for producing heat and fertilizer. U.S. Pat. No. 5,093,262 discloses a method and apparatus for producing organic fertilizer with the use of nitrogen fixing bacilli.

Other treatments, production methods or compositions that relate to organic wastes have been disclosed in references that include the following patents.

U.S. Pat. No. 5,087,474 particularly relates to a method of recovering particulate animal feed fats, free of malodors and pathogens from abatoir by-products and to the product recovered by this method.

U.S. Pat. No. 4,765,900 describes a method for treating organic waste, which includes separating the liquid portion of the waste from the solid portion prior to reacting the solid portion in an accelerated wet oxidation reaction. U.S. Pat. No. 4,278,699 describes a method of purifying distillers solubles and use of the purified matter.

U.S. Pat. No. 4,310,552 discloses a swine, hog and pig fodder which comprises the customary digestible meal or grain component in combination with an indigestible blown perlite additive.

U.S. Pat. No. 4,109,019 is directed to a method for producing feeds for ruminant animals whereby carbamides, particularly urea and biuret, are reacted with fermented proteinaceous agricultural products and wastes with the aid of an aliphatic dicarboxylic acid catalyst to produce feed which releases protein and protein equivalent nitrogen in a slow and controlled manner in the rumen.

U.S. Pat. No. 4,176,090 describes interlayered clay compositions used as catalysts, catalytic supports, and sorbents.

Despite the plurality of methods for treating organic waste and for producing fertilizer, conventional methods leave unsolved problems. This is particularly the case regarding strategies that rely on encompassing and integrating organic waste treatment methods and fertilizer production processes for making fertilizer with desired environmental and agronomical properties. More specifically, there is a need for commercially successful organic waste treatment and fertilizer production processes.

The composition of animal waste depends on both the kind of animal and the way the waste is handled. Poultry operations generally produce dry waste, with about 15%–25% moisture whereas hogs and cattle generate waste that is more liquid. In addition, water is typically used to flush hog and cattle waste out of barns and into storage facilities, thus producing a slurry that can be up to 97% liquid and it is typically stored either in earthen lagoons or in slurry tanks. In these conventional treatments, "many of the solids (including much of the phosphorous) settle into a sludge at the bottom. Most nitrogen remains dissolved in the water or volatilizes into the atmosphere. A farmer who utilizes the animal waste for nutrients pumps the liquid out for nutrients or irrigation, and may agitate the sludge at pumping time to capture the nutrients that otherwise would remain behind." *Animal Waste Pollution in America: An Emerging National Problem*, Environmental Risks of Livestock & Poultry Production, Report Compiled by the Minority Staff of the US Senate Committee on Agriculture, Nutrition, & Forestry for Sen. Tom Harkin, December 1997.

Most methods that rely on conventional lagoons do not clarify the effluent that carries the organic waste prior to its accumulation in the lagoon system This practice leads to unnecessarily high loading of the lagoon system, thus requiring large conventional lagoons. Whereas some recently introduced lagoon treatments claim to reduce odors, these treatments essentially increase greenhouse gas emissions, such as carbon dioxide and ammonia gas emissions.

In anaerobic lagoons, one of the more common methods of hog manure treatment, organic matter in the waste is decomposed by bacteria. These lagoons are under increased criticism for the offensive odor that results from incomplete decomposition and ground water contamination. Anaerobic lagoons also diminish nutrient value in the hog wastes through processes that include the loss during digestion of much of the nitrogen in the waste.

The removal of eutrophic ions from wastewater and the reintroduction of nitrogen and phosphorus into the environment is the focus of some methods that nevertheless do not address the recovery of biogas that has considerable energetic value and whose release into the atmosphere can have a serious impact on air quality, ozone concentration, and global climate changes. In addition, recovered biogas can be used for heating or electric energy generation. Whereas the capture of the gases released in the conversion of organic waste to fertilizer leads to a reduction or elimination of undesirable odors, greenhouse gas emissions, and gases that can contribute to acid deposition, some methods that focus on the elimination of odors or pathogenic content of organic waste do not provide for the conversion of waste into a commercial fertilizer.

After biogas recovery, the sludge that can be separated from the organic waste effluent contains ammonia and phosphates that are recoverable by precipitation under controlled pH conditions. The densified precipitate is a fertilizer that can be supplemented with other compounds to incorporate in its composition micronutrients and to standardize its composition, but most organic waste treatments neglect the incorporation of these complements that are necessary for plant growth, and more specifically, for crop production.

Furthermore, the conversion of waste into fertilizer in most conventional organic waste treatments does not absorb residues produced by other activities. These residues include the waste generated by, for example, industrial mining and the combustion of coal in power plants.

It is also important that the reintroduction of phosphates and ammonia into the environment be achieved by means of a slow release fertilizer. Certain components in organic waste used as a source of plant nutrients far exceed plant demand when they are not properly administered. For example, it is acknowledged that phosphorous nonpoint-source pollution is becoming a problem throughout the USA. F. Liu, et al., *Phosphorous Recovery in Surface Runoff from Swine Lagoon Effluent by Overland Flow, J. Environmental Quality* Vol. 26 (1997) 995–1001. In addition, ammonia is usually released from untreated pig slurry that is directly applied as a fertilizer. Ammonia loss rates have been reported as being very high during the first 4 hours to 6 hours after slurry application. These ammonia losses can be significantly enhanced by temperature and wind speed increases. Sven G. Sommer, et al., *Ammonia Volatilization from Pig Slurry Applied with Trail Hoses or Broadspread to Winter Wheat: Effects of Crop Developmental Stage, Microclimate, and Leaf Ammonia Absorption, J. Environmental Quality* Vol. 26 (1997) 1153–1160. In contrast with some processed organic waste, the slow release fertilizer produced according to this invention considerably decreases water pollution that would otherwise take place by leaching.

Finally, some methods produce variable composition fertilizers depending on the characteristics of the feed provided to the animals that produce the waste, thus supplying non-standard composition fertilizers. It would be desirable to produce a fertilizer of standard composition that can be appropriately modified to satisfy the needs of different agribusiness.

Currently, organic waste is largely treated and disposed of by relying on technology developed in the 1940's for small scale operations, and integrated waste systems are nonexistent. In particular, most of the presently available waste treatment and disposal methodology relies on single unit operations which address a single problem or a very reduced number of problems. This approach cannot solve the variety of environmental, economical, operational, and technological problems that the multifaceted waste treatment and fertilizer production industry faces.

Descriptions of methods that address specific elements of the more encompassing problem of converting waste into useful fertilizer by an economical and nonpolluting process can be found in some of the afore-mentioned related art. Some of these methods necessitate the addition of materials such as caustic products, urea or formaldehyde. Others rely on sources of energy for heating or for oxygenating by forced air flow.

For example, the treatment of organic waste with caustic chemicals may eliminate the waste's pathogenic content and render it suitable for its use in agriculture, but this method would not solve other problems such as the prevention of emissions of acrid odors and other gases that contribute to the greenhouse effect and to the depletion of ozone. In particular, some conventional methods aim at eliminating nitrogen compounds from the organic waste, but in doing so they also increase greenhouse gas and acrid gas emissions. In addition, these methods decrease the yield of nitrogen compounds in the final product into which the organic waste is processed. Such methods would not absorb other residues and waste that would have to be independently disposed of They would not produce useful fuel material, and would require large processing facilities.

Another limitation faced by most conventional waste treatment methods is the inability to effectively treat large amounts of organic waste. This limitation becomes particularly relevant in a production framework in which large animal operations gain efficiency by raising a very large number of animals in controlled indoor environments which in turn produce enormous amounts of organic waste. See, for example, Warren Cohen, United States Deep In Manure, US News & World Report, Jan. 12, 1998, p. 46.

Modern farming operations must address the problems that are inherent to the confining of large numbers of animals in concentrated feeding operations. To this respect, it has been reported that more manure is produced in some areas of the US than can be safely applied to available crop land. See, for example, *National Legislation Needed to Address Animal Waste Pollution, Senate Panel Told,* BNA Environment Reporter, Vol. 28(49) (1998) pp. 2647–49, and *Waste From Hog, Chicken Farms Growing at 'Alarming' Rate, Group Says,* BNA Environment Reporter, Vol. 28(48) (1998) pp. 2648–50.

Sewage waste water treatment faces some of the same problems and raises similar concerns. Whereas the US has been regarded as a leader in sewage management, and sewage-treatment technology has been described as a success story in 20th-century US, it has been asserted that significant commercial advantages have been significantly lacking in the past few decades. Moreover, existing treatment methods have been characterized as facing a number of inherent problems that must be overcome to make further progress in the next century. William J. Jewell, *Resource-Recovery Wastewater Treatment, American Scientist* Vol. 82 (1994) pp. 366–75.

Attempts in the industry to overcome the multifarious limitations that are inherent to single unit operations have failed to date because of the inability to implement them economically or because of operational and technical difficulties. This limited scope of the current waste treatment and disposal technology has lead to industry problems that have received intense scrutiny by the media. Therefore, an encompassing, integrated waste treatment system is a long felt, yet unsatisfied, need in this industrial sector. The need for an encompassing and integrated waste treatment system has been expressed in a plurality of articles, statements on public health impacts and studies and regulations on animal feeding operations.

The EPA and legislators have been increasingly sensitive to the problems caused by current organic waste disposal practices and they have been focusing on the need to address such problems. In particular, the development of scientifically valid limits on land application of manure has been called, and the EPA has been reported as planning to revise the feedlot effluent limitations guidelines for poultry and swine by 2001, and for beef and dairy cattle by 2002. See *Federal Role in Animal Waste Control Should Be Limited, House Panel Told*, BNA Environment Reporter, Vol. 29(3) (1998) pp. 178–79; *Draft Strategy for Animal Feeding Operations*, EPA Memorandum, Mar. 4, 1998, and *Compliance Assurance Implementation Plan For Concentrated Animal Feeding Operations*, Office of Enforcement and Compliance Assurance, EPA, Mar. 5, 1998.

Acridity problems have also been increasingly addressed by legislators and government agencies. For example, following a recommendation from the Missouri Department of Natural Resources, the State of Missouri Air Conservation Commission reportedly agreed on Feb. 3, 1998, to form a task force to analyze odor pollution issues related to large hog and poultry farms in the state. See *Task Force to Study Odor Issues Relating to Large Hog, Poultry Farms*, in BNA Environment Reporter, Vol. 28(40) (1998) p. 2134.

In addition to the focus on the problems that untreated organic waste discharge may cause, government strategies have also highlighted the need for developing new technological approaches for treating organic waste, pointing out in particular that the use of successful and innovative technological approaches should be encouraged and pursued. Draft of the *Strategy for Addressing Environmental and Public Health Impacts From Animal Feeding Operations*, EPA, March 1998, pp. 11–12.

There is therefore a need in the art for efficient, simple, economically viable methods and systems for converting organic waste into useful products such as fertilizers.

Each of the afore-mentioned patents and elements of related art is hereby incorporated by reference in its entirety for the material disclosed therein.

SUMMARY AND OBJECTS OF THE INVENTION

The present invention has been developed in response to the present state of the art and, in particular, in response to problems and needs that have not been solved heretofore.

Methods and systems according to the present invention permit the separation of valuable substances from organic waste. These valuable substances include purified water and nutrients, such as fertilizers. Organic waste that is treated according to the present invention includes complex forms of waste, such as organic waste that comprises setteable and nonsettleable materials such as suspended and dissolved solids, including fine solids of predominantly organic origin, various biomaterials and bio-related materials, various inorganic materials and their complexed and combined forms with the bio and bio-related materials, such materials being present in the complex organic waste in a variety of aggregation and phsyicochemical forms such as solution, suspension, and colloidal forms. Organic waste treated according to this invention includes forms of organic waste such as digested and undigested organic waste.

Embodiments of the systems and methods according to the present invention permit the separation of purified water and/or nutrient materials from organic waste with low capital and operating costs, with relatively simple methodology that can easily be automated, providing near full recoveries of the valuable materials in the organic waste, eliminating the need for land applications of residual waste products, such as waste stream, and providing for water re-use as fresh water.

It is desirable to dispose of organic waste that would otherwise pose a serious environmental problem Instead of its mere disposal, it is desirable to treat the organic waste and convert it into useful products. This conversion process however, should not lead to other forms of pollution. Instead, the conversion process should optimally rely on methods that are not very energy demanding and that do not require the consumption of other substances of complex, expensive, or polluting manufacture. Conversion of organic waste to fertilizer and optionally to feed supplement, and biogas recovery are two desirable and beneficial activities that can make the waste treatment process economical. In addition, these activities can make of the waste treatment process a practical and effective alternative to environmentally impermissible disposal.

To achieve the desirable goal of eliminating water pollution, organic waste treatment must provide effluents in every separation and reaction step that meet EPA discharge standards. The accomplishment of this goal should be further complemented by the capture and effective use of gases that, if released from the organic waste, would contribute to acid deposition, ozone depletion, greenhouse effect, and whose acridity could be intolerable.

It is also desirable that the organic waste treatment products do not contribute to water pollution by leaching and that they become economical slow release commercial fertilizer. Finally, it is also desirable that the organic waste treatment process be carried out by implementing techniques and methods that lead to a minimization of the overall land surface dedicated to the entire organic waste conversion process.

The expression "organic waste" is used herein as a descriptive term that encompasses waste of organic origin whether in the form of effluent, solid, sludge, slurry, or any other form that can be produced in organic waste sources. Furthermore, it is an operation well known to those skilled in the art to convert waste in, say, solid form to effluent by flushing the solid waste with water, if such conversion were needed at any step in the organic waste treatment and conversion process that is described and claimed below.

The objectives of this invention include the following. The general objective is to provide a method for the treatment of organic waste, whereby the organic waste is converted into commercial fertilizer, biogas useful for heating and power generation, and final effluents that can be directly employed in irrigation and wetland projects. In particular, the organic waste to be treated according to the methods of this invention can be, for example, hog farm effluent and solid matter, cattle or poultry waste.

It is a further objective of this invention to provide a method for the treatment of organic waste and production of supplement feed for animals, including cattle feed quality products.

Whether this invention is characterized as providing a method for producing fertilizer or for producing fertilizer and feed supplement, these characterizations are merely concise references to another objective of this invention that consists of providing a method for producing fertilizer only, feed supplement only, or both fertilizer and feed supplement.

It is a further objective of this invention to significantly reduce or even eliminate the release of gases that can lead to acrid odors, loss of potential plant nutrients, and environmentally undesirable emissions of gases that may contribute to acid deposition, ozone depletion and an overall insalubrity of local farming environments. This reduction or even elimination of released gases can be achieved in this invention by employing gas adsorbing substances, in particular ammonia adsorbing zeolites, at several stages of the waste generation and/or waste treatment processes, by reacting ammonia with acids, such as phosphoric or sulfuric acid, and by recovering methane-rich biogas.

The utilization of gas-adsorbing substances such as zeolites according to this invention minimizes the emission of ammonia gas from the animals' gastrointestinal tracks and from the organic waste itself The biogas can be directly used in the integrated waste treatment and fertilizer and feed supplement production processes and/or it can be used in organic waste sources in operations such as drying manure filtrate. Furthermore, this biogas can be used for heating, power generation, or in subsequent synthetic or catalytic processes. The prevention of gas releases from organic waste sources leads to the additional advantage of satisfying the public demand for acrid odor reduction in, or even its elimination from, organic waste sources.

The minimization or reduction of gas emissions by this invention is further facilitated by the reliance on either no lagoons or on reduced-size lagoons. When this invention relies on reduced-size lagoons, gas emissions from such lagoons are reduced or eliminated because this invention reduces anaerobic lagoon loading and lagoon surface area by comparison to loading and surface area of conventional lagoons. Reliance on reduced-size small load lagoons makes anaerobic lagoons economically feasible and extends the lagoon useful life with respect to that of large conventional lagoons. Furthermore, it leads to an increase in the available surface area of useful space at the organic waste treatment site and to a minimization or elimination of the risk of water contamination by spills or leaks that are more difficult to control in large, big-load conventional lagoons. Because this invention does not rely on conventional biological and volume reduction treatments in anaerobic lagoons, biogas emission from conventional lagoons is eliminated.

It is a further objective of this invention to provide a waste treatment process in which the separation of solids is accomplished with very high settling rates. Accordingly, the liquid-solid separation of the organic waste is improved with respect to that achieved by most conventional organic waste treatment processes. Furthermore, the effluents separated from the organic waste according to this invention can be used in irrigation and wetland projects under current EPA discharge standards and salting problems in recycling streams are eliminated. The separation process of this invention can also be used to remove undesirable components from municipal sludge.

One of the features of this invention is that the treatment of organic waste can be accomplished by using waste materials from other sources, such as mining waste and fly ash. This feature leads to a more advantageous and effective waste treatment because mining waste and fly ash would otherwise generate disposal problems.

It is a further objective of this invention to convert organic waste into an organic-based standard composition, granular, slow release, readily available fertilizer with micro-nutrients whose delivery requires no changes in existing fertilizer delivery systems. More specifically, one of the objectives of this invention is to manufacture and provide a nitrogen-phosphorous-potassium (hereinafter "NPK") fertilizer with sizing materials and, in particular, with zeolite and densifiers. One of the fertilizers produced according to this invention is made from hog waste, zeolite, fly ash, lime, and optionally, off grade commercial fertilizers. In general, the raw ingredients for the fertilizer and food supplement production methods of this invention are economical and the production equipment size is not limited by process engineering.

The fertilizer production methods of this invention are flexible enough as to produce fertilizer products that combine high availability of plant nutrients, slow release characteristics, soil amendment properties, low salinity, and a rich mix of micronutrients in the organic base. Because of the flexibility of the fertilizer production method of this invention, the fertilizer composition can be advantageously tailored to the demands of specific markets.

The waste treatment and fertilizer and food supplement production methods of this invention rely on a variety of mechanical processing equipment that includes processing equipment for efficiently densifying organic waste. This feature leads to the advantageous improvement of the organic waste handling characteristics and facilitates the retention of zeolites, magnesium, phosphates and ammonia in the organic waste throughout the process, thus becoming part of a finished fertilizer.

A feature of the mechanical processing equipment of this invention is that it can operate in either continuous or batch mode. Accordingly, an advantage of the organic waste treatment and fertilizer and feed supplement production methods of this invention is that they can be implemented in small farms as well as in large farms, batch operations being more useful for small farms and continuous operations being more useful for large farms.

It is a further objective of this invention to provide organic waste treatment and fertilizer and food supplement production methods that can absorb the organic waste production from a great diversity of organic waste sources, whether the organic waste sources are small or large scale operations, and regardless of whether the organic waste is produced at the organic waste treatment site or at a plurality of near or remote organic waste sources. A feature of the methods of this invention is that their implementation is versatile enough as to be adaptable to different economic strategies and needs, whether it is in organic waste sources that are being built or in already existing organic waste sources by simple retrofitting. With this versatility, an advantage of the methods of this invention is that they can easily be implemented for reclaiming existing sites that are destined to either closure or cleanup.

When implemented in conjunction with farms or livestock operations, the integrated waste treatment and fertilizer and food supplement production methods of this invention successfully densify and dry manure slurry, significantly improve animal health, feeding efficiency and reproductive capacity, and they lead to the production of an economically competitive organic-based slow release fertilizer and optionally, to the production of feed supplements. These features permit to advantageously improve the overall economics of livestock production by improving animal health, decrease waste management costs, implement processes that easily comply with environmental regulations, reduce long term liability by reducing or eliminating water and soil contamination, and use waste material to profitably produce NPK fertilizer and optionally feed supplements.

The objectives of this invention are specially significant to the pork producing sector of the US and most countries. The biggest concerns of pork producers include: Competition for land space between farms and urban development, environmental problems, competitive marketing of products, and proper care of animal diseases and animal health. Because the present invention significantly reduces the size of conventional lagoons, or even eliminates the need for lagoons, its embodiments need much less surface area than that required by conventional methods.

The positive environmental effects of the present invention are manifest in three forms: The minimization, or even elimination, of emission of gases that would otherwise have detrimental environmental effects and would be a nuisance to human beings; the recovery of energy-rich gases whose subsequent utilization reduces reliance on other forms of energy, and the discharge of effluents with reduced nutrient loading. Reduction of nutrient loading in final effluents can largely eliminate nutrient accumulation problems when the effluents are used for irrigation or when the effluents are used to make constructed wetlands economically viable.

The effects of this invention on marketing pork products include the ability to raise animals in less remote areas because of its environmentally friendly waste treatment method, the production of low cost high-quality fertilizer, and the optional production of feed supplement that lead to a reduction of the operational costs. Furthermore, animal diseases are reduced and animal health is improved because of the improved conditions in barn air quality.

The objectives of this invention are achieved by means of an integrated waste treatment method that relies on modern technology and that can be used in operations that range from small scale to large scale operations. In particular, the objectives of this invention are achieved by a specially designed mechanical system which facilitates the implementation of a method for separating organic waste into a liquid and a precipitate. The precipitate includes the products of reacting the organic waste with flocculent, phosphate precipitating agent, ammonia retaining agent, base and optionally a densifier.

Optionally, gas reactors recover methane-rich biogas that can be used in heating, power generation, or subsequent synthetic or catalytic processes.

The liquid, optionally treated in a reduced load lagoon system, can subsequently be used in irrigation, wetland projects, or recycled in the organic waste source. The precipitate yields a solid fertilizer base which can be used as such as a fertilizer or it can be mixed with other compounds such as nitrogen, potassium or phosphorous containing compounds as well as micronutrients to improve its grade as a fertilizer.

Subsequent steps include pelletizing and drying the mixture and controlling its size to obtain standard size fertilizer pellets. The final product is an organic-based, granular, slow release fertilizer whose composition includes micronutrients. This fertilizer is readily available to plants and it can have a standard composition and grain size. The solid obtained from the filtration of the solid fraction can be adjusted to a proper pH, if needed, and used as a feed supplement.

Whether this invention is implemented for the production of fertilizer, feed supplement, or both, one of the objectives of this invention is nitrogen conservation. To conserve nitrogen, this invention preferably relies on the addition of zeolite, optimally an ammonia adsorbing zeolite, to one or several of the different organic waste generation steps. For example, zeolite can be added to animal feed, it can be incorporated into farm waste streams, and/or used in the waste treatment process itself Added zeolite retains nitrogen which would otherwise be released mostly in the form of gaseous ammonia. The nitrogen retention achieved by the method of this invention contrasts with traditional waste treatment methods which allow for a significant release of ammonia. In these traditional operations, release of ammonia may account for a significant loss of the nitrogen initially contained in the organic waste, an ammonia loss that can be about 70%. Furthermore, the capture of ammonia can be increased according to the methods of this invention by reacting ammonia with acids such as sulfuric and phosphoric acids.

Another object of this invention is the manufacture of a pathogen-free, odor-free and dust-free black fertilizer product.

Additional objects, features and advantages of this invention will become apparent to persons of ordinary skill in the art upon reading the remainder of the specification and appended claims and upon referring to the attached Figures, or may be learned by the practice of the invention as set forth hereinbelow.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
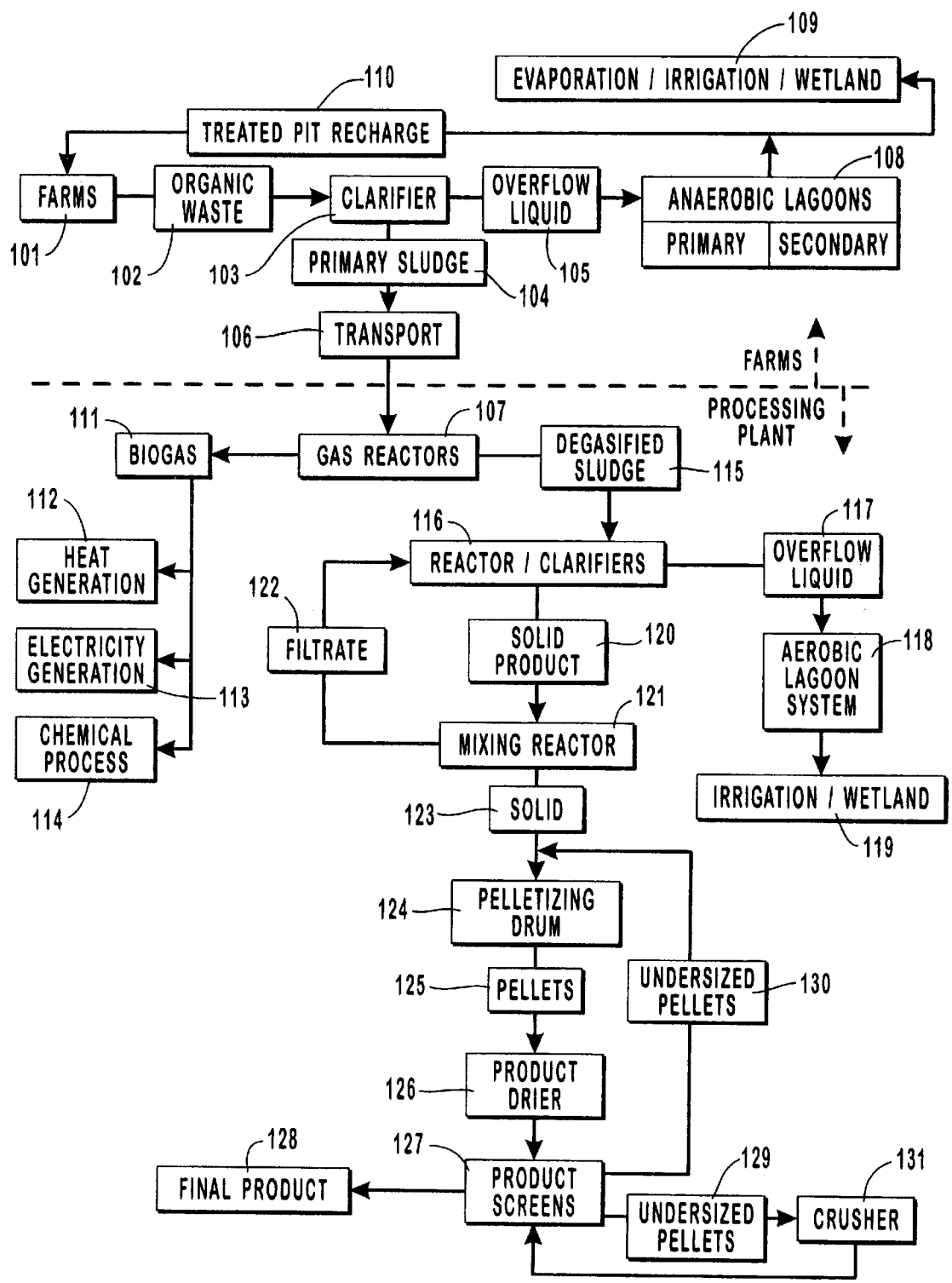
FIG. 1 shows a block diagram of the main steps of an exemplary embodiment of the organic waste treatment and commercial fertilizer production process of the invention.

The present invention is directed to methods and systems for the separation of components such as purified water and nutrient materials from organic waste. Forms of organic waste envisaged within the scope of the present invention include organic waste such as hog farm waste and organic waste processing effluents. The methods and systems of the present invention are devised to process organic waste that comprises settleable and nonsettleable material. This material includes matter in forms such as suspended and dissolved solids, colloids, and fine solid residue of predominantly organic origin. In addition, some embodiments of the present invention comprise digesting operations.

Forms of organic waste treated according to the methods and systems of this invention pose specific problems due to the complexity of their chemical composition and physical form of their constituents. These problems are not exhibited by other waste materials, such as brackish water, aquifer water oil and gas production water, and supernatant solutions obtained from the primary lagoon treatment of organic waste because of their comparatively simpler constitution. The complex organic waste treated according to this invention includes forms of setteable and nonsettleable materials such as suspended and dissolved solids, including fine solids of predominantly organic origin, various biomaterials and bio-related materials, various inorganic materials and their complexed and combined forms with the bio and bio-related materials, such materials being present in the complex organic waste in a variety of amounts and aggregation and phsyicochemical forms such as solution, suspension, and colloidal forms.

These characteristics of the complex organic waste treated according to the present invention render the separation of purified water and nutrient materials from organic waste a particularly complex problem. Furthermore, the special and complex chemical and physical characteristics of the organic waste processed according to the methods and systems of this invention distinguish such feed fluid from other feed fluids such as brackish water, river water, aquifer water, oil and natural gas production water, sea water, and supernatant solutions obtained from the primary lagoon treatment of organic waste. The distinguishing features are not merely in the amount or extent of one class of dissolved components, such as salts, but in the nature or kind of the fluid to be processed.

In addition to hog farm effluents, other organic waste forms that are treated with embodiments of the methods and systems of the present invention include organic waste from sources such as other animal confinement facilities, lagoons used to store and/or treat farm liquid waste, dilute packing house fluids, dairy and feedlot runoff, and organic waste and waste processing effluents such as those encountered at the various stages of processes such as those described in U.S. patent application Ser. No. 09/235,461 filed Jan. 22, 1999, now U.S. Pat. No. 6,409,788 B1 and U.S. patent application Ser. No. 10/139,827, filed on May 7, 2002, in the name of Larry P. Sower, collectively referred to herein as "Fertilizer and Feed Supplement Production" and in U.S. patent application Ser. No. 09/595,702, filed Jun. 16, 2000, in the name of David Allen Townsend, James H. Freiss, Joel Willis Sneed, Brian Paolsen, and Alfred Stewart, entitled Animal Waste Management System and Method Thereof (hereinafter referred to as "Internal Recycling System" or "IRS"), all of which applications and patent are incorporated herein by reference in their entirety.

It follows from the following description of illustrative embodiments of the present invention that nutrients and purified water are recovered from organic waste without resorting to conventional primary treatment of the organic waste. This conventional primary treatment relies on the holding of the organic waste in lagoons right after it is obtained from the farms, and it is also known as lagoon primary treatment. Conventional primary treatment leads to a sediment that is typically discarded in the form of land application and a supernatant solution whose physical and chemical characteristics are entirely different from and considerably simpler than those of the organic waste feed fluid that is treated according to the present invention.

The supernatant solution obtained from the lagoons in the conventional primary treatment is obtained after various aerobic and anaerobic processes have changed the physical and chemical composition of the waste. In doing so, however, big volumes of gases are released into the atmosphere, large surface areas are occupied by the primary treatment lagoons, and large masses of sediments are accumulated and discarded as land application. This conventional practice has come under increasing scrutiny because of its detrimental environmental consequences.

The treatments in the recycling and/or process plants in embodiments of this invention permit organic waste treatment without resorting to primary treatment and avoid the drawbacks of the conventional primary treatment practice. The organic waste obtained from such recycling and/or process plants is still a complex organic waste that includes setteable and nonsettleable materials such as suspended and dissolved solids, including fine solids of predominantly organic origin, various biomaterials and bio-related materials, various inorganic materials and their complexed and combined forms with the bio and bio-related materials, such materials being present in the complex organic waste in a variety of aggregation and phsyicochemical forms such as solution, suspension, and colloidal forms.

The term "directed" is used in the following examples in relation to matter flow direction. It is understood that this term refers to an appropriate transport or to an appropriate cause of flow of the matter to which it is applied. For example, when a fluid is directed from A to B, this expression means that the fluid either flows from A to B by gravity or by appropriate pumping. Because pumping and related causes of flow are within the U ordinary skill in the art, no further discussion of this matter is provided here.

The illustrative embodiments of the invention exemplify the application of the useful characteristics discussed below, and further reference to these and other useful and novel features is made in the following discussion of each illustrative embodiment. One embodiment of the organic waste treatment and fertilizer production process is represented by the block diagram in FIG. 1. This and other exemplary embodiments are intended to limit neither the scope of the processes nor the apparatuses or materials that are needed for performing the processes.

Referring to FIG. 1, organic waste 102 produced at an organic waste source that in particular can be farms 101 is clarified in clarifier 103. In particular, this organic waste source can be pig farms, but the process steps shown in FIG. 1 are not limited only to the treatment of organic waste produced in pig farms.

The clarification in clarifier 103 can be effectively accomplished by treating the organic waste with a flocculant. Flocculants, whether alone or in mixtures, include inorganic compounds such as iron and aluminum compounds, whether solid or in solution, lime, which is sometimes used as a coflocculant, and organic products such as chitosan and other natural products including starch, guar gum and protein colloid such as gelatin and animal glue. Examples of preferred iron and aluminum compounds used as flocculants include aluminum sulfate, iron (III) chloride, and iron (II) sulfate. One of the benefits of using lime is that some of the bases in it, such as calcium hydroxide, eliminate pathogens in the organic waste. In the context of this invention, lime generically describes bases that include calcium compounds, whether in the form of oxides, hydroxides or carbonated, mixtures thereof, and it might contain similar compounds, the most common of which are the corresponding magnesium-based compounds. Depending on the organic waste source location and the type of activities developed therein, preferred flocculants can typically be obtained at or near farm sites from natural sources, in which case their use leads to considerable cost reduction. They can also be obtained commercially, together with synthetic organic flocculants that are usually polymeric materials. Synthetic organic flocculants can be anionic, cationic and nonionic, and they are useful when the flocculating conditions impose some operational restrictions such as pH sensitivity or resistance to some chemicals. Cationic polyacrylamide emulsions are preferred in the methods of this invention as flocculants. Among cationic flocculants such as those marketed with the designations NALCO7191, NALCO7193, NALCO7194, NALCO7196, CYTEC2085, and CHEMAX2746, the flocculants NALCO7191 and NALCO 7193 are preferred, with NALCO7191 being more preferred. The preferred flocculants in this invention are preferably used in emulsions at concentrations of about 1 g/l.

Two products are extracted from clarifier 103: primary sludge 104 and overflow liquor 105. In this context, the terms clarification, sedimentation, coagulation, and flocculation are used synonymously to signify the separation of material that in the absence of the indicated treatment would remain in the liquid phase. For example, a significant amount of the material in primary sludge 104 that is separated in clarifier 103 would remain in the overflow liquor 105, also called liquid waste, in the absence of clarification in clarifier 103. The non-liquid material in clarifier 103 includes settleable and nonsettleable substances and it becomes part of primary sludge 104. Nonsettleable material comprises material that would take a very long time to settle and material that would not settle in the absence of a flocculant or an agent that induces the formation of nucleation centers. Suspended solids in the organic waste are an example of settleable material, and organic matter in colloidal form in the waste is an example of nonsettleable material.

The separation of primary sludge 104 from overflow liquor 105 can be accomplished by methods such as industrial vacuum filtration, by means of devices such as a screw press or a belt press, or by combining these and other methods and devices that are conventionally used in similar separation processes. The use of clarifier 103 increases the amount of solid material in primary sludge 104 from 20% to 50% solids compared to a system without a clarifier. This increased recovery of solid material is accomplished in the present invention because nonsettleable, in addition to settleable, material is separated in clarifier 103. This solid material is rich in nitrogen, phosphorous and it would lead to biogas emissions if it were discharged with the overflow liquid 105 into anaerobic lagoons 108.

Primary sludge 104 is transported by sewer lines and/or motorized means of transportation 106 to gas reactors 107 in a processing plant. The extensive separation achieved in clarifier 103 plus the suitable means of transportation 106 permit the implementation of the waste treatment and fertilizer production process of this invention at any convenient location, whether such location is the organic waste source site itself or another site away from the organic waste source. This versatility is indicated in FIG. 1 by a horizontal dash line that divides the block diagram into an upper part and a lower part. The upper part of the diagram schematically describes processes that can take place at the organic waste source site itself The lower part of the diagram schematically describes processes that can take place either at the organic waste source site or at another location such as a near or remote processing plant location.

Overflow liquor 105 is delivered to anaerobic lagoons 108. Because a high fraction of the material in organic waste 102 is separated as primary sludge 104 in clarifier 103, and only the overflow liquor 105 is fed to lagoons 108, loading of these lagoons 108 is considerably less than the loading that they would withstand in a current state-of-the-art process with no clarifier. According to conventional disposal methods, organic waste is delivered from organic waste sources 101 directly to the conventional counterpart of anaerobic lagoons 108, which are in effect natural digesters that produce biogas that is usually released into the atmosphere. In contrast, clarifier 103 permits the separation of an overflow liquor 105 that is mostly free of solids, colloids, methane, and acrid gases. Equivalently, the embodiments of this invention permit the efficient recovery of biogases from primary sludge 104 that is obtained from clarifier 103, whereas conventional state-of-the-art processes release biogases into the atmosphere or less efficiently recover them.

Anaerobic lagoons 108 usually include a system of primary lagoons where a mostly biological treatment occurs, and a system of secondary lagoons where the volume of liquor is reduced. Means of carrying out the biological treatment include anaerobic digestion. Liquor volume reduction in the system of secondary lagoons can be accomplished by processes such as evaporation, use of gray water for irrigation or fertilization of crops, and support of constructed wetlands. In essence, the treatments in anaerobic lagoons 108 are such that the products discharged from these lagoons meet sewer conservation service standards. The diminished load of anaerobic lagoons 108 allows lagoons that are 60% smaller than the corresponding anaerobic lagoons used in current state-of-the-art methods.

The liquor treated in anaerobic lagoons 108, concisely "the anaerobic effluent", can be evaporated or used in irrigation or wetland projects 109 and it can also be reused at farms 101, and more generally in organic waste sources. For example, the anaerobic effluent can be recycled as treated pit recharge 110 which is used for flushing. As indicated above, while clarifier 103 and anaerobic lagoons 108 are preferably built and operated at the same site where organic waste sources 101 are located, the rest of the constituent elements of the process, starting by gas reactors 107, can be built and operated at the organic waste source sites or at some other convenient location.

Methane-rich biogas 111 is separated in gas reactors 107 from primary sludge 104 to produce degasified sludge 115. Although the amount and composition of the biogas recovered depends on a variety of factors such as the type of farm animals and the feed supplied to them, biogas with a heat of combustion of about $2.2 \cdot 10^4 – 2.6 \cdot 10^4$ kJ/m$^3$, (about $5.4 \cdot 10^3 – 6.2 \cdot 10^3$ kcal/m$^3$ of about 600–700 Btu/ft$^3$) may typically be recovered from gas reactors 107. The composition of this biogas is mostly methane and carbon dioxide, and it is recovered from gas reactors 107 in an amount of about 0.4 m$^3$/(h·100 animals), (about 14 ft$^3$/(h·100 animals)).

In contrast, the heat of combustion and the amount of biogas recovered by current state-of-the-art methods in facilities holding similar animals under similar conditions are comparable to the corresponding parameters for existing digesters, if biogas is recovered at all. For example, the report by L. M. Safley, Jr., et al., *Low Temperature Lagoon Digester for Biogas Production from Swine Manure*, FIG. 18, and summary, pp. 12–13, shows that the biogas production in a conventional low temperature lagoon digester at a facility holding 11494 pigs did not exceed about 0.12 m$^3$/(h·100 animals), (about 4.2 ft$^3$/(h·100 animals)) and some measurements indicate that practically no biogas was recovered some days. Furthermore, the biogas production fluctuated considerably between 0 and about 0.12 m$^3$/(h·100 animals), (0 and about 4.2 ft$^3$/(h·100 animals)). These fluctuations were observed when the average lagoon temperatures changed in an interval of about 7.2° C. (about 13° F.), from about 10° C. (about 50° F.) to about 17.2° C. (about 63° F.). The reported mean biogas production was about 0.054 m$^3$/(h·100 animals), (about 1.92 ft$^3$/(h·100 animals)) with a heat of combustion of about $3.05 \cdot 10^4$ kJ/m$^3$, (about $7.29 \cdot 10^3$ kcal/m$^3$ or about 817.6 Btu/ft$^3$). These figures indicate that current state-of-the-art lagoon facilities like the ones considered in the study by L. M. Safley, Jr., et al. (cited above), recover comparatively little biogas. Furthermore, these conventional anaerobic digesters do not focus on the capture of greenhouse and ozone depleting gases that embodiments of the present invention recover, for example, by the separation that takes place in clarifier 103.

For exemplary purposes, gas reactor 107 can be implemented as a system that comprises large, gently stirred, processing vessels. Whether alone or as part of a more complex mixture, this separated biogas 111 can be used for heating 112, electricity generation 113, or other processes such as chemical processes 114 that include synthesis and catalytic conversion. In particular, thermal and electric energy generated by combustion of the separated biogas can be used in a fertilizer processing plant, farms, or in applications near the processing plant where the biogas 111 is produced in reactors 107.

Degasified sludge 115 from gas reactors 107 contains most of the nitrogen and phosphorous that were initially in organic waste 102. The amounts of nitrogen and phosphorous in the degasified sludge 115 are respectively about 200% and 100% greater than the corresponding amounts recovered according to current state-of-the-art methods because of the way in which primary sludge 104 is separated from organic waste 102, and because of the incorporation of zeolites into the feed supplied to animals in farms 101 or added to the initially generated organic waste. Degasified sludge 115 is subsequently fed into reactors and clarifiers 116 together with one or more of the following agents: an ammonia retaining agent, such as a suitable natural or synthetic zeolite, a precipitating agent, such as magnesium chloride or a suitable brine, a densifier, such as clay, fly ash, bentonite, crushed limestone, zeolite, perlite and mixtures thereof, and a pH control agent, such as lime.

The terms "retain", "retaining" and "retention" are herein used to refer to retention of a gas or gases by a substance, whether the retention is accomplished by absorption, by adsorption or by a combination of adsorption and absorption. Thus, for example, an "ammonia retaining agent" stands for a substance that retains ammonia and prevents its escape from the medium as a gas whether the species predominantly retained by the ammonia retaining agent is ammonia itself or ammonium ions.

The specific reference to magnesium chloride is not limiting, but merely illustrative. Any other compound such as magnesium sulfate that precipitates phosphate as a salt that is a fertilizer or any combination of such precipitating compounds can be used instead of, or in combination with, magnesium chloride.

Clinoptilolite, a natural zeolite, is an example of an efficient and preferred ammonia adsorbing zeolite that can be used to treat the sludge that is discharged from the gas reactors. The use of ammonia adsorbing zeolite in the nutrient recovery process permits the reduction of acrid odors. In addition, odor can be controlled more effectively if an ammonia adsorbing zeolite is added to the livestock feed. The choice of preferred zeolites in this invention is also determined by the required characteristics of the fertilizer that is produced from the organic waste. For example, K—Ca clinoptilolites are excellent for soil conditioning as opposed to Na clinoptilolites. Other zeolites that retain ammonia include chabasite and phillipsite. Because natural sources of zeolites sometimes contain mixtures of zeolites instead of one single zeolite and some zeolites share several common characteristics, the term "zeolite" in this context will refer to one zeolite and also to a mixture of zeolites with desired properties. Analogously, reference to a specific zeolite by name in the context of this specification and appended claims is to be understood as referring to named specific zeolites and also to a mixture of zeolites with the desired properties in which the specifically named zeolite is a significant component.

Fly ash is an example of a densifier that can be used in the treatment of the same sludge. The pH in this treatment can be controlled, preferably to a value between about 9 and about 12, more preferably between about 10 to about 11. A residence time of about two hours in a medium with a pH of about 10.5 leads to significant reduction or almost elimination of the pathogen content of the organic waste being treated. A higher pH of about 12 leads to pathogen content elimination in a shorter time period. Consequently, exclusive reliance on the medium basicity for pathogen content elimination requires a higher preferred pH value of about 12.

When a base has to be added to control the pH, lime is a preferred base for this purpose. Fly ash can also perform as a total or partial replacement of lime for controlling the pH in this process step. Furthermore, replacing lime for fly ash may be economically advantageous depending on the relative availability of these substances.

Magnesium chloride from brine, fly ash from coal burning power plants, and lime are explicitly and exemplary referred to in this context because of the availability of these materials in some geographic locations. Their use in these locations makes the organic waste treatment and fertilizer and feed supplement production according to this invention particularly economical. In addition, the process utilizes fly ash, which is an industrial waste that should otherwise be disposed of. Nevertheless, fly ash is not the only substance that can be used as a densifier. Bentonite, for example, is another product that can be used as a densifier instead of, or in combination with, fly ash. This versatility is important because some industrial sources might produce fly ash that is not appropriate for its direct use in the manufacture of fertilizer. This would be the case, for example, if fly ash had an unacceptably high concentration of heavy metals.

The increased sludge density achieved according to this invention influences the size of the equipment used in the treatment process. Specifically, the size of the equipment needed in this invention is reduced when compared to the size of conventional equipment because of the increased density, or equivalently reduced volume, of the sludge.

Typical reactors and clarifiers 116 are modifications of standard industrial equipment used in waste water treatment, chemical processing and mineral processing. As to the proportions of the ammonia retaining agent, precipitating agent, densifier, and pH control agent, exemplary compositions referred to dry organic waste include about 5%–10% by weight of ammonia retaining agent, about 1% by weight of precipitating agents, between about 0% and about 10% by weight of densifier, and about 0.5% by weight of a suitable pH controlling agent, although the actual percentages depend on the type of waste and its composition. Modifications to these proportions can be made according to knowledge common to those with ordinary skill in the art.

Unless expressly indicated otherwise, and as is customary in the art, concentrations given herein in the form of a percentage are understood to refer to weight percentages. For example, the expression "x % of total solids" is to be understood as referring to a material that comprises x mass units of total solids in 100 mass units of such material, wherein the masses of x and material are given in the same type of mass unit, such as both given in kg or both given in lb.

Sludge 115 from gas reactors 107 may contain zeolites if these aluminosilicates are incorporated previously in the process; for example, they can be added to the feed supplied to the animals in farms 101 for the purpose of more effectively reducing acrid gas emissions from the animals' gastrointestinal tracks. Furthermore, the addition of zeolites to the feed supplied to the animals in farms 101 has beneficial effects such as an improved waste slurry processing and densification, and considerable improvement of the confined animals' living conditions.

The overflow liquid 117 from the system of reactors and clarifiers 116 is fed to an aerobic lagoon system 118, which produces a liquid, or "aerobic effluent", that meets current EPA discharge standards and that can be used in irrigation and wetland projects 119. To this end, overflow liquid 117 in the aerobic lagoon system 118 undergoes processes that include digestion and evaporation. Other beneficial features that distinguish the aerobic lagoon system 118 and the liquid therein produced from their counterparts in current state-of-the-art treatment methods include the minimization of sludge generation and a significant reduction in odor production.

The solid product 120 from the reactors and clarifiers 116 contains precipitated hydrous phosphates, including magnesium ammonium phosphate. This solid product 120 is fed to a mixing reactor 121, such as a Trommel drum, and is therein mixed, if so desired, with other compounds that incorporate additional plant nutrients to the mixture. These added compounds can include commercial fertilizers of substandard grades. In one of the exemplary embodiments of the mixing reactor 121, a filtrate 122 and a solid 123 are separated.

In another embodiment of the present invention, phosphates, including magnesium ammonium phosphate, can be recovered by a process known as a RIM-NUT process, or a variant thereof. Because the implementation of this process requires higher operating costs, it is not considered a preferred embodiment of this invention, particularly when applied to organic waste that does not contain toxic metals and other pollutants. A RIM-NUT process, however, could be part of a preferred embodiment of this invention if it were applied to the treatment of, for example, municipal waste with constituents that would be agrotoxins if they were incorporated into the fertilizer.

Specifically, the compounds added in mixing reactor 121 permit the standardization of the fertilizer composition to include nutrients in the following three classes: primary, as nitrogen (N), phosphorous (P), and potassium (K); secondary, including calcium, magnesium, and sulfur; and micronutrients, including iron, manganese, copper, zinc, boron, and molybdenum. Standardization is accomplished by analyzing the product 120 according to analytical methods that are commonly accepted in the industry, determining the lowest cost compositions for supplements to produce specific formulations of fertilizers, and then incorporating the primary and secondary plant nutrients and micronutrients in proportions suitable to satisfy specific market demands. Forms of commercially available plant nutrients that can be incorporated into the fertilizer include anhydrous ammonia, phosphoric acid, diammonium hydrogen phosphate, triple super phosphate, potassium nitrate and potassium sulfate. Other materials can also be added at this stage of the process if the fertilizer market demand so requires. These materials include zeolites and/or perlites for purposes such as soil amendment, micronutrients, and binding and/or dedusting agents. This process allows the production of fertilizers tailored to specific market needs, including most standard grade compositions such as those sold as 10-10-10 and 20-10-5, where each one of these sets of numbers is a conventional expression of the fertilizer composition on a weight basis. For example, a 10-10-10 fertilizer is a fertilizer with 10% nitrogen as N, 10% phosphorous as $P_2O_5$, and 10% potassium as $K_2O$. Furthermore, the process of the present invention is versatile enough to produce a great variety of fertilizers, including slow release fertilizers, that can meet the demands and standards of a great variety of markets.

Filtrate 122 from mixing reactor 121 is fed back to reactor/clarifiers 116, whereas solid 123 is delivered to a pelletizing drum 124. Pellets 125 are subsequently dried in dryer 126 and their size is standardized by means of screens 127 that separate standard fertilizer 128 from the oversized and undersized pellets 129 and 130, respectively. In one preferred size control system, oversized pellets 129 are sent to a crusher 131, which delivers the crushed pellets back to screens 127 whereas the undersized pellets 130 are recycled back to pelletizing drum 124. The pelletizing drum, product drier, product screens, and crusher are standard devices widely used in the formulation of mixed fertilizers. For example, in an embodiment of this invention product screens 127 are embodied by a vibrating screen system and crusher 131 is embodied by a Stamler crusher.

When the pathogenic contents have not been entirely removed by strong bases in clarifier 103, however, the pelletizing and separating operations perform necessary functions such as the elimination of residual pathogenic organisms, which is accomplished during the drying of the processed manure at product temperatures as close to 100° C. as possible. Temperatures significantly above 100° C. are not recommended because struvite begins decomposing at about 100° C. and its decomposition would cause a significant loss of ammonia. Nevertheless, the pathogenic contents in pellets 125 may be very low or even nonexistent when strong bases, such as calcium hydroxide, are used in clarifier 103.

The final product 128 is an organic based, granular, slow release NPK (nitrogen-phosphorous-potassium) fertilizer of standard composition and size with micronutrients that is readily available to plants. The process shown in FIG. 1 can absorb the organic waste produced by sources that range from small to large scale operations. For example, the process shown in FIG. 1 can be implemented in farms that hold over 100,000 pigs, even as many as one million pigs or more. In particular, the process can be implemented in facilities under current federal regulations for large scale confinement operations.

Because the embodiments of this invention do not require that the processing plant be located at the site of the organic waste source, the amount of waste produced by a single source is not a limiting factor of the invention. If single organic waste sources are individually small scale operations, the elements 102–106, 108–110 in the diagram shown in FIG. 1 can be part of each single small scale organic waste source and a processing plant can absorb primary sludge 104 generated by a plurality of small scale organic waste sources. This feature makes the present invention versatile in the sense that it can be implemented in areas of very diverse characteristics. Accordingly, embodiments of this invention can be implemented to accommodate factors such as the size and the number of animals in local confinement operations, particularly when these factors are constrained by tradition, regulations, or economic imperatives.

Because of their standard technical and operational requirements, embodiments of elements 102–106 and 108–110 can easily be retrofitted in existing small farms, or embodiments of the entire process illustrated in FIG. 1 can be built in existing farms. Similarly, elements 102–106 and 108–110, or the entire process represented by the exemplary diagram in FIG. 1, can be built at an organic waste site that is destined for closure or cleanup. The embodiments of the present invention do not require that the organic waste source be a live animal confinement facility. Furthermore, the process represented by the diagram shown in FIG. 1 can equally treat organic waste or material contaminated by organic waste from remote sources, such as farms and animal confinement facilities that are currently operated under conditions that are not subject to the objectives of the present invention.

When an embodiment of the processing plant according to this invention is not located at the same site as the organic waste source, sludge transportation can be achieved in different ways. If the amount of sludge is large enough, and the processing plant is not so far from the organic waste source that pumping is prohibitively costly, then sludge transportation by pumping is preferred. Sludge is then preferably pumped at about 5% solids from a sludge storage pond at the organic waste source to the process plant in a preferably pressurized system. It is understood that the fraction of solid matter in the pumped sludge can widely depend on the type of pumps and other characteristics of the transportation system elements, as is known to those with ordinary skill in the art.

Sludge storage pond pumps are preferably grinder-type pumps, although pumps with rotating components could also be used provided that the sludge is free from objects that would clog pumps with rotating parts. In an exemplary embodiment of this invention applied to a large scale operation, the combination of sludge storage pond pumps and booster pumps preferably provides a sludge flow to the processing plant of about 54.6 l/s (about 865 gal/min) in piping that preferably is plastic piping, such as high density polyethylene piping.

The diagram shown in FIG. 1 also teaches an exemplary way of implementing a large scale integrated waste treatment system according to the present invention. This system treats waste in its solid, liquid, and gaseous forms, prevents the release of unacceptable forms of the waste produced by organic waste sources and other sources into the environment, and recovers from the waste its agronutrients and energy rich components. The recovered agronutrients and energy rich components are made available for subsequent in-situ use or for their commercial distribution in forms that meet environmental regulations and that satisfy agricultural needs and demands. FIG. 1 also teaches an exemplary way of building an integrated waste treatment and fertilizer production system according to this invention, whether this system is built during farm construction, or to retrofit existing farms, or as a stand alone operation destined to absorb waste generated in a plurality of organic waste sources. With this versatility, the present invention is suitable for a variety of business strategies and goals, ranging from those that focus on farm construction and operation savings to those that aim at independent business profitability. Because of this adaptability to many business strategies, the integrated waste treatment and fertilizer production process of this invention should be expected to replace current waste treatment or fertilizer production processes that rely on single unit operations.

The exemplary embodiment shown in FIG. 1 places clarifier 103 at the organic waste source site and reactor/clarifiers 116 at the processing plant site. This is only an illustration of one of the features of an embodiment of this invention, but it is not a limitation to other embodiments of this invention. For example, embodiments to be discussed below show that a reactor clarifier that can be embodied by the appropriate facilities at the organic waste site or at the processing plant site. In any one of these embodiments to be discussed below, the reaction with the flocculent, lime, phosphate precipitating agent, ammonia retaining agent, and optionally a densifier mostly takes place at a single site, either the organic waste source or the processing plant.

Figure 2:
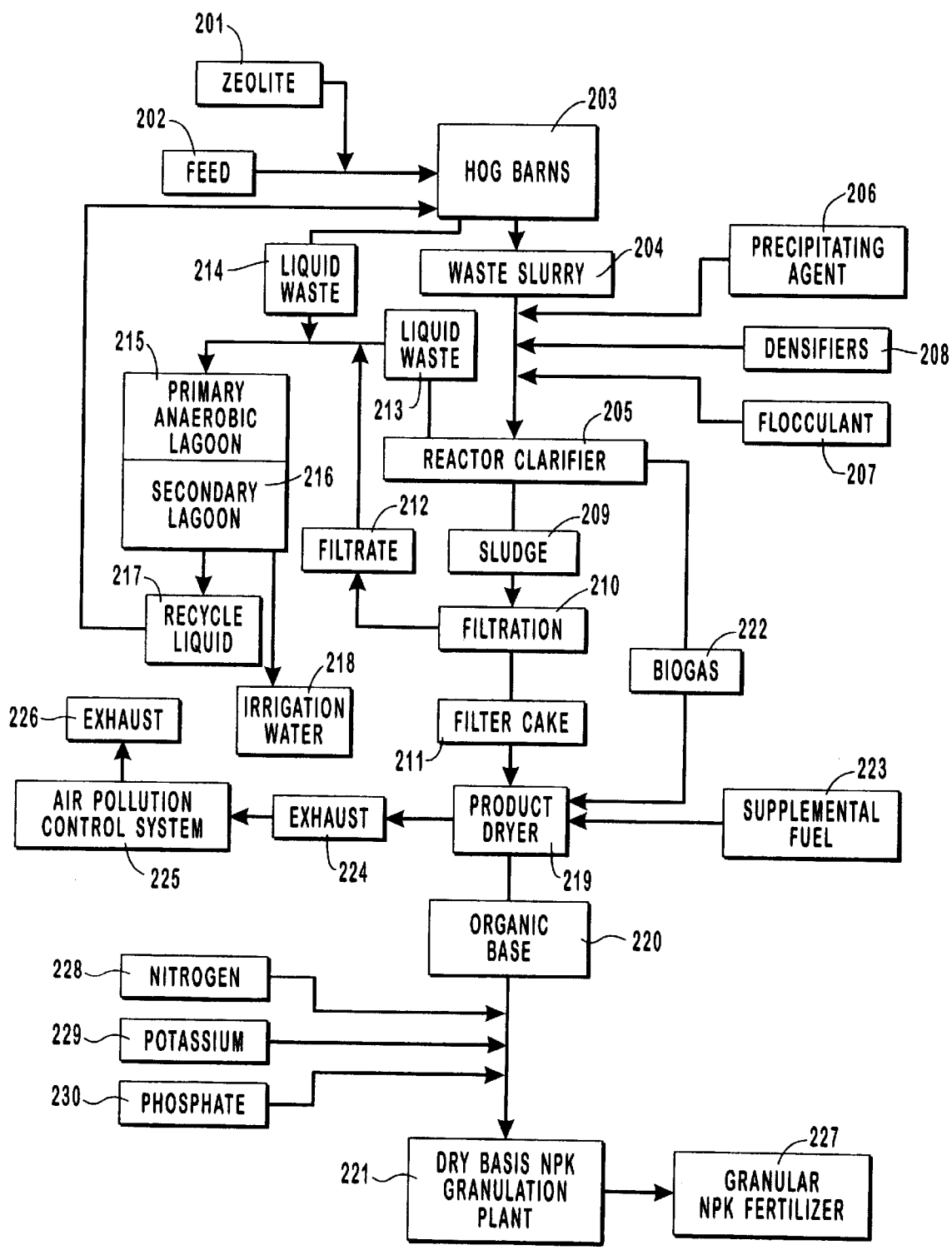
FIG. 2 shows a block diagram of the main steps of another exemplary embodiment of this invention in one of its possible applications to the treatment of waste generated in hog barns.

The block diagram shown in FIG. 2 represents another exemplary embodiment of the present invention. The embodiment represented in FIG. 2 exemplifies a waste management and fertilizer production process for a hog farm complex, although it could equally be applied to another type of organic waste source, such as a farm with a different type of confined animals. As shown in FIG. 2, ammonia adsorbing zeolite 201, or an ammonia adsorbing mixture of zeolites, is added to feed 202 supplied to the hogs in barns 203. The addition of zeolite 201 to feed 202 improves air quality in barns 203 and also decreases the release of acrid gases from barns 203. In addition, it improves the feed conversion in animals and the overall herd health by providing a better environment, reducing scours and improving the handling characteristics of the organic waste. Furthermore, the incorporation of zeolite at the initial stage of the process considerably reduces the reaction time of the overall separation. Zeolite, or a mixture of zeolites, 201 can be added to feed 202 at a ratio of about 5% by weight in the feed. This amount of zeolite, however, can be varied depending on the factors that determine the amount of ammonia produced by the animals; generally, it can be added in an amount within the range of about 5% to about 10% by weight of dry organic waste.

Waste slurry 204 generated at barns 203 is subsequently treated in reactor clarifier 205, where an ammonia retaining agent can optionally be added. In this embodiment of the invention, ammonium and phosphates are removed from waste slurry 204 by mixing said slurry with a substance or mixture of substances 206 that causes the precipitation of phosphates, including struvite, from waste slurry 204 at an adequate pH, as discussed in the context of the exemplary embodiment shown in FIG. 1. Accordingly, a base, preferably lime, should be added to control the pH of the medium. This precipitating agent 206 can be, for example, magnesium chloride or magnesium sulfate, or mixtures thereof Depending on the location, available brine of suitable composition can be used as precipitating agent 206. Optionally, densifier 208 can also be added to the waste slurry 204. The addition of densifier 208 improves the clarification of waste slurry 204, the quality of the NPK fertilizer eventually produced, and the flocculation of colloids in the reactor clarifier 205. In essence, the addition of densifier 208 improves the process and product characteristics. Mineral additives or materials that are used as densifier 208 include zeolites, perlites, crushed limestone, fly ash, clays, bentonite and mixtures thereof.

Flocculant 207 can also be added to waste slurry 204. Numerous flocculants have proven effective on waste slurries, and a variety of such flocculants and their effects are given in the description of the exemplary embodiment represented in FIG. 1.

Figure 3:
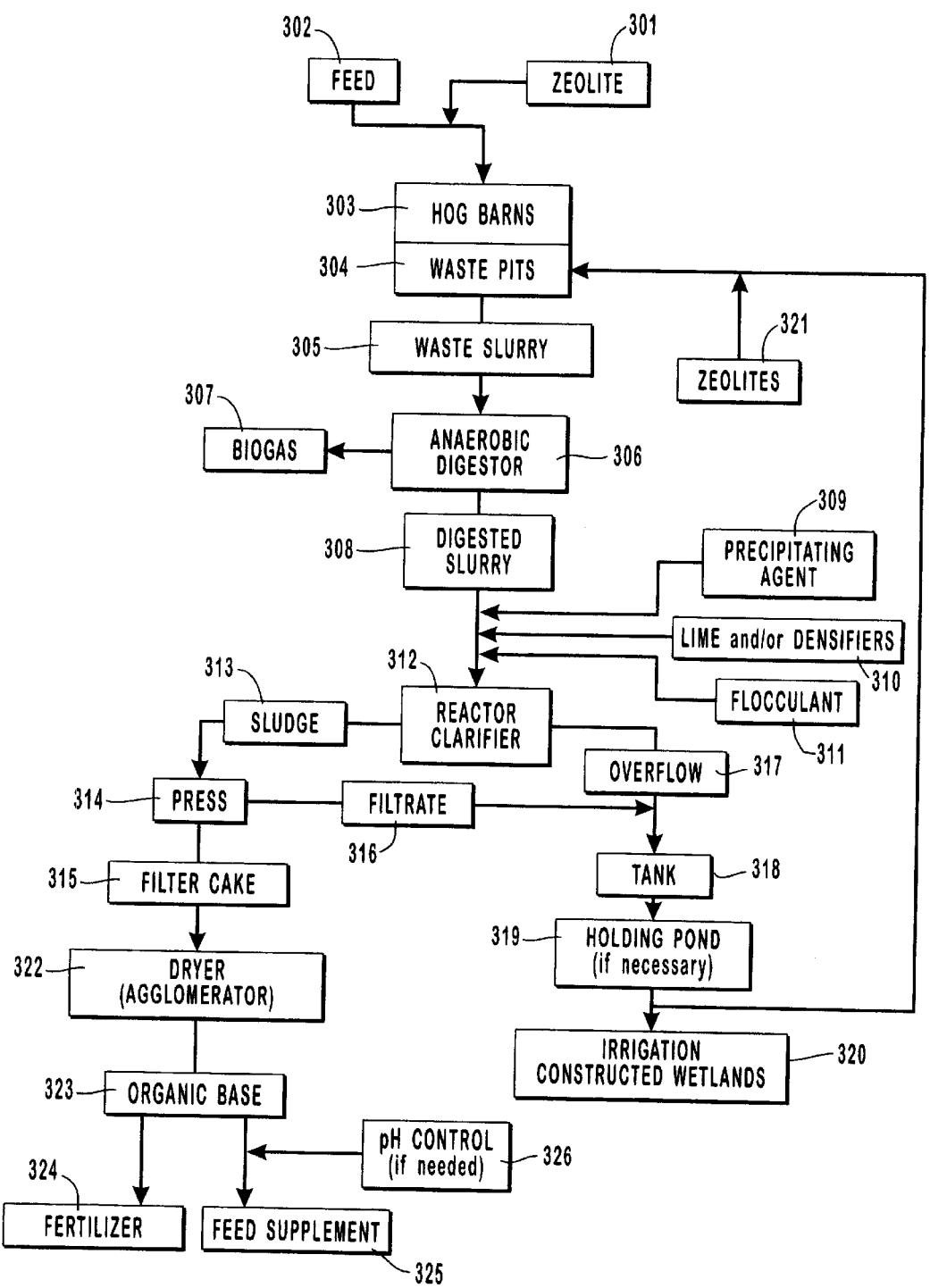
FIG. 3 shows a block diagram of the main steps of another exemplary embodiment of this invention as applied to the treatment with no lagoons of farm organic waste, and its transformation into an organic base that is further utilized as fertilizer or as feed supplement.

The embodiments of the present invention, however, and in particular the exemplary embodiment represented in FIGS. 2–3, preferably crystallize inorganic salts such as struvite; densify with porous or absorbent minerals; and flocculate the nonsettleable matter in the waste slurry either simultaneously or in individual steps that are proximate to each other. The high liquid-solid separation in the treatment of organic waste achieved by the embodiments of this invention is an unexpected result that cannot be specifically attributed to any single physical or chemical process pathway.

The inventor suspects that the high liquid-solid separation achieved in the context of this invention is in part due to the formation of a large number of nucleation centers and to the inter-relation amongst the plurality of chemical, physicochemical and physical processes that take place when the separation operations performed in the context of this invention occur in the reactor clarifier. Consequently, the present invention achieves a much better liquid-solid separation than that performed by conventional methods.

Furthermore, the separation in the present invention is accomplished at very high settling rates. This feature of the present invention leads to considerable time savings when compared with conventional separation processes.

As with the high liquid-solid separation, the very high settling rates at which the liquid-solid separation is accomplished is an unexpected result that cannot be specifically attributed to any single physical or chemical process pathway. The inventor suspects that the very high settling rates may be related to the characteristics of the separated solid material that is consequently very effectively segregated from the fluid medium. These characteristics that facilitate effective segregation and high settling rates are likely to be related in turn to the formation of a large number of nucleation centers and to the inter-relation amongst the plurality of chemical, physicochemical and physical processes that take place when the separation operations performed in the context of this invention occur in the reactor clarifier.

Because of the inter-relation among all the species that contribute to the high solid-liquid separation in the embodiments of this invention, the terms "react", "reaction" and their derivatives are generically used in the description of this invention and in the accompanying claims, as encompassing any mixing of substances.

Sludge pumped from conventional lagoons can also be treated together with waste slurry 204 in reactor clarifier 205, thus extending the useful life of existing conventional lagoons and reducing gas emissions therefrom. By implementing this operation, the present invention alleviates or even eliminates waste management problems experienced at conventional organic waste sources and increases the production of the NPK fertilizer product.

In a slightly different embodiment of the process illustrated in FIG. 2, waste slurry 204 can be separately treated in digesters and subsequently in clarifiers. In this alternative embodiment, biogas is also collected by floating or fixed covers and specially designed internal baffling is provided to prevent gas bubbles from interfering with clarification.

The phosphates precipitated by precipitating agent 206, including struvite, plus densifier 208, and the flocks precipitated by flocculant 207 are recovered from reactor clarifier 205 as sludge 209, which is in turn dewatered by a conventional screw press 210 or equivalent filtration equipment. The filtration process 210 produces a filter cake 211 and a filtrate 212.

Filtrate 212 is fed in combination with liquid waste 213 from reactor clarifier 205 and any liquid waste 214 from barns 203 into a system of lagoons, initially to a primary anaerobic lagoon 215 and subsequently to a secondary lagoon 216. Because of the extensive removal of dissolved and suspended organic and inorganic matter in reactor clarifier 205, lagoons 215–216 receive a reduced load with respect to that received by lagoons in conventional methods, and this load reduction causes in turn a reduction by about 50% of the required lagoon size. This size reduction can make anaerobic lagoons economically feasible in areas that are sensitive to space allocation strategies. Furthermore, the smaller size of lagoons such as lagoons 215–216 and their lesser loading significantly reduces the potential for water pollution.

Because of the extensive solid-liquid separation achieved in reactor-clarifier 205 and the addition of zeolite 201 to feed 202, acrid gases are incorporated into sludge 209 and subsequently into filter cake 211. Therefore, odor in particular and release of gaseous products in general, in the lagoon system 215–216 are dramatically reduced with respect to the emissions of the same type of gases from conventional lagoons. The removal of solids as sludge 209 in reactor clarifier 205 also significantly extends the useful life of the lagoon system 215–216 and the quality of the resulting effluent water. For example, expected typical useful life of lagoons 215–216 is approximately 20–40 years, significantly longer than the typical useful life of approximately 10–20 years for conventional lagoons. The effluent is discharged from the secondary lagoon 216 as recycled liquid 217 that is used again in barns 203, or as irrigation water 218.

Filter cake 211 that is produced in the filtration 210 is dried in a conventional design dryer 219. This dryer can be, for example, a rotary, fluid bed, or flash dryer, and it produces organic base 220 that is a pathogen free material subsequently fed to a conventional dry basis NPK granulation plant 221.

Biogas 222 is produced on a continuous basis in reactor clarifier 205 by ongoing anaerobic digestion. Means for capturing this biogas 222 include a floating or rigid tank cover designed to cover the clarifier and exhaust gas into a manifold that is adjacent to the overflow launder. Biogas 222 is delivered to dryer 219 for use as a primary fuel. The fuel supply to dryer 219 can be supplemented, if needed, by additional fuel 223.

Exhaust 224 from dryer 219 is preferably treated in an air pollution control system 225 and then released as clean exhaust 226. Air pollution control system 225 can be in particular a conventional baghouse.

The dry basis NPK granulation plant produces an organic based, high analysis, NPK fertilizer product 227 whose composition can be tailored for specific markets. The amount of nitrogen available in granular NPK fertilizer 227 can be controlled by incorporating into the organic base nitrogen compounds 228 such as ammonium sulfate, urea, or mixtures thereof The amount of phosphorous can in turn be controlled by incorporating phosphates 229 such as calcium phosphate. Similarly, the amount of potassium can be controlled by incorporating compounds 230 such as potassium sulfate and potassium nitrate. The desired amount of secondary nutrients and micronutrients can also be incorporated into the organic base 220 by standard methods such as adding compounds that include those that provide the micronutrients listed in the description of the exemplary embodiment represented in FIG. 1.

Although the organic base already contains densifiers 208, soil amendment properties of the granular NPK fertilizer can be further adjusted to specific needs by adding to organic base 220 materials that include zeolite, perlite, diatomaceous earth, and mixtures thereof The method of the present invention is flexible enough to produce a granular NPK fertilizer 227 that combines one or more of the following features: high availability of nutrients, slow release characteristics, soil amendment properties, low salinity, and a suitable mix of micronutrients in an organic base. This flexibility is made possible by the use of a dry basis NPK plant, which permits the selection of the low cost products that are used to produce the granular NPK fertilizer with the market analysis required by specific markets. Granular NPK fertilizer 227 is characterized as a high analysis fertilizer with natural slow release and soil amendment characteristics. These characteristics meet or exceed standards for commercial fertilizers. Furthermore, granular NPK fertilizer 227 requires no changes in existing fertilizer delivery systems.

Like the process represented in FIG. 1, the process schematically represented in FIG. 2 can easily be adapted to utilize dredged sludge from existing farms for feedstock. This capability is particularly useful in some areas (for example in North Carolina and in Iowa) for restoring useful life to lagoons that contain sludge accumulation after many years of operation according to conventional methods that do not rely on the features of the present invention.

The diagram in FIG. 3 shows another exemplary embodiment of the present invention. In particular, the embodiment represented in FIG. 3 exemplifies another waste management, fertilizer and feed supplement production process for a hog farm complex; although it could equally be applied to another type of organic waste source, such as a farm with a different type of confined animals. As shown in FIG. 3, ammonia adsorbing zeolite 301, or an ammonia adsorbing mixture of zeolites, is added to feed 302 supplied to the hogs in barns 303. Whether collected directly by, for example, flushing or collected from waste pits 304, waste slurry 305 is optionally digested in anaerobic digestor 306 to produce biogas 307 and digested slurry 308. Anaerobic digestor 306 can be embodied by a conventional digestor used for collecting biogas such as a digestor that comprises a tank and a receptacle for collecting released gas, a series of composting beds, or even a thermophillic digestor. Biogas 307 is used as described in the discussion of the exemplary embodiments shown in FIGS. 1 and 2.

As shown in FIG. 1, biogas 111 is recovered in this exemplary embodiment in gas reactors 107 after the separation in clarifier 103 by flocculant and prior to the reactions with phosphate precipitating agent and a base in reactor/clarifiers 116. In the exemplary embodiment shown in FIG. 2, biogas is recovered from reactor clarifier 205, whereas biogas is recovered in the exemplary embodiment shown in FIG. 3 from anaerobic digestor 306 prior to the reactions at reactor clarifier 312. These features of these exemplary embodiments of the optional biogas recovery system in this invention illustrate another versatile feature of this invention, which does not require a unique order in the performance of some of the steps in the organic waste treatment and fertilizer and feed supplement production methods.

Typically, a batch of waste slurry 305 is digested for about fourteen days in anaerobic digestor 306. Digested slurry 308 is then fed, together with phosphate precipitating agent 309, lime and/or densifier 310 and flocculant 311 to reactor/clarifier 312. Optionally, an ammonia retaining agent such as a zeolite can also be added to reactor/clarifier 312. Phosphate precipitating agent 309 can be embodied by a magnesium salt such as magnesium chloride, magnesium sulfate or a mixture thereof When a densifier is included with material 310, a preferred densifier is fly ash, and it may also or alternatively include any of the materials that can be used as densifiers and that have been introduced in the discussion of the preceding Figures. Materials 309-311 can be supplemented by other densifiers 208 and precipitating agent 206 as discussed in the context of the exemplary embodiment shown in FIG. 2. Also, reactor/clarifier 312 can be a single unit or separate units. When compared to the size of clarifiers used in conventional operations, the size of the clarifier required by this invention is much smaller because of the fast settling rates accomplished through the induction of a large number of nucleation centers upon addition of materials 309–311.

In the embodiments of this invention, the ammonia retaining agent, and in particular zeolite, is a substance that can be added, and is preferably added, in at least one of the several steps of the organic waste treatment method. The added ammonia retaining agent is destined to become part of the final feed supplement and/or fertilizer produced according to this invention.

When the organic waste is mostly fresh manure and it is treated according to the exemplary embodiment shown in FIG. 3 or an equivalent thereof, digested slurry 308 may contain an excess of ammonia that is preferably bound by adding an acid, more preferably phosphoric acid, after the addition of magnesium salts 309 and lime and/or fly ash 310. The amount of acid to be added, and in particular the amount of phosphoric acid to be added, is the necessary amount to approximately stoichiometrically bind the excess ammonia. This amount can easily be determined by analytic techniques for quantitatively analyzing ammonia that are known to those with ordinary skill in the art. Preferably, the phosphoric acid is added after the addition of the magnesium salt and prior to the addition of a base such as calcium hydroxide. Nitrogen in a slurry as ammonia and ammonium species combined can be determined with a Technicon Autoanalyzer II (sold by Bran and Luebbe GmbH). The total amount of nitrogen can be determined by the Kjeldahl method, which can be performed with, for example, a Kjellfoss 16200 instrument. Slurry dry matter can be determined gravimetrically after oven drying at 80° C. for 24 hours. Bulk pH of the slurry can be determined by means of a plurality of devices, and in particular with a standard electrode. Total phosphorous and other species can be determined according to methods described in *Standard Methods for the Examination of Water and Wastewater*, American Public Health Association, 17th ed., APHA, Washington D.C., 1989.

Whether the capture and extraction of plant nutrients from the organic waste is performed by means of clarifier 103 and reactor/clarifiers 116 as shown in FIG. 1 or by means of reactor clarifier 205 or 312 as shown in FIGS. 2–3, the use of ammonia retaining agent such as zeolites, flocculant, phosphate precipitating agent and optionally densifier leads to the effective capture of ammonia and phosphorous compounds that otherwise would be released to the atmosphere or would be part of discharged effluent. In particular, the organic waste treatment methods of this invention lead to the effective capture of phosphorous despite its presence in organic waste in a plurality of forms. For example, phosphorous in untreated swine lagoon effluent can be on average about 70% dissolved phosphorous and about 30% phosphorous in sediments, and it is typically found as both organic and inorganic phosphorous. The methods of this invention permit the effective removal of phosphorous from the effluent that can later be used for irrigation, wetland projects or recycled for its use at the organic waste source site.

In applications where high conversion of organic phosphorous to inorganic phosphorous is desired, an optional digestor can be used for such conversion prior to the waste treatment in reactor/clarifier 116, reactor clarifier 205 or reactor clarifier 312. This conversion can be achieved by a digestor such as a conventional digestor used in municipal waste treatment plants.

Sludge 313 produced in reactor/clarifier 312 is pressed in a press unit 314 which produces a filter cake 315 and a filtrate 316. Press unit 314 may be, for example, a belt press or another device that conventionally performs an analogous function. This filtrate 316 and overflow liquid 317 from reactor/clarifier 312 are optionally discharged into tank 318 where they are kept for about two days under aerobic conditions. Optionally, fluids 316 and 317 are subsequently discharged to an intervening flow-regulating holding pond 319, from which the liquid is used for irrigation or constructed wetland projects and/or recycled into barns 303 in, for example, waste pits 304 with optionally added zeolites 321. Materials 309–311 added to digested slurry 308 so effectively separate the settleable and nonsettleable materials in digested slurry 308 that overflow liquid 317 is a clear liquid that does not require any anaerobic treatment.

It is understood that the addition of materials 309–311 or any other material in the context of this invention may require the stirring of the medium into which any material is added. This operation, however, is considered within the ordinary skill in the art.

Typically, a processing plant that is part of an exemplary embodiment of this invention and receives sludge flow at a rate of about 54.6 l/s (about 865 gal/min), produces processed solution that can be returned to the hog barns, or used for irrigation or wetland projects, at a rate of about 42 l/s (about 665 gal/min).

Although organic waste composition varies depending on the animals, type of feed and conditions at the organic waste source, one type of organic waste treated according to the methods of this invention has a composition by weight that includes about 5.2% of suspended solids, about 3% of total dissolved solids, or about 8.2% of total solids. As indicated above, zeolite can be added at several stages in the waste treatment process, starting at the stage of supplying feed to the barn animals. Nevertheless, an amount of zeolite of about 7 g/l in the waste is fairly typical.

An exemplary embodiment of this invention is applied to a large scale operation with a production of 80,000 tons of dry granular fertilizer per year. In this exemplary embodiment, materials 309–310 are preferably prepared as follows.

Calcium oxide is stored in a lime silo that can be a 50-ton storage silo. Lime from this silo is mixed with water in an approximately 757 l (approximately 200 gal) mixing tank by means of a conventional agitator. The lime slurry that becomes available in the mixing tank is pumped when needed by a pump in a form that is an embodiment of material 310. A similar mixing process can be followed when fly ash is used instead of or in conjunction with lime. The pump is preferably pneumatic.

Magnesium salts, usually magnesium chloride, are in this exemplary embodiment available as brine, which is stored in an approximately 37,850 l (approximately 10,000 gal) storage tank, from which an embodiment of material 309 is available via a pump which is preferably a pneumatic pump. The magnesium salts can be delivered in solid or dissolved form as the preparation of a magnesium chloride solution from solid magnesium salts and water is an operation well known to anyone with ordinary skill in the art. Magnesium sulfate, particularly $MgSO_4.7H_2O$, can also be used as a phosphate precipitating agent in the waste treatment methods of this invention. Furthermore, soluble forms of MgO can be used both to supply required magnesium ions for precipitating phosphates and to increase the pH of the medium, thus reducing the amount of lime required.

An embodiment of material 311 is available from a flocculant mix-storage tank of approximately 757 l (approximately 200 gal). A water storage tank of about 37,850 l (about 10,000 gal) is recommended for providing the necessary water supply for this exemplary embodiment of the processing plant.

In a preferred exemplary embodiment, organic waste slurry is treated with materials 309–311 according to the following process.

Figure 4:
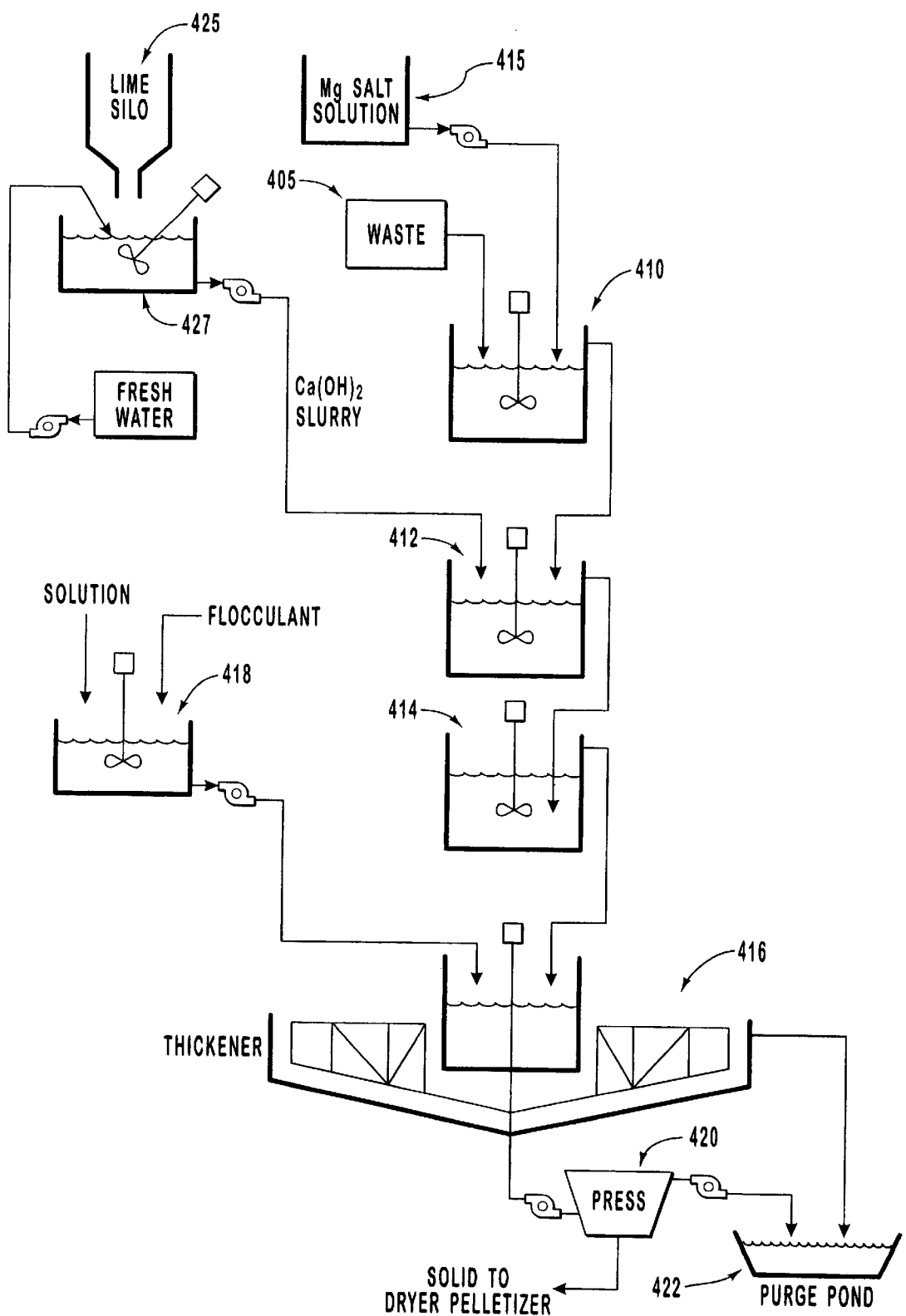
FIG. 4 shows a partial matter flow diagram of an exemplary embodiment of an organic waste treatment and fertilizer production plant.

As shown in FIG. 4, organic waste 405 is mixed with a phosphate precipitating agent in an approximately 227,100 l (approximately 60,000 gal) tank 410 from which the mixture is transferred to a second tank 412 of approximately the same capacity where it is further mixed with a base. In this exemplary embodiment, the phosphate precipitating agent is embodied by an aqueous solution of a magnesium salt 415 and the base is embodied by a slurry of calcium hydroxide obtained by mixing water and lime 425 in tank 427. The mixture is further transferred to and stirred in a third tank 414 of approximately the same capacity and it is subsequently transferred to a thickener 416 where flocculent 311 is added. In this particular embodiment, flocculent is added to the thickener from tank 418 where thickener is prepared at a preferred concentration. This set of three mixing tanks 410, 412, and 414, and thickener 416 is an exemplary embodiment of the reactor clarifier of this invention. A partial matter flow diagram for an organic waste treatment and fertilizer production plant operating according to this exemplary embodiment is sketched in FIG. 4. Sludge from thickener 416 is pressed in press 420 to obtain a solid that is directed to a dryer pelletizer. The overflow from thickener 416 and liquor from press 420 are directed in this exemplary embodiment to purge pond 422.

Figure 5:
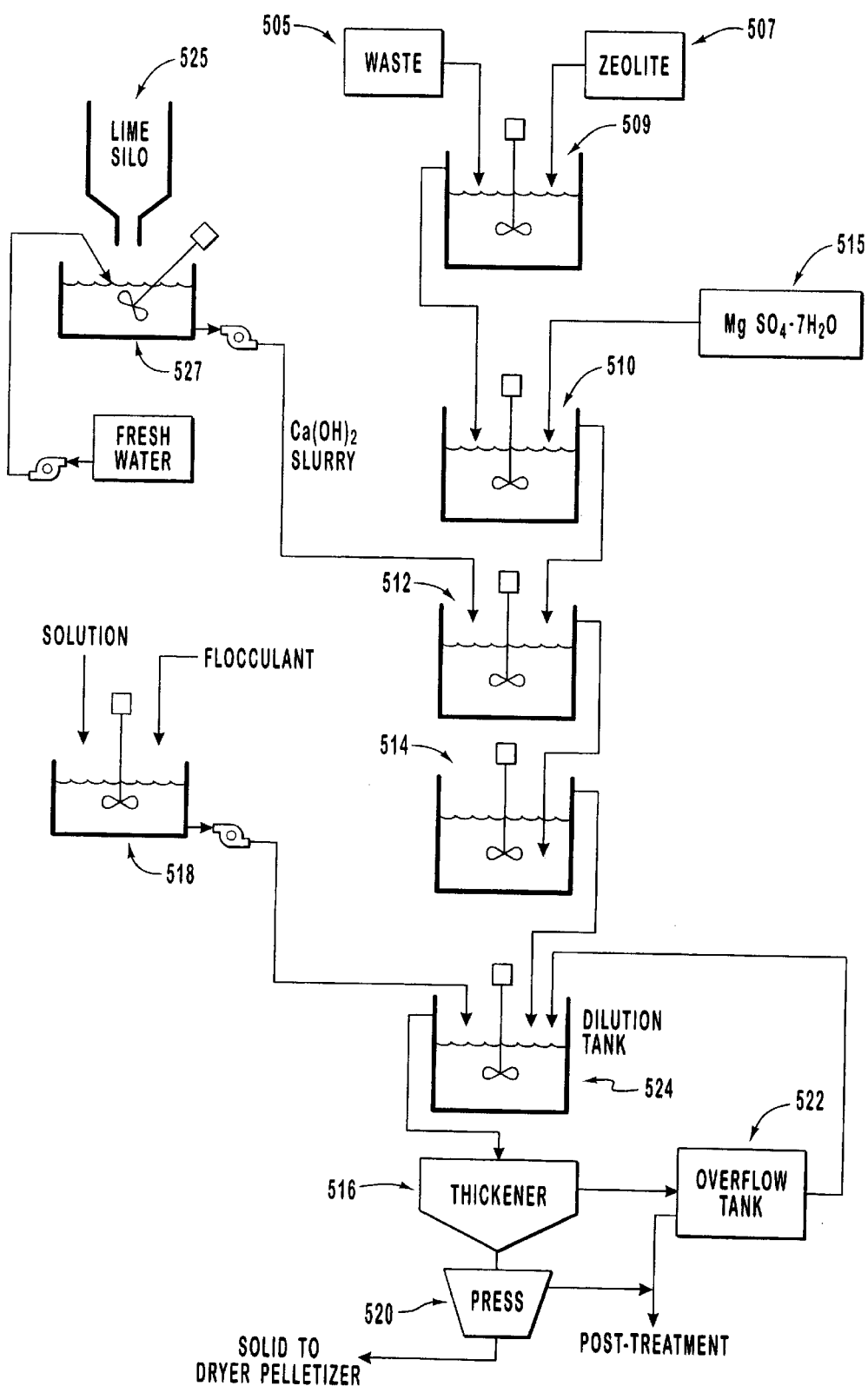
FIG. 5 shows a partial matter flow diagram of another exemplary embodiment of an organic waste treatment and fertilizer production plant.

As shown in FIG. 5, the reactor clarifier can optionally further include dilution tank 524 between tank 514 and thickener 516. When dilution tank 524 is included, flocculant is preferably added to the fluid that is received in this tank, where the mixing with the flocculant takes place for its subsequent transfer to thickener 516. In this particular embodiment, organic waste 505 is mixed with zeolite in an approximately 227,100 l (approximately 60,000 gal) tank 509 from which the mixture is transferred to tank 510 of approximately the same capacity where it is further mixed with a phosphate precipitating agent that is embodied in this example by hydrated magnesium sulfate 515. The mixture is transferred from tank 510 to tank 512 of approximately the same capacity where it is further mixed with a base that is embodied in this example by a slurry of calcium hydroxide obtained by mixing water and lime 525 in tank 527. The mixture is further transferred to and stirred in tank 514 of approximately the same capacity as either of tanks 510 or 512, and it is subsequently transferred to dilution tank 524, where it is mixed with flocculant. In this particular embodiment, flocculant is added to dilution tank 524 from tank 518 where flocculent is prepared at a preferred concentration. This set of four mixing tanks 509, 510, 512, and 514, and thickener 516 is an exemplary embodiment of the reactor clarifier of this invention. A partial matter flow diagram for an organic waste treatment and fertilizer production plant operating according to this exemplary embodiment is sketched in FIG. 5. Sludge from thickener 516 is pressed in press 520 to obtain a solid that is directed to a dryer pelletizer. The overflow from thickener 516 and liquor from press 520 are directed in this exemplary embodiment to overflow tank 522, from which fluid is fed to dilution tank 524. Overflow from the thickener is, in this exemplary embodiment, optionally directed in part to the dilution tank and partially destined to post-treatment. A partial matter flow diagram for an organic waste treatment and fertilizer production plant operating according to this exemplary embodiment is sketched in FIG. 5.

Figure 6:
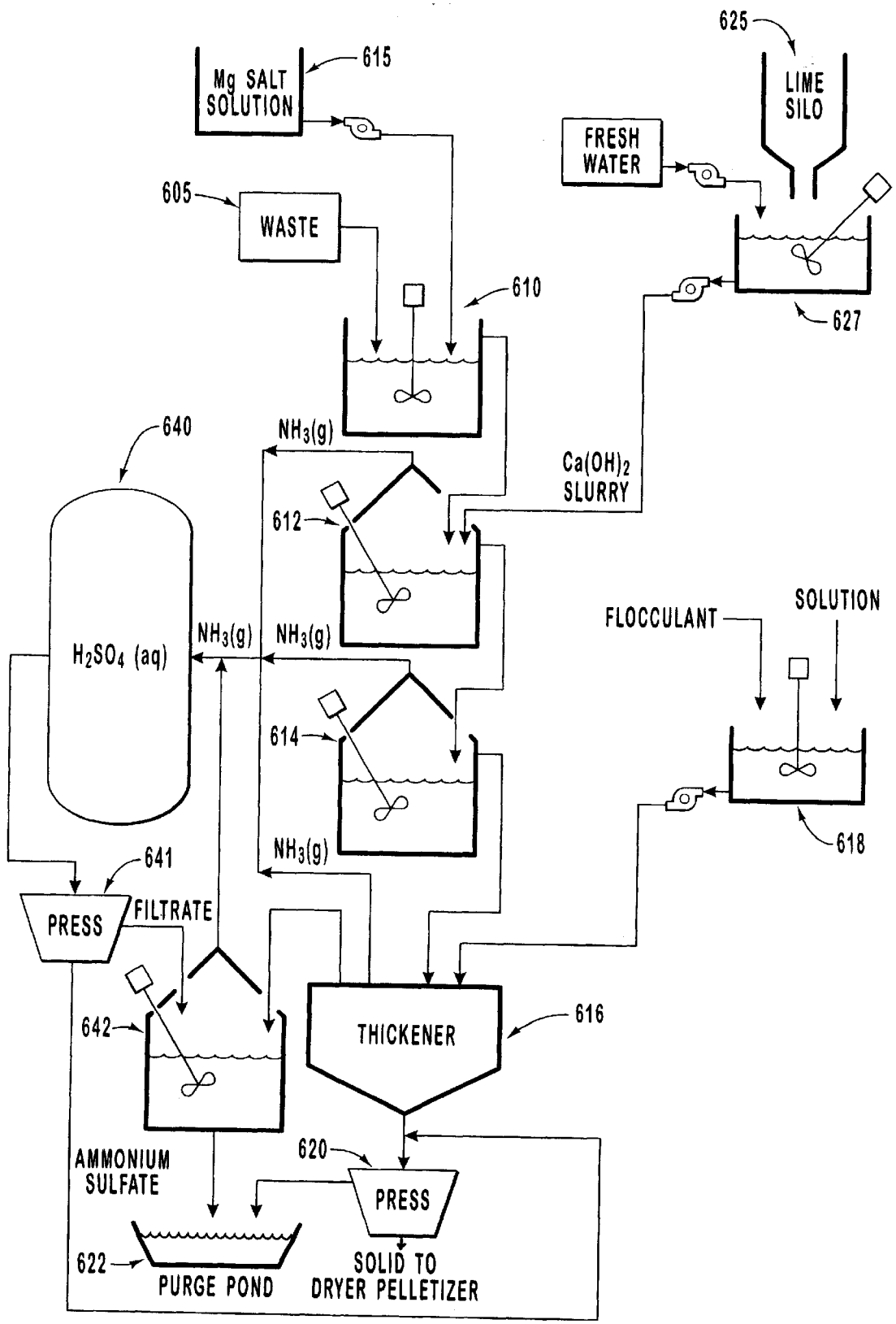
FIG. 6 shows a partial matter flow diagram of an exemplary embodiment of an organic waste treatment and fertilizer production plant that includes features for capturing in the form of ammonium salts the ammonia that would otherwise be released into the atmosphere.

The partial matter flow diagram sketched in FIG. 6 further shows an exemplary embodiment of some of the ammonia recovery devices that capture ammonia in the form of an ammonium salt. As shown in FIG. 6, organic waste 605 is mixed with a phosphate precipitating agent in an approximately 227,100 l (approximately 60,000 gal) tank 610 from which the mixture is transferred to a second tank 612 of approximately the same capacity where it is further mixed with a base. In this exemplary embodiment, the phosphate precipitating agent is embodied by an aqueous solution of a magnesium salt 615 and the base is embodied by a slurry of calcium hydroxide obtained by mixing water and lime 625 in tank 627. The mixture is further transferred to and stirred in a third tank 614 of approximately the same capacity and it is subsequently transferred to thickener 616 where flocculent is added. In this particular embodiment, flocculant is added to the thickener from tank 618 where thickener is prepared at a preferred concentration. This set of three mixing tanks 610, 612, and 614, and thickener 616 is an exemplary embodiment of the reactor clarifier of this invention. A partial matter flow diagram for an organic waste treatment and fertilizer production plant operating according to this exemplary embodiment is sketched in FIG. 6. Sludge from thickener 616 is pressed in press 620 to obtain a solid that is directed to a dryer pelletizer.

To capture any ammonia that has not been incorporated into a salt or retained by zeolite or any other ammonia retaining agent, the overflow from thickener 616 in the exemplary embodiment shown in FIG. 6 is directed to tank 642, where the pH is lowered to a value preferably in the range of about 6–7. The released ammonia is preferably converted to ammonium sulfate in scrubber 640. When ammonia is to be recovered as ammonium sulfate, scrubber 640 contains an aqueous solution of sulfuric acid at a concentration preferably in the range of about 30% to 50% by weight, more preferably at a concentration of about 40% by weight. To recover the ammonium sulfate, the material formed in scrubber 640 is filtered in press 641 to separate a liquid filtrate that is preferably directed to tank 642 to lower the pH of the thickener overflow to a preferred value in the range of about 6–7. The ammonium sulfate separated in press 641, together with the sludge from thickener 616 is pressed in press 620 to separate a solid that is directed to a dryer pelletizer, and a liquid that is directed to purge pond 622. Optionally, excess liquid from tank 642 is also directed to purge pond 622. Ammonia recovery is enhanced by directing to scrubber 640 any ammonia that is released from tanks 612, 614 and thickener 616, as shown in the exemplary embodiment of FIG. 6. In addition to, or instead of, the liquid filtrate from press 641, an aqueous solution of sulfuric acid (not shown in FIG. 6) can be used to bring the pH of the medium in tank 642 to a value in the range of approximately 6–7. Furthermore, the overflow from thickener 616 can be brought to a pH in the approximate range of 6–7 in a single tank 642 as shown in the exemplary embodiment of FIG. 6, or by a series of acid-base reactions that take place in a plurality of tanks, so that the pH is gradually reduced in a comparatively smaller amount from a value that initially is typically above about 10 to a final pH in the range of approximately 6–7.

In the exemplary embodiment schematically shown in FIG. 1, the reactor clarifier is represented by clarifier 103 and reactor/clarifiers 116. The reactor clarifier of this invention is represented by reactor clarifier 205 in the exemplary embodiment shown in FIG. 2, and by reactor clarifier 312 in the exemplary embodiment shown in FIG. 3.

Preferably, the organic waste is mixed first with a magnesium salt such as magnesium chloride or magnesium sulfate because if the organic waste were mixed first with lime, a significant amount of phosphate ions would combine with calcium ions, thus becoming unavailable to form magnesium ammonium phosphate. Referred to amount of organic waste in volume, the amount of $MgSO_4 \cdot 7H_2O$ typically used is less than about 10 g/l, and preferably about 5 g/l, but this amount can vary depending on the type of waste and waste composition. The conversion of this amount of hydrated magnesium sulfate to an amount of some other magnesium compound, such as magnesium oxide, magnesium chloride or an aqueous solution of magnesium ions is a standard operation in elementary chemistry. The addition of a magnesium salt to initiate struvite precipitation is followed by agitation of the medium About 15 minutes of residence time is recommended for a thorough mixing. Residence time, however, should be adjusted to accomplish extensive mixing throughout the waste, and thus residence time depends on the characteristics of the mixed substances and the volume of the tank where the waste is mixed with the phosphate precipitating agent.

A base such as lime is subsequently added to reach a medium pH as indicated in the discussion of FIG. 1. A pH value of about 10.5 can be accomplished with the addition to hog waste of about 12.2 g $Ca(OH)_2$ per liter of mixture fed to the pH adjustment tank. The amount of pH control agent to be added for reaching a preferred pH value depends on the base used and on the organic waste characteristics, but pH monitoring is an operation within ordinary skill in the art. Calcium oxide or flue dust could also be used as pH control agent, but slaked lime with mostly calcium hydroxide is preferred because the slaking kinetics for other substances is comparatively slow and a substantial excess of pH control agent may be required to achieve a desired pH. Calcium hydroxide is preferably added as a slurry. Phosphate that is available for precipitation and is not recovered as struvite is available to form calcium phosphate.

Depending on the desired strategy for germ elimination, the waste pathogenic content can be eliminated with the use of additional base to increase the pH to about 12. For most hog waste, additional lime slurry in the amount of about 6 g $Ca(OH)_2$ per liter of mixture increases the pH to a value of approximately 12. A residence time of about one hour in the pH adjustment reactor is recommended, but this time depends on the characteristics of the mixed substances and the volume of the tank. For example, a total residence time of one hour can be alternatively realized by two thirty-minute residence periods, one period in each one of two reactors in series. Also, the residence time could be increased to about two hours when pathogen content elimination is to be performed at a pH below 12.

A base, such as lime, is incorporated in other embodiments of the present invention in a staged sequence. For example, base is added in a first stage to increase the pH to a value in the range from about 9 to about 10, preferably to about 9.5, and additional base is added in a subsequent stage to further increase the pH to a value in the range from about 10 to about 11, preferably to about 10.5.

The flocculant dosage depends on the type of flocculant used and on the suspended solids concentration. A flocculant's effectiveness, however, can be ascertained by mixing each one of a series of standard volumes of the liquid waste with a flocculent emulsion of known concentration and subsequently inspecting the mixtures to determine the flocculent type and the concentration that led to the most extensive separation. NALCO7191 and NALCO7193 flocculants produced similar results with hog waste, NALCO7191 being more preferred. Volumes between about 2.0 ml and about 4.0 ml of NALCO7191 emulsion at a concentration of about 1.0 g/l in a hydrocarbon solvent/water emulsion added to standard 2-liter volumes of thickener feed at a pH of about 10.4 and at a temperature of about 20° C. that contained about 1.8% by weight of suspended solids produced a satisfactory separation, with a volume of about 3 ml of flocculant emulsion being a preferred dosage. Referred to dry basis fertilizer, these dosages are approximately equivalent to dosages of flocculent between about 500 mg/metric ton (about 1 lb/std ton) and about 1.1 kg/metric ton (about 2.2 lb/std ton), with about 800 g/metric ton (about 1.6 lb/std ton) being preferred. Similar tests under analogous conditions performed with thickener feed that contained about 2.7% by weight of suspended solids revealed that about 500 g flocculant per metric ton of dry fertilizer had a separation efficiency similar to the dosage of about 800 g/metric ton with the thickener feed that had about 1.8% by weight of suspended solids. The same dosage of about 500 g flocculant per metric ton of dry fertilizer lead to similar separation efficiency for suspended solid concentrations by weight in the thickener feed up to about 3.6%. The separation efficiency, however, significantly decreases at higher suspended solid concentrations. With NALCO7191 as flocculent, the suspended solid concentrations in the thickener feed should preferably not significantly exceed about 4% by weight, and feeds with higher concentrations of suspended solids should be diluted.

Flocculant used in embodiments of this invention includes at least one of NALCO 7194 Plus, NALCO 98LT-062, that can be obtained from Nalco Chemical Co., Floerger Conn. 640, that can be obtained from Chemtall, Inc., and combinations thereof It is understood that the term "combinations" when applied herein to refer to a plurality of substances that are incorporated into any embodiment of the processes according to this invention includes mixtures of such plurality of substances, and chemical combinations when any one of such substances reacts with any other one in such combination or in the course of being incorporated into the process.

Referred to weight of dry fertilizer produced according to an embodiment of the methods of this invention, an organic waste treatment and fertilizer production plant producing about 11.3 metric ton (about 12.5 std ton) per hour requires about 15.5 metric ton (about 17.1 std ton) of zeolite per day, about 11.2 metric ton (about 12.3 std ton) of $MgSO_4.7H_2O$ per day, about 26.9 metric ton (about 29.6 std ton) of $Ca(OH)_2$ per day, and about 118 kg (about 260 lb) of NALCO7191 flocculant per day.

The size of the thickener is determined by thickening or by clarification depending on the concentration of suspended solids in the thickener feed. For example, a thickener diameter of about 18.3 m (about 60 ft) is preferred for thickener feed concentrations of suspended solids below about 3% by weight, but the preferred diameter is about 19.8 m (about 65 ft) when the suspended solid concentration in the thickener feed is in the range from about 3% to about 4% by weight. When suspended solid concentrations in the thickener fluid fall below about 1% by weight, clarification controls thickener sizing.

Thickening refers to the increase in the amount of solids in the thickener flow that is to be pressed. Treatment of hog waste with 1.8% by weight of suspended solids at pH of about 10.4 and at a temperature of about 20° C. according to embodiments of the methods of this invention produced a sludge with an average solid content of about 10.3% by weight in a settling time of 25 minutes. Treatment of hog waste with 2.8% by weight of suspended solids under the same pH and temperature conditions produced a sludge with an average solid content of about 11.1% by weight in a settling time of about 35 minutes, and when the suspended solid content in the treated hog waste increased to about 3.6% by weight, a sludge with an average solid content of about 10.8% by weight was obtained in a settling time of about 52 minutes. The cationic flocculant NALCO7191 was employed in these thickening tests at dosages of about 750 g/metric ton of fertilizer (about 1.5 lb/std ton) for the waste with about 1.8% suspended solids, about 500 g/metric ton of fertilizer (about 1.0 lb/std ton) for the waste with about 2.8% suspended solids, and about 450 g/metric ton of fertilizer (about 0.9 lb/std ton) for the waste with about 3.6% suspended solids. In terms of the added volumes of flocculant emulsions, about 2.8 ml of the cationic flocculant emulsion at a concentration of about 1.0 g/l were added to about 2 l of liquid waste that contained about 1.8% of suspended solids; about 3.0 ml and about 3.2 ml of the same flocculant solution were added to the same volumes of liquid waste with about 2.8% and about 3.6% of suspended solids, respectively.

As the preceding discussion indicates, a feature of this invention is that the organic waste treatment and fertilizer and feed supplement production methods can be implemented according to batch or continuous processes. A process that obeys a batch design is conducted in a single agitated tank with reagents added sequentially, the solids settled, overflow decanted, and the settled solids removed for further dewatering and drying. An exemplary embodiment of this operational mode would include three 18.3 m×18.3 m (60 ft×60 ft) tanks employed in rotation in 24-hour cycles. Small scale operations may benefit from batch processes. Although a continuous process requires more control and operating attention, it may be more cost effective for large operations.

Instead of, or in addition to, the use of phosphoric acid to capture excess ammonia as it has been described above, scrubbers can be used to increase ammonia recovery, as exemplarily shown in FIG. 6. To this effect, gases released at the stage of and at stages subsequent to the treatment with a basic compound such as slaked lime are directed to scrubbers that contain an acidic solution such as a dilute aqueous solution of sulfuric acid, where ammonia is captured by formation of ammonium salts with the acid in the scrubber. This recovery process alone or in combination with the addition of phosphoric acid as indicated above significantly increases ammonia recovery. For example, the use of scrubbers to capture the ammonia released at stages subsequent to the treatment with a pH control product such as slaked lime leads to ammonia recovery that can be as high as 90% relative to the ammonia originally present in the organic waste. The technology for recovering ammonia gas by means of scrubbers with sulfuric acid has been extensively developed and is well known for recovering ammonia emissions from coke ovens. The ammonium salts formed in the ammonia recovery process are preferably incorporated in the fertilizer production process at a stage prior to the formation of an organic base. For example, these salts can be mixed with sludge 313.

Figure 7:
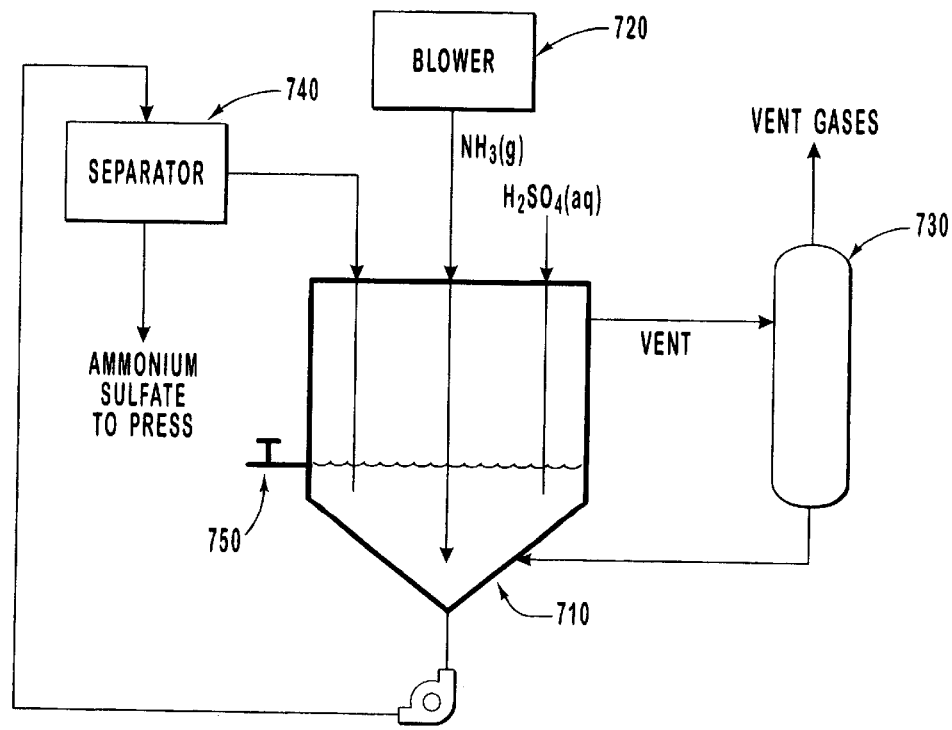
FIG. 7 schematically shows an ammonium sulfate crystallizer.

For example, FIG. 7 partially shows an embodiment of an ammonia scrubber in which ammonia is recovered mostly as ammonium sulfate. Ammonia containing gas is blown in vessel 710 with blower 720, where the blown gas is mixed with aqueous solution of sulfuric acid that is fed into vessel 710 at a concentration in the range indicated in the discussion of FIG. 6. Vent gases are preferably treated in stripper 730 to separate any ammonia prior to their release into the atmosphere, and the recovered ammonia is directed to vessel 710. Ammonium sulfate is separated in separator 740 and directed to, for example, press 641 shown in FIG. 6. The solution and any gas separated in separator 740 are redirected to vessel 710 that is typically equipped with device 750 for regulating the liquid level to a desired height within vessel 710. See, for example, Vincent Sauchelli, *Chemistry and Technology of Fertilizers* (1960) pp. 33–34, which is hereby incorporated by reference in its entirety for the material disclosed therein.

Figure 8:
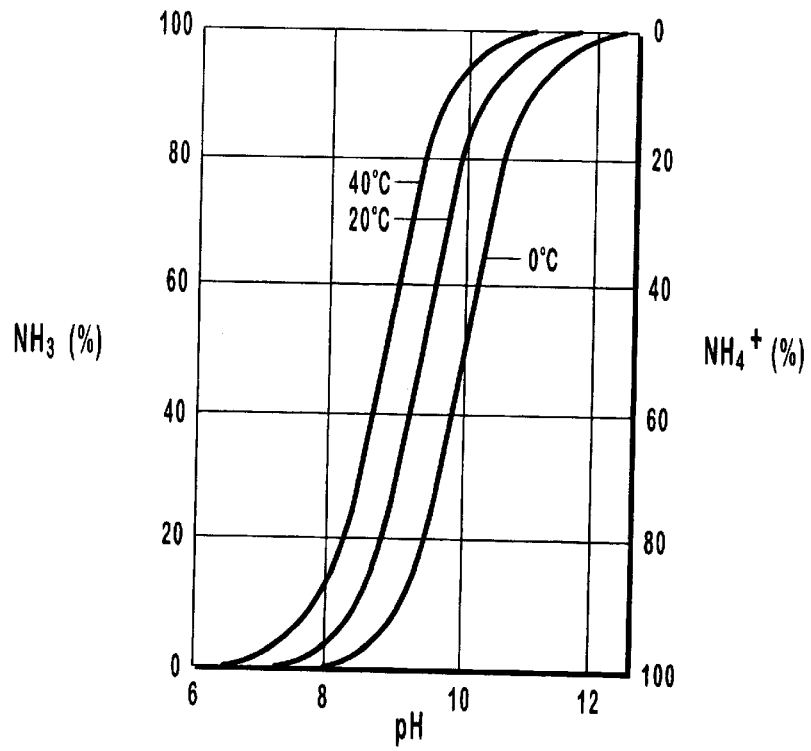
FIG. 8 shows a graph of the weight percentages of ammonia gas and ammonium ions in an aqueous solution as a function of the medium pH at three temperatures.

Because the presence of ammonia as ammonium ion in an aqueous solution or its conversion to ammonia gas depends on temperature and pH, known relations that express the percentage of ammonia as ammonium ion and as ammonia gas are typically utilized in ammonia recovery processes. These relations are within the ordinary skill in the art and they are usually employed in the form of graphic representations, as the one shown by way of example in FIG. 8. The graph shown in FIG. 8 displays the weight percentage of ammonia as ammonium ion and as ammonia gas at different pH values at the temperatures of 0° C., 20° C., and 40° C. For example at a temperature of about 20° C., an aqueous medium with a pH of over 10 would contain not more than about 20% of the ammonia as ammonium ions in solution and at least about 80% of the ammonia as ammonia gas. In contrast, an aqueous solution at the same temperature with a pH of about 7 would contain almost all the ammonia as ammonium ions in solution, but almost no ammonia as ammonia gas.

As exemplified in FIG. 3, a preferably pneumatic sludge pump delivers sludge 313 from the thickener to a system of three belt presses that constitute an exemplary embodiment of press 314. In this exemplary embodiment, a surge pond replaces tank 318 and exemplarily embodies holding pond 319. The surge pond in this example holds approximately 18,925,000 l (approximately 5,000,000 gal) of filtrate 316 and overflow 317. In this embodiment, overflow 317 comprises thickener overflow liquor that is rejected from the system to maintain the appropriate concentration of total dissolved solids at a value that allows for the maximum flocculant separation efficiency as discussed above.

Filter cake 315 is preferably conveyed by a bucket elevator to a dryer-pelletizer unit that exemplarily embodies dryer (agglomerator) 322. A bucket elevator is an exemplary embodiment of a means for transporting a solid or semisolid material. Depending on the consistency of the material to be transported, this means for transporting can be embodied by other devices, such as a conveyor belt. The dryer-pelletizer unit typically includes a feed bin with a screw feeder to deliver filter cake to a manure dryer that preferably burns propane or a combination of propane and biogas 307. In this exemplary embodiment, propane only is fed to the manure dryer from two propane tanks which hold about 75,700 l (about 20,000 gal) each.

Figure 9:
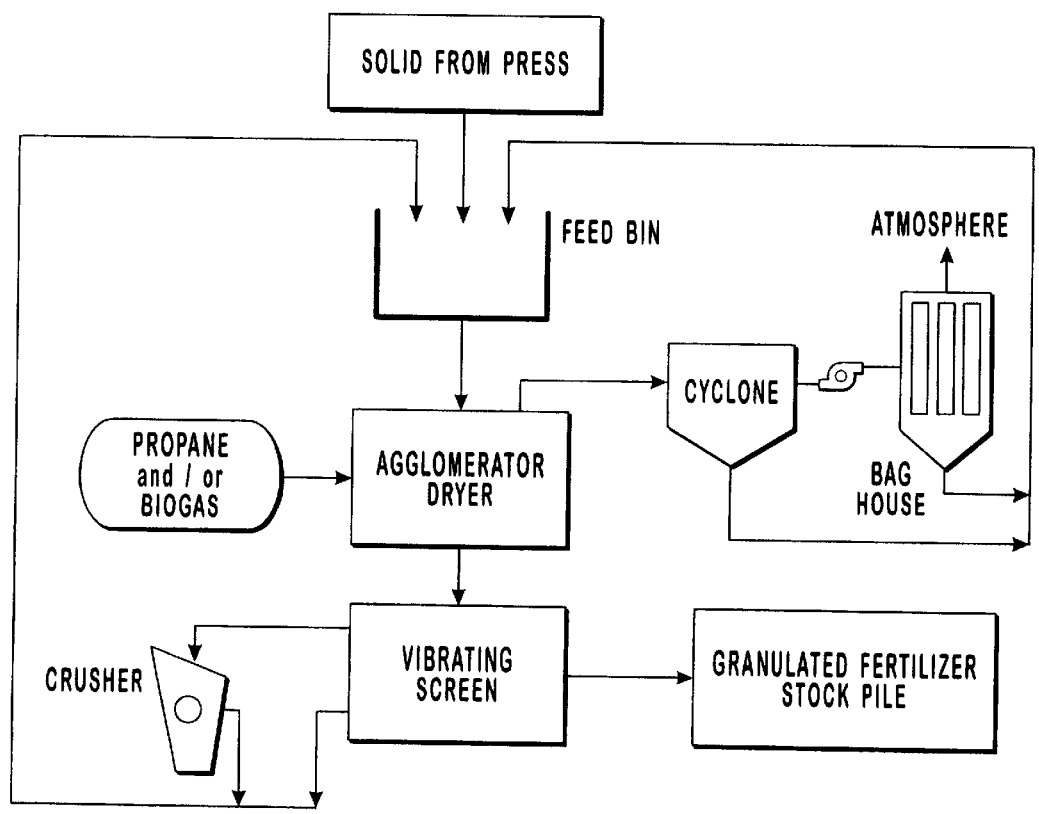
FIG. 9 shows a partial matter flow diagram of an exemplary embodiment of a dryer/pelletizing unit for an organic waste treatment and fertilizer production plant.

The set of devices shown in FIG. 1 comprising pelletizing drum 124, product dryer 126, product screens 127, and crusher 131, or the dry basis NPK granulation plant 221 in FIG. 2, or the dryer (agglomerator) 322 in FIG. 3 can be embodied for example by the dryer/pelletizer unit schematically shown in FIG. 9.

As shown in FIG. 9, solid from a press that can be exemplified by press 314, press 420, press 520, or press 620, is conveyed to a feed bin to subsequently be treated in an agglomerator dryer. Thermal energy for the dryer can be provided by burning propane and/or biogas, such as biogas 111, 222, or 307. The solid product from the agglomerator dryer is conveyed to a vibrating screen, whereas the particulate matter in the gaseous products from the agglomerator dryer is preferably separated by means of a cyclone and a bag house and then the gaseous products are released into the atmosphere. The solid product from the agglomerator dryer is preferably size selected by a vibrating screen system, and it is either stockpiled as granulated manure when it has a specified size or fed back to the feed bin, with or without crushing, when the size is not appropriate. After size selection, the granulated manure obtained in this embodiment that exemplifies a dryer/pelletizer unit of the organic waste treatment and fertilizer production processes of this invention is marketed directly as a fertilizer.

As shown in FIG. 3, filter cake 315 is treated in unit 322 which includes a dryer and also an agglomerator if needed.

The dried product is organic base 323 which can be used in the preparation of fertilizer 324 as described in the context of the exemplary embodiments shown in FIGS. 1 and 2 and/or as feed supplement 325. Depending on the pH of digested slurry 308, which in turn depends on the amount of basic compounds in materials 309–311 added to reactor/clarifier 312, organic base 323 may have to be neutralized with a pH control agent 326 prior to its use as feed supplement 325. The practice of this neutralization operation is known to those with ordinary skill in the art. This pH control agent 326 includes, but it is not limited to, acidic wood sugar and equivalent conventional additives and mixtures thereof Wood sugar also improves the quality of the feed supplement in the sense that it improves its taste to animals.

It is understood that when a pH control agent, such as wood sugar, is needed for producing a feed supplement for animals it can be added to any or several of solid 123, sludge 209 or 313, filter cake 211 or 315, and organic base 220 or 323.

The product exemplified in FIGS. 1–3 by solid 123, organic base 220, and filter cake 315 or organic base 323 may have a relatively high pH due to the use of a basic product in the waste treatment process. One of the features of this invention is the production of fertilizer whose characteristics are tailored according to specific regional variables. For example, fertilizer produced for regions with high soil pH will require pH control of the fertilizer prior to its delivery. In this case the pH of the solid 123, the organic base 220 or 323, or filter cake 315 should be lowered by adding acidic compounds that are well known for modifying fertilizer composition and preparing soil amendments. A high pH fertilizer, however, is desirable for regions with low pH, and minimal or no pH control of the solid 123, the organic base 220 or 323, or filter cake 315 may be needed.

Fertilizer is usually handled in granulated form. Therefore, embodiments of the fertilizer production methods of this invention include a granulating step that can be embodied in a variety of forms. For example, the granulating of the fertilizer is represented in the embodiment shown in FIG. 1 by items 124–127 and 129–131. It is represented by granulation plant 221 in the embodiment shown in FIG. 2, and no explicit reference to the granulating step is made in the embodiment shown in FIG. 3 because drying and granulating a filter cake to form pellets or grains of standard size is a known operation to those with ordinary skill in the art.

Analogously, only the exemplary embodiment shown in FIG. 2 explicitly refers to the supplementing of organic base 220 to make the dry basis NPK fertilizer at plant 221. The analysis of a fertilizer and additives to be used to make a NPK fertilizer of standard composition and optionally supplement it with micronutrients and soil amendments are considered to be part of the ordinary skill in the art and only the steps of supplementing the organic base are explicitly referred to. It is understood that supplements to achieve a NPK standard composition, micronutrients or soil amendment materials can be added at several stages in the fertilizer production methods of this invention. These stages include in particular those at mixing reactor 121, filter cakes 211 and 315, and organic base 220 and 323. Furthermore, some of the substances with which the organic waste itself is treated can be fertilizer supplements. For example, some zeolites and densifiers are also suitable soil amendments when they are incorporated into the soil with the fertilizer of which the densifiers and zeolites are an integral part of.

An important feature of this invention is that it can be implemented in the form of embodiments that require no lagoons. In particular, the exemplary embodiment described by the diagram shown in FIG. 3 requires no lagoons. This is an important feature of this invention because, under current regulatory schemes, some states impose building moratoria on hog farms that rely on technologies that use lagoons, but exempt units that rely on technologies that do no require lagoons.

One of the features of the embodiments of this invention is the production of a liquid and a precipitate. The liquid can be recycled for irrigation, for wetland projects, or for its use at the organic waste source and the precipitate comprises the materials of agronomic value and the substances in the organic waste that would become pollutants if they were released in the environment.

The liquid comprises the liquid fraction from the organic waste treatment with phosphate precipitating agent, base, flocculant, optionally ammonia retaining agent and optionally densifier. For example, this liquid is embodied by overflow liquid 117 treated in aerobic lagoon system 118 in FIG. 1, by filtrate 212 and recycle liquid 217 in FIG. 2, and by filtrate 316 and overflow 317 in FIG. 3.

The precipitate comprises the materials obtained from the reactor clarifier that will eventually become fertilizer and/or feed supplement. This precipitate can be embodied in different forms at different stages of the several exemplary embodiments of the organic waste treatment and fertilizer and feed supplement production methods of this invention. For example, the precipitate is referred to as solid product 120 and solid 123 in FIG. 1; as sludge 209, filter cake 211, and organic base 220 in FIG. 2, and as sludge 313, filter cake 315 and organic base 323 in FIG. 3.

In the exemplary embodiments of this invention in which the reactor clarifier comprises more than one stage, such as clarifier 103 and reactor/clarifiers 116 in FIG. 1, the obtention of the precipitate is preceded by the formation of a primary sludge 104 and optionally by the formation of degasified sludge 115. Whether a primary sludge is formed or not, the precipitate in this invention comprises the settleable and nonsettleable materials in the organic waste. This settleable and nonsettleable materials are obtained in a high solid-liquid separation at very high settling rates by mixing the organic waste with an ammonia retaining agent, flocculant, phosphate precipitating agent, base, and optionally densifier.

Figure 10A:
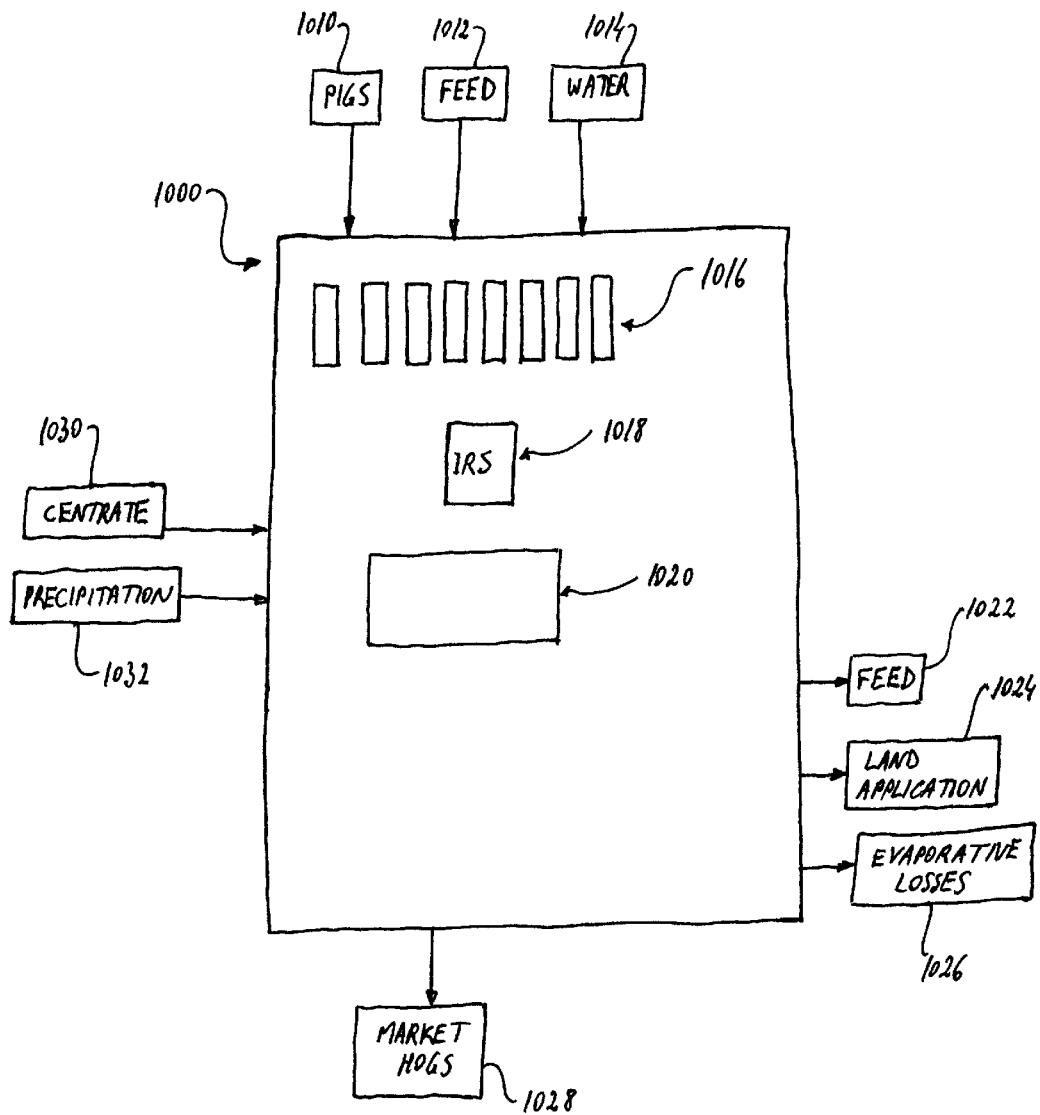
FIG. 10A shows a schematic diagram of an organic waste production facility with an IRS system.

Additional embodiments of the present invention are provided by the schematic diagrams shown in FIGS. 10A–10G. FIG. 10A schematically shows an organic waste production complex and FIGS. 10B–10G schematically show systems that have been incorporated in embodiments of this invention, such as the general complex schematically depicted in FIG. 10A.

The plant that corresponds to the flow charts shown in FIGS. 10A–10G was designed for at least 82800 head. Products obtained from this facility include wet centrifuge product that in some embodiments is directed, for example by truck, to a thermal processing plant. Other products include ammonium sulfate, high grade organic fertilizers, and fuel products. Other embodiments of analogous plants include complexes that range in size from about 46000 head to about 156400 head.

Flow rates in the discussion of FIGS. 10A–10G are given at about full utilization and they exceed about 85% in most embodiments. Other embodiments include examples with design factors of about 120% with respect to those explicitly disclosed herein. Abbreviated terms such as "tpy", "gpd" and "gpm" stand for "ton per year", "gallon per day" and "gallon per minute", respectively.

FIG. 10A shows a farm 1000 that includes barns 1016, an IRS facility 1018, and lagoon 1020. Pigs 1010 are provided to the barns at about 50 lb each. Most embodiments are operated at initial loadings that are in the range from about 105% to about 110% of capacity to prevent death loss. This choice is clearly not a limiting factor of the features of this invention. Rated capacity in one example was about 92000 pigs per farm at about 2.88 turns/year. An example of a complex of farms, each farm being as schematically shown in FIG. 10A, includes nine such farms.

Feed 1012 is supplied at a feed conversion of about 2.6. Feed in most embodiments contains about 10% moisture. Water 1014 is supplied at about 2 gpd/pig.

Centrate 1030 is embodied in some examples by liquid fluid from any one of the embodiments previously disclosed, such as liquid obtained from centrifugation. Precipitation 1032 includes precipitation in lagoon 1020 at about 36 inches/year.

These figures are based on an example at about 100% capacity. Organic waste production can be in some embodiments about 20% higher. Water supply as given in this example relies on water conservation measures. Examples without such measures would need about 30% more water than that described with respect to the embodiments related to FIG. 10A.

Feed 1022 is supplied in some embodiments to any one of the processes described herein to obtain fertilizer, so that at least about 90% of the nutrients are removed. Land application 1024 is primarily determined by salinity, not nitrogen loading. The needed land is reduced in most embodiments by a reduction factor in the range from about 50% to about 90%. In some embodiments, covers, such as semi-permeable covers, are added to lagoon 1020 for odor control. Market hogs 1028 represent the animals raised in such complex that are ready for distribution in the market.

Flow rates for an example as schematically shown in FIG. 1 are given as follows: about 662 tpy/farm or about 5958 tpy/complex of pigs 1010; about 7233 tpy/farm or about 65097 tpy/complex of feed 1012; about 27952 tpy/farm or about 251749 tpy/complex of fresh water 1014, which is about 12.78 gpm/farm or about 115 gpm/complex; about 22830 tpy/farm or about 205468 tpy/complex of centrate 1030; about 25366 tpy/farm or about 228298 tpy/complex of waste slurry to IRS 1018, which is about 11.25 gpm/farm or about 101.2 gpm/complex; about 12707 tpy/farm or about 114363 tpy/complex of land application 1024; about 30427 tpy/farm or about 273839 tpy/complex of evaporative losses 1026; about 3444 tpy/farm or about 30996 tpy/complex of market hogs 1028; and about 20304 tpy/farm or about 182736 tpy/complex of precipitation 1032.

Figure 10B:
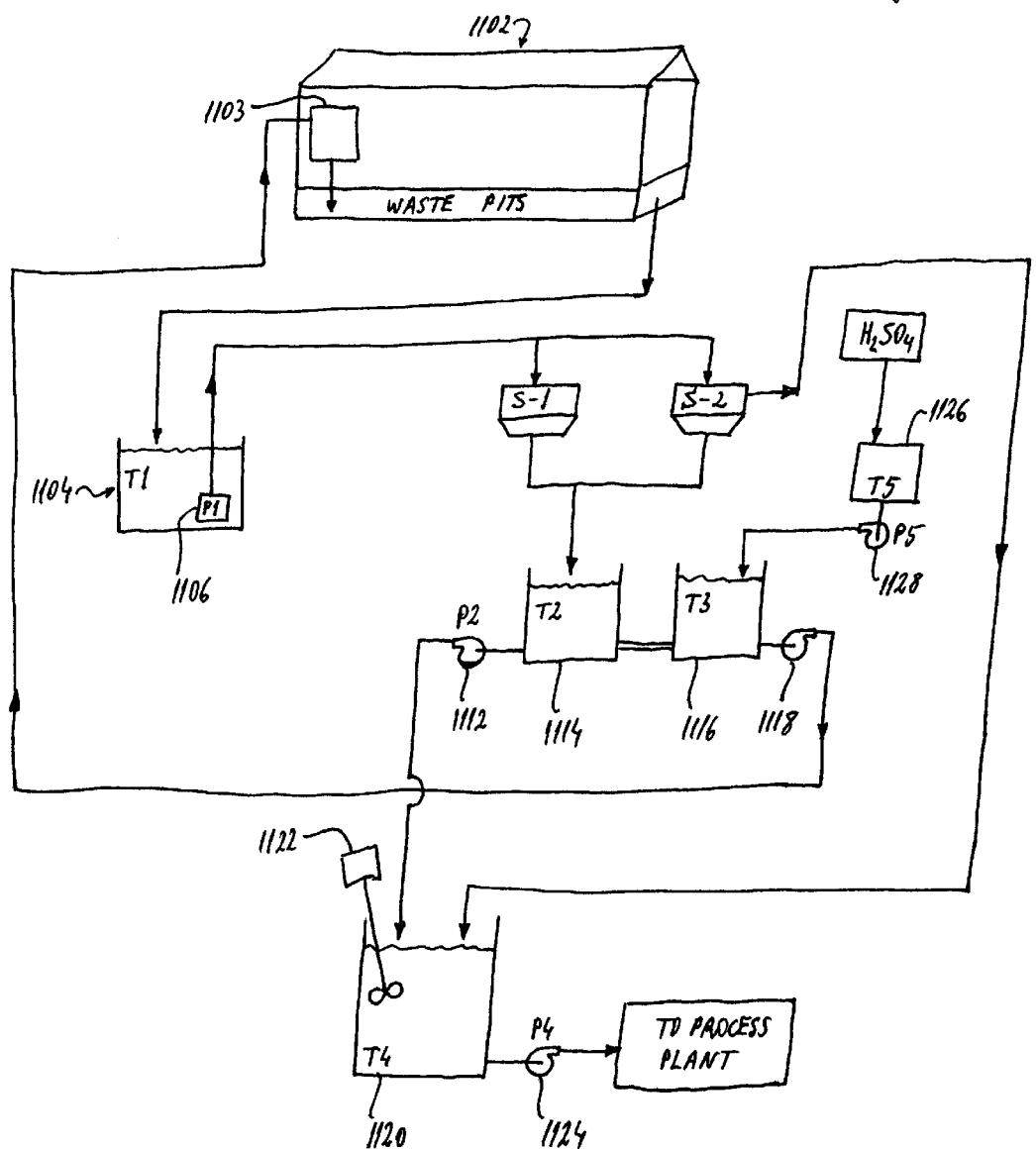
FIG. 10B schematically shows a flow chart for embodiments of an IRS system.

FIG. 10B schematically shows an embodiment of IRS 1018 that comprises containers T1–T5 and barns 1102 with flush tanks 1103 that provide water to direct organic waste in the form of barn discharge to waste pits and then to a wet well T1 shown at 1104. Flush tanks 1103 are embodied in one example by two 750-gallon/barn tanks. Flushing is automated in some embodiments. Flush timers are set at a desired timing, such as at approximately 12 times/day.

Wet well 1104 collects in some embodiments the flushed organic waste through a gravity inlet at about 400 gpm. This well has in some embodiments a capacity of about 3000 gallons.

Chopper P1 shown at 1106 is embodied in some examples by a submersible pump, capable of circulating about 600 gpm of fluid with about 4% total solids. This fluid is directed as screen feed to a screening device, such as screens S-1 and S-2. These screens are embodied in some examples by agricultural type 48" circular screens, preferably equipped with 80 mesh screen cloth. Furthermore, the screens have in some embodiments an adjustable splitter to divide flows to screens.

Screen underflow receiver tank 1114 has in some embodiments a capacity of about 3000 gallons. Pump 1112 directs recycled product to product tank 1120. This pump preferably has an on/off operation that is controlled by a level control. In some embodiments pump 1112 circulates material at a rate of about 100 gpm.

Pump tank 1116 is embodied in some examples by a tank that has a capacity of about 3000 gallons. Pump 1118 directs recycled product in the form of IRS recycle with about 4% total solids to barns at about 400 gpm. Screen oversize is the screened solids obtained in the screening device. In some embodiments, a chute directs screened solids to product tank 1120.

IRS product storage tank 1120 is provided in most embodiments with agitator 1122, and its capacity is in most embodiments about 20000 gallons. Pump 1124 is a product pump that directs fluid in the form of IRS product with total solids in the range from about 6% to about 7%. In some embodiments, product pump directs material at a rate of about 14 gpm, and the IRS product is directed to a process plant as organic waste to be further treated as described herein.

Tank 1126 is a bulk acid delivery tank, that in the example depicted in FIG. 10B is sulfuric acid, for example concentrated sulfuric acid. The capacity of this tank is in some embodiments about 500 gallons. Device 1128 is typically embodied by a sulfuric acid metering pump and set to regulate a flow that in most embodiments is about 50 ml/min.

Changes in the capacity and flow rates given herein as examples can be changed depending on the confined animals and the size of the facility. Tanks T2 and T3 can be combined into a single container in other embodiments. Although it is not shown in FIG. 10B, some embodiments are provided with process tank emergency overflows to a lagoon. In other embodiments, the return lines (plant effluent) from the process plant are designed to be "swapping lines" with the product pipe. Tanks such as tanks T2 and/or T3 are provided in some embodiments with mechanical aeration. Screens S-1 and/or S-2 have at least a second deck in some embodiments. The volume of tank 1120 is reduced in some embodiments by providing storage at the process plant. The screened solids are in some embodiments kept separate from the IRS product for alternative processing; wet solids from the screens typically have total solids in the range from about 20% to about 30%. The containers and devices schematically shown in FIG. 10B are in some embodiments housed, or at least protected from the atmospheric elements, such as freezing temperatures, in appropriate structures. Other embodiments use sulfuric acid that has different concentration, in which case the conversion to flow rate to be supplied can easily be computed from the flow rate given herein as an example for sulfuric acid.

Flow rates for an example according to the diagram schematically shown in FIG. 10B are given in Table 1. It is understood that every figure given in this and in any other table provided herein is understood as being preceded by the term "about". For example, the total solids in the barn discharge is to be read from Table 1 as being about 5%.

TABLE 1

| Item | Characteristic | % TS | Rate (gpm) | Density (g/ml) |
|---|---|---|---|---|
| Barn discharge | Slurry | 5 | 400 | 1.01 |
| Screen feed | Slurry | 5 | 600 | 1.01 |
| Screen underflow | Slurry | 4 | 400 | 1.01 |
| Screen oversize | Wet solids | 20–30 | 0.25 tph(*) | — |
| IRS recycle | Slurry | 4 | 385 | 1.01 |
| IRS product | Slurry | 6–7 | 15 | 1.03 |
| Sulfuric acid | Concentrated | 95%(**) | 50 ml/min(+) | 1.75 |

(*)Given as ton/h (tph)
(**)Refers to the sulfuric acid concentration
(+)Given in ml/min The examples of flow rates given in Table 1 refer to examples that operate in a temperature range that is preferably from about 50° F. to about 80° F.

Figure 10C:
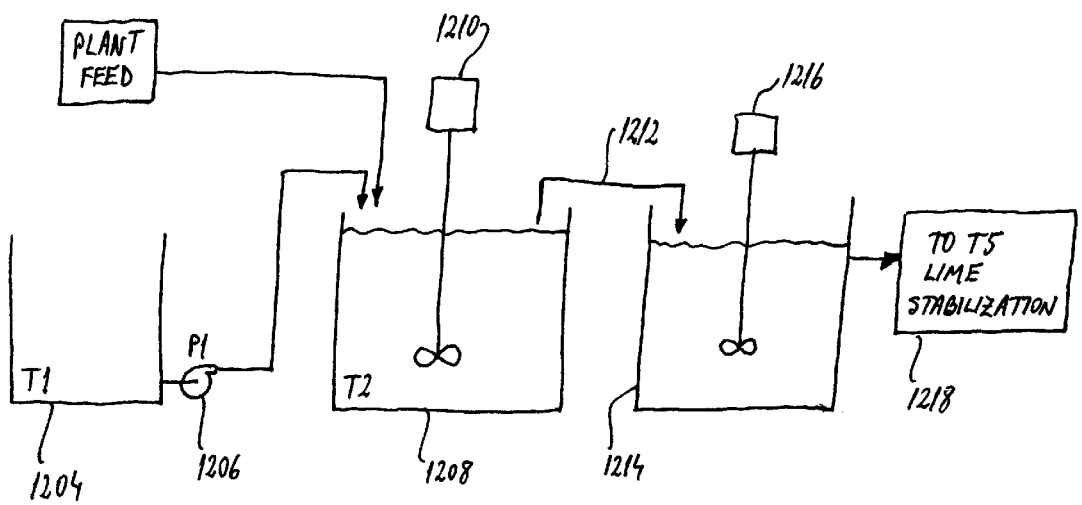
FIGS. 10C–10D schematically show flow charts for embodiments of a crystallizer.
Figure 10D:
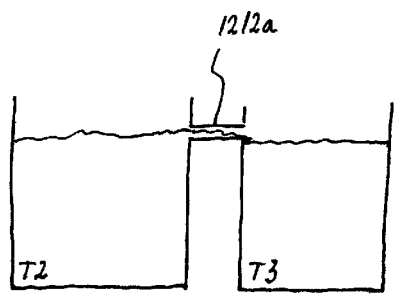

FIG. 10C schematically shows a diagram for embodiments of struvite crystallizers that are implemented in embodiments of the present invention. In the example shown, plant feed is provided at a rate of about 135 gpm with about 6% TS (such as IRS product) and a density of about 1.03 g/ml.

Magnesium salt, such as magnesium chloride brine, is directed from tank 1204 by pump 1206 to tank 1208. Pump 1206 is preferably a metering pump that directs brine at a rate of at least about 1 gpm. Tank 1208 is preferably an agitated tank with agitator 1210 that is designed for a retention time of about 15 minutes. Its capacity is about 2500 gallons in the example given here, and tank 1214 is analogous to tank 1208. Flow 1212 is directed from tank 1208 to tank 1214. In some embodiments, this flow is directed by gravity overflow conduit 1212a shown in FIG. 10D.

Magnesium chloride brine is supplied in some embodiments at a rate of about 0.3 gpm (about 400 gpd or about 800 tpy) of an aqueous solution of about 32% magnesium chloride and a density of about 1.32 g/ml. Other magnesium salts that are employed in other embodiments include any form of magnesium sulfate, any form of magnesium potassium sulfate and combinations of such salts. In some embodiments, solid salts are used, in which the appropriate handling equipment is used, such as a silo, solid product unloading equipment, and agitation of tank 1204 when the solid product is dissolved therein.

Figure 10E:
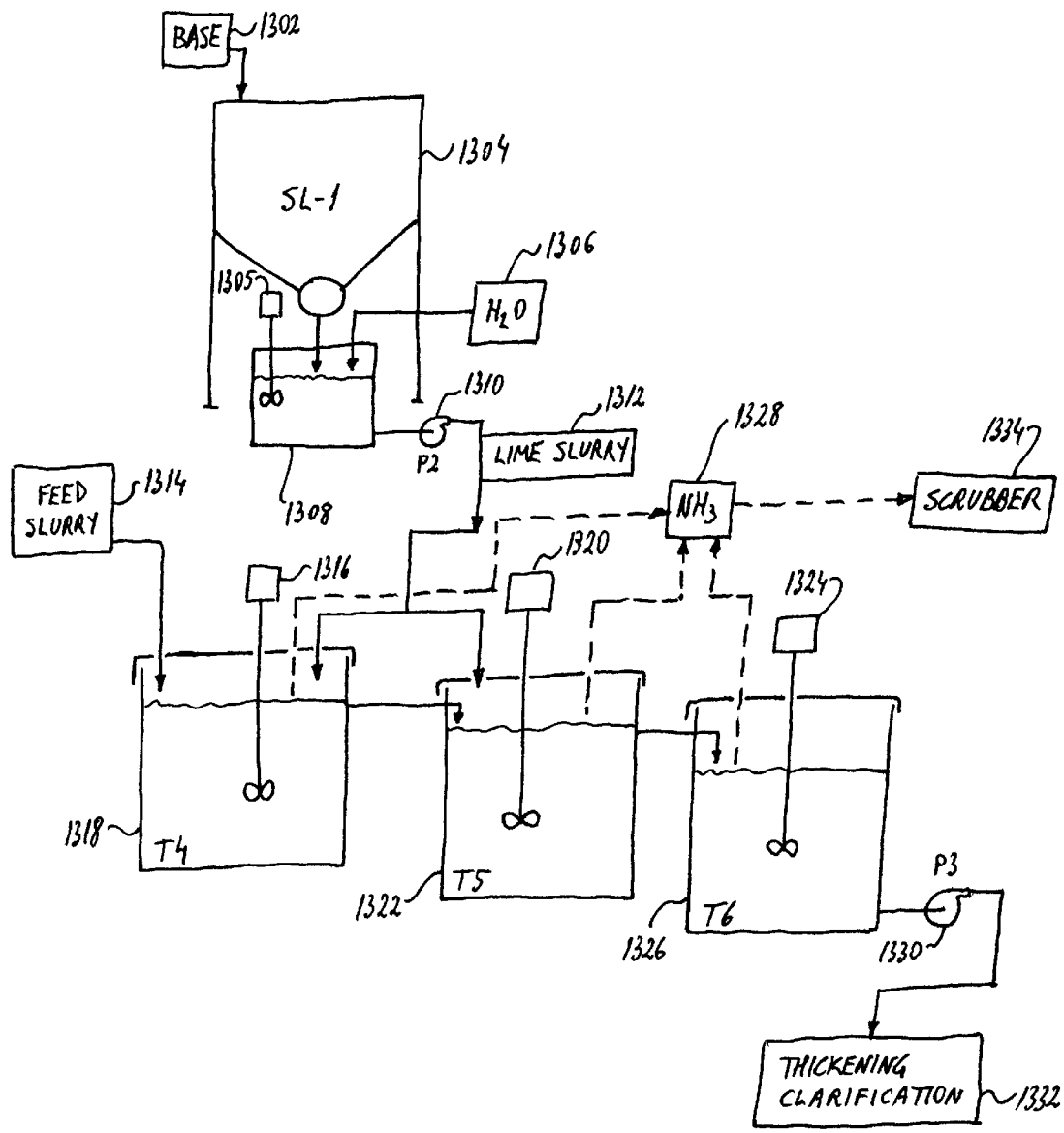
FIG. 10E schematically shows a flow chart for embodiments of a base stabilization system.

The product slurry that is directed in 1218 to a system such as that schematically shown in FIG. 10E, has in this example about 6% total solids, a density of about 1.03 g/ml, and it is generated at a flow rate of about 135 gpm. A system such as that schematically illustrated in FIG. 10C reduces short circuiting in its operation.

FIG. 10E schematically shows a base stabilization system, where the base 1302 that is shown as an example is lime. Feed slurry 1314 is shown at 1218 in FIG. 10C, and is generated in this example at a flow rate of about 135 gpm with about 6% total solids. This slurry is treated in preferably a plurality of containers 1318, 1322 and 1326. These containers are preferably covered (not shown) to capture stripped ammonia 1328 that is directed to scrubber 1334 and crystallizer to form ammonium sulfate. About 0.2 tph of ammonia are obtained in the example shown in FIG. 10E. The flow of ammonia is preferably directed by a suction pump in the ammonium sulfate circuit. Preferably, ammonia flow is at least about 300 cfm at about 70° F., and preferably about 1000 cfm (about 0.2 tph ammonia).

Agitators, such as agitators 1305, 1316, 1320, and 1324 are provided as needed. Lime slurry 1312 is directed to tanks 1318 and 1322 by pump 1310 at about 8 gpm and about 20% solids. Lime slaker 1308 is typically embodied by a standard industrial slaker, and tanks 1318, 1322 and 1326 are preferably designed for a retention time of at least about 2 hours, with a volume of at least about 16200 gal (total). Other embodiments have a total tank capacity of about 60000 gal with retention time of about 7.5 hours. These tanks are preferably covered so that ammonia can be extracted by a suction pump.

Lime can be provided in the form of slurry with a pH of about 10.5 at about 0.48 tph (about 11.4 tpd, about 4170 tpy). Water 1306 is provided for slaking the lime at a flow rate of about 1.92 tph (about 7.8 gpm).

Pump 1330 directs slurry discharge to a thickener/clarifier at a flow rate of about 143 gpm with about 7% total solids.

Figure 10F:
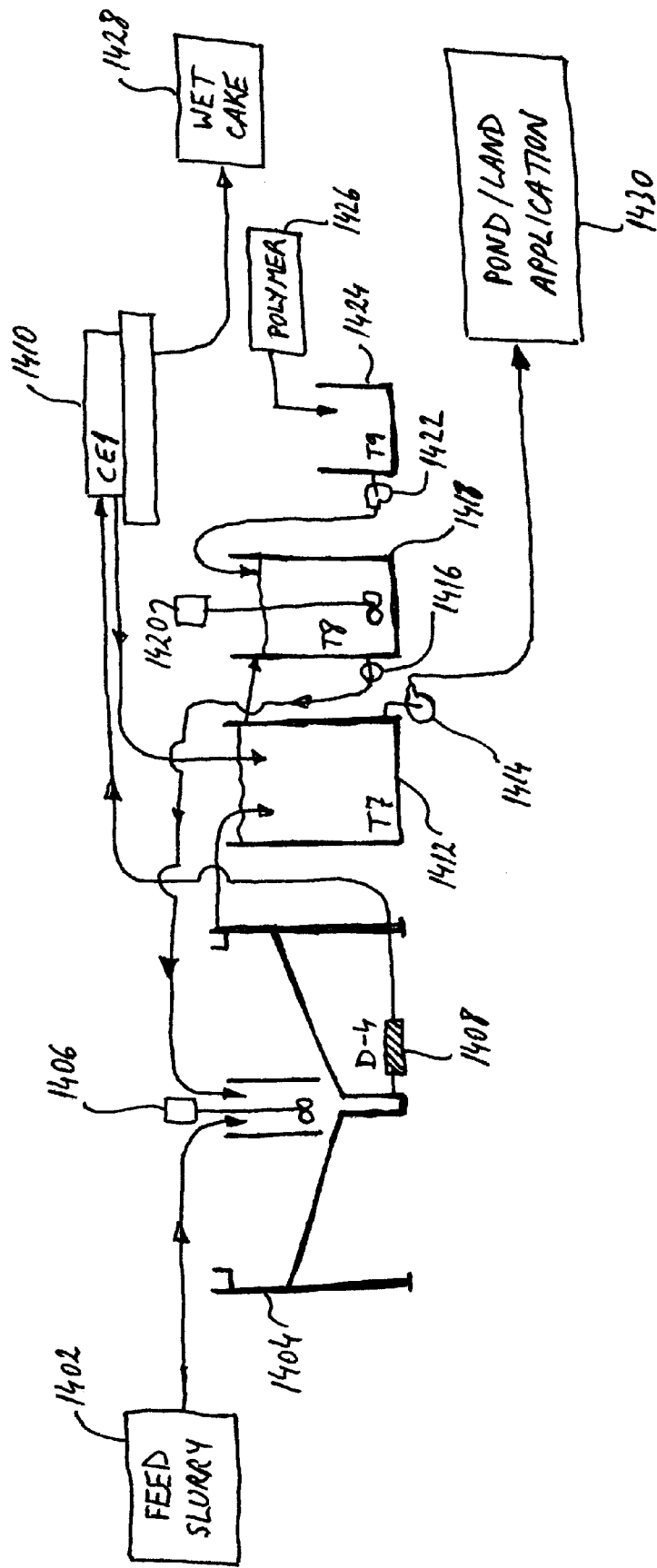
FIG. 10F schematically shows a flow chart diagram for embodiments of a clarification, thickenening and centrifugation system with off-line addition of flocculent.
Figure 10:
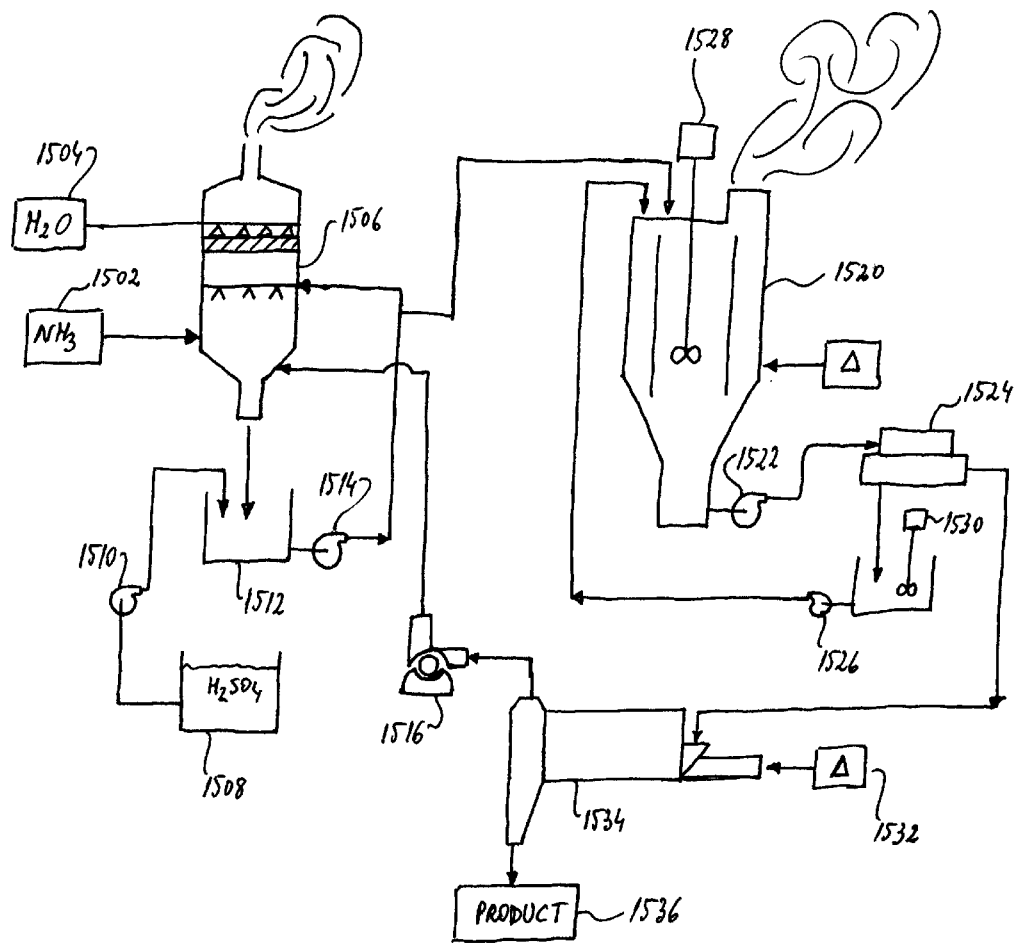
FIG. 10G schematically shows a flow chart diagram for embodiments of an ammonium sulfate recovery circuit.

FIG. 10F schematically shows an example of a thickening, clarification and centrifugation system Feed slurry 1402 corresponds to the material directed by pump 1330 in FIG. 10E.

The flocculant in this embodiment comprises a polymer aqueous solution 1426 at a concentration of about 1000 ppm. The polymer emulsion is used at a flow rate of 12.9 lb/h at 26 gpm of centrate. Embodiments of this invention need as little as 2 lb to 5 lb polymer per ton of dry product obtained form the process.

Thickener 1404 in this example has a diameter of about 30 ft and is provided with a center well for flocculation under low shear agitation with agitator 1406. The slurry is thickened to about 12% total solids, and a low shear pump 1408 is used to direct the flocked slurry to centrifuge 1410. An example of such low shear pump is a Moyno pump. Tank 1412 is configured for receiving the separated fluid from thickener 1404 and the liquid from centrifuge 1410, so that it provides a retention time of about 1 h with a capacity of about 10000 gal.

The low solid overflowing fluid fraction from tank 1412 is directed to tank 1418 that is provided with a low shear agitator 1420 that mixes such fluid with the flocculant that is directed from tank 1424 by pump 1422. The polymer solution so prepared, is directed to thickener 1404 by pump 1416. Tank 1418 is designed for a retention time of about 30 min with a flow rate of about 26 gpm and a capacity of about 1000 gal. The low solid liquid fraction from centrifuge 1410 is also used in some embodiments to prepare the flocculant in at least one of tanks 1418 and 1424.

Addition of flocculant as described in the context of the examples illustrated by FIG. 10F and equivalents thereof is termed off-line flocculant addition. When compared with methods that use in-line addition of polymer, off-line flocculant addition lead to a reduction in the amount of polymer from about 20–40 lb/ton of final dry product to about 2–10 lb/ton of final dry product. Furthermore, the amount of total solids in wet cake 1428 increased from about 15–25% to about 30–40%, and the recovery of total solids increased from about 70–85% to at least about 90%. Low shear treatment as described in connection to the embodiments illustrated by FIG. 10F is believed to contribute to the reduction in the amount of the flocculant and to the enhanced recovery of total solids. Reduction in the amount of flocculant is an important feature because flocculant polymers are expensive materials that, if used in large amounts, would render the treatment process prohibitively expensive.

Centrifuge 1410 is embodied in some examples by a Scroll type centrifuge for dewatering sludges, such as a Pieralisi "Baby" centrifuge that operated at a flow rate of about 85 gpm at about 12% total solids. Wet cake 1428 is obtained from centrifuge 1410 and it is directed for further treatment, such as a thermal treatment.

Pump 1414 directs fluid from tank 1412 to applications 1430 such as farm use, storage ponds, and land application, at a flow rate of about 134 gpm with about 1% total solids (about 14.9 gpm/farm site).

FIG. 10G schematically shows an ammonium sulfate circuit that is part of embodiments of the present invention. Ammonia 1502 in FIG. 10G is generated, for example, in the wet process shown in FIG. 10E as ammonia 1328. Ammonia is directed to scrubber 1506 where it is scrubbed with water 1504 and an aqueous solution of sulfuric acid 1508 that is directed to the scrubber by pumps 1510 and 1514. Water is supplied in this example at a flow rate of about 3 gpm. An embodiment of scrubber 1506 is a Venturi scrubber with about 2500 acfm.

Sulfinic acid 1508 is typically concentrated sulfuric acid (about 95%) that is directed at a flow rate of about 0.8 tph (about 2 gpm or about 7000 tpy) to container 1512 where it is diluted by the fluid obtained from scrubber 1506.

Evaporative crystallizer 1520 is optional. Embodiments that do not comprise an evaporative crystallizer treat the ammonium sulfate solution from scrubber 1506 (that contains about 40% ammonium sulfate) in a primary fertilizer dryer.

Ammonium sulfate solution from the scrubber is directed in some embodiments to a crystallizer 1520 such as an evaporative crystallizer with an evaporative load of about 1500 lb/h of water, that is preferably provided with an agitator 1528. Heat Δ is supplied to crystallizer 1520.

The product from the crystallizer is directed, with optional agitation provided by agitator 1530, by pump 1522 to centrifuge 1524, where the liquid fraction is preferably directed back to the crystallizer by pump 1526 and the solid fraction is directed to dryer 1534. The solid fraction from the centrifuge is embodied in this example by a product with about 20% water that is obtained at a rate of about 2500 lb/h. Heat 1532 is supplied to the dryer and fertilizer product 1526 is obtained. Exhaust at about 1500 acfm at about 250° F. from the dryer is directed by fan 1516 to scrubber 1506. Final dry product 1536 provides ammonium sulfate at a rate of about 8760 tpy (about 1 tph). Optional final product storage with a capacity for about 5000 tons of final dry product 1536 is provided in some embodiments.

Figure 11A:
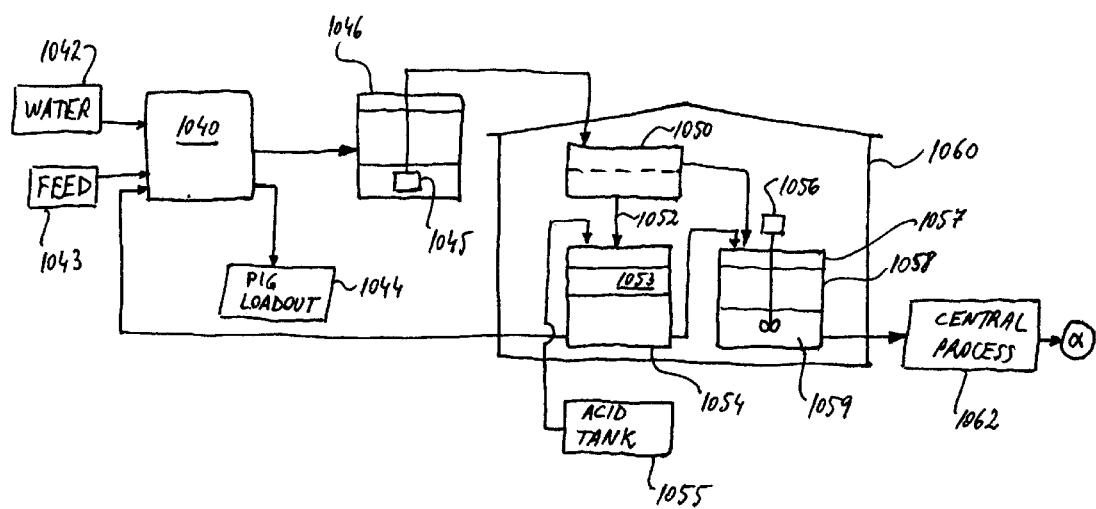
FIG. 11A shows a schematic diagram of an organic waste production facility with an IRS system.
Figure 11B:
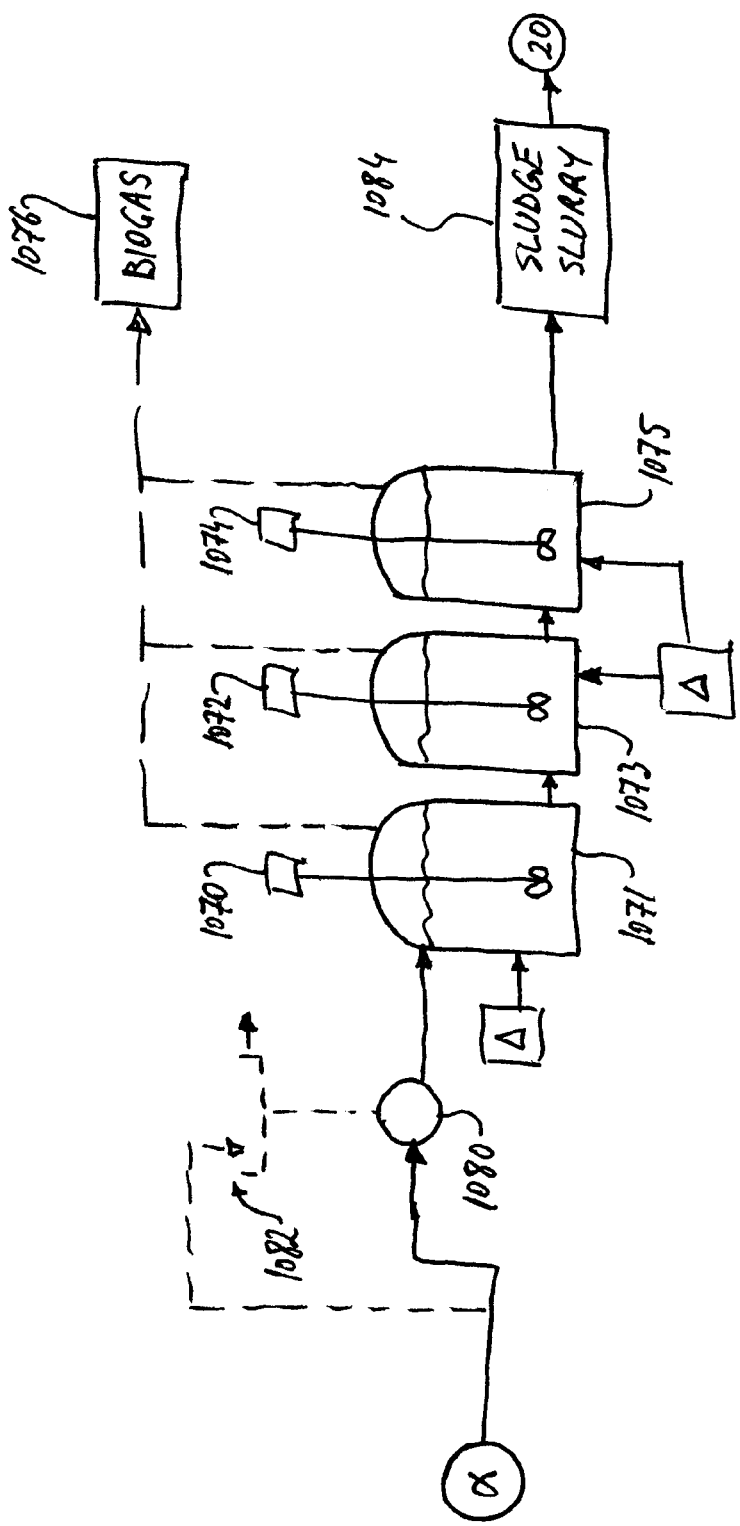
FIG. 11B schematically shows a flow chart diagram for embodiments of a digestion system.
Figure 11C:
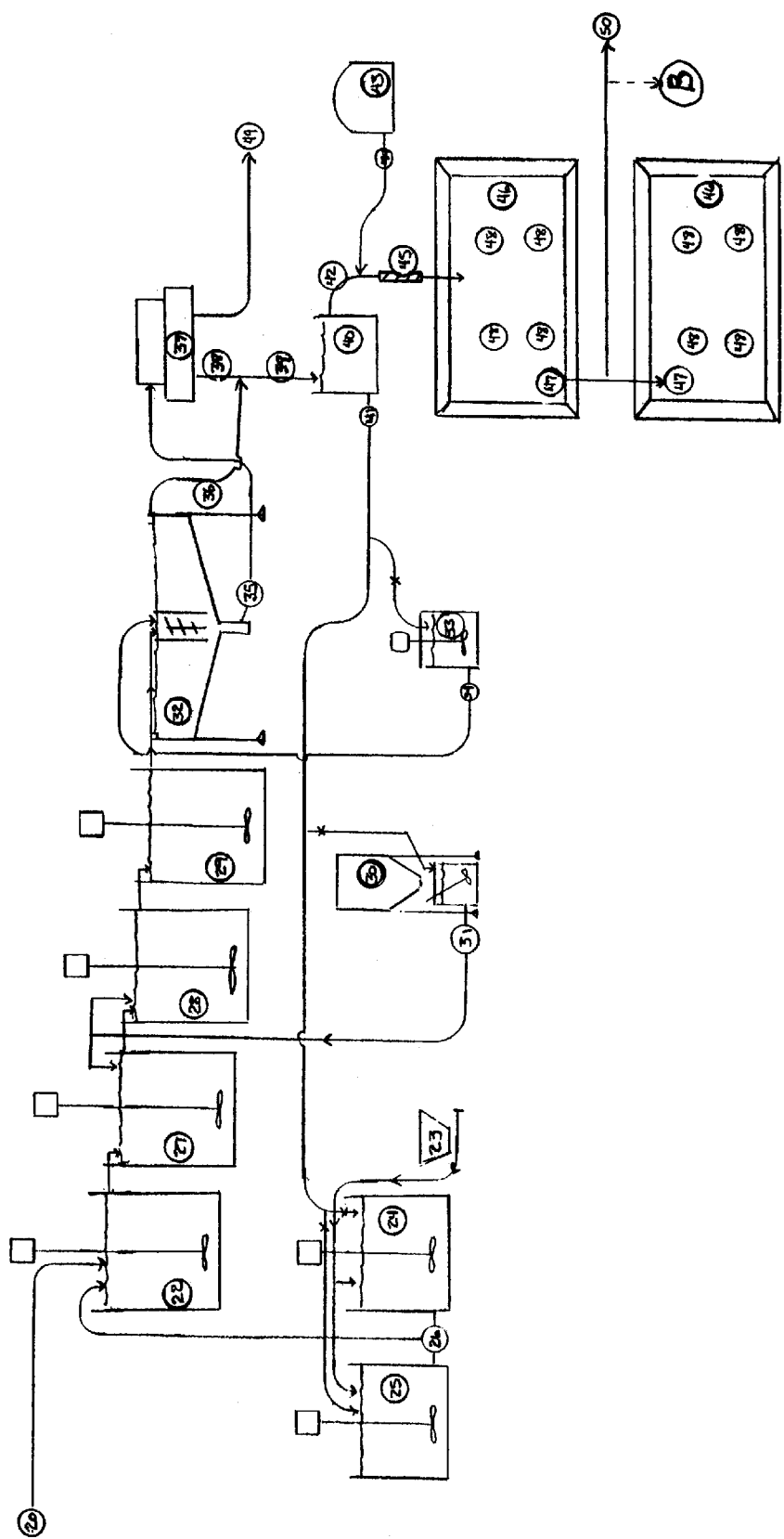
FIG. 11C schematically shows a flow chart diagram for embodiments of a wet process for fertilizer production.

FIGS. 11A–11C show schematic diagrams of additional examples of embodiments of this invention. FIG. 11A schematically shows an example of an embodiment of an IRS concentration system that generates slurry to be directed to a central process 1062 at a. FIG. 11B schematically shows an example of an embodiment of a thermophylic digestion system to generate sludge at 20 that is directed to a wet fertilizer production process as described hereinabove and as schematically shown in the form of an example in FIG. 11C.

It is understood that the following and any other parameters and numerical data provided herein apply by way of examples, but not as limitations, to embodiments that are described herein in more detail as illustrative examples. Additional examples with modified parameters and numerical data are within the scope of the present invention and they can be obtained by modifying the disclosed parameters and numerical data with the ordinary skill in the art and with the design criteria described herein.

Fresh water 1042 and feed 1043 are supplied to a grow/finish farm 1040. Water is supplied at a maximum average flow rate of about 15 gpm, with intermittent washout flows of about 50 gpm. Feed is supplied at a rate of 5800 tpy. Pig loadout 1044 from farm 1040 was about 2080 tpy of grow/finish gain.

Farm 1040 comprises 16 flush tanks, each with a capacity of about 750 gal, thus providing a total capacity of about 12000 gal. Water flow from the flush tanks is computer controlled. For example, a Rainbird 48 station 24v controller was used for such water flow control. These tanks are configured for storing recycle fluid from recycle tank 1054. A pump is provided to direct the flow from tank 1054 to the flush tanks in farm 1040 with a shot down mechanism that can be actuated on high level storage in tanks 1054, 1046 and 1059. This mechanism is preferably automated, although it can be manual in other embodiments. The recycle pump provides a recycle fluid at a flow rate of about 400 gpm.

Farm 1040 includes ten farm units, each provided with an IRS system. Discharge from farm 1040 is directed to wet well 1046 at a flow rate of about 415 gpm with about 5% total solids. This rate is an average value, and the actual instantaneous flow rate will vary depending on flush sequence and during barn washout. Wet well 1046 is preferably located at a confluence of barn discharges and it is preferably sized at about three times the flush tank volume, which is in this example about 3000 gal including freeboard. Wet well 1046 is provided with a pumping system, such as pump 1045, that is preferably embodied by a submerged chopper pump and is sized at about 110% of the recycle pump flow or 440 gpm. A grinder type pump is another example of an embodiment of pump 1045. In any case, the pumping system is preferably provided with a low level pump shutoff.

The top level shown within containers 1046, 1054 and 1058 indicate high level probes that are provided to shutoff the flush tank sequencer in farm 1040 and the pump that directs recycle fluid from tank 1054 to the flush tanks in farm 1040.

The pumping system in the wet well directs organic waste to screen system 1050, which was embodied by a 60 in Duco, 50 mesh screen system. The coarse solids are directed from screen system 1050 to product storage tank 1057 by a chute. These wet coarse solids contain about 20% total solids. Screen underflow slurry 1052 with about 4% total solids is directed to recycle tank 1054 at a flow rate of about 400 gpm.

Recycle tank 1054 was embodied by a 8 ft×8 ft stainless steel tank with a capacity of about 3000 gal. A fine solid pump directs flow from recycle tank 1054 to product storage tank 1058 at a flow rate of about 50 gpm with about 5% total solids. Recycle tank 1054 was provided with a low level protection system.

Acid tank 1055 provides an acid supply that in the present embodiment was sulfuric acid. This tank capacity was about 300 gal and provided a supply for about 20 days. Acid was directed from tank 1055 to recycle tank 1054 by a metering pump that regulated the flow rate in the range from about 0 ml/min to about 50 ml/min.

Product storage tank 1058 performed as a slurry storage and pickup tank and it was embodied by a 8 ft×8 ft tank with a capacity of about 3000 gal, and it was provided with agitator 1056. This tank is preferable made of stainless steel, although other materials could also be used. A slurry pump directs slurry from product storage tank 1059 to central process 1062 at α at a maximum flow rate of about 15 gpm with about 7% total solids. The organic waste with higher total solids that is obtained from embodiments of IRS units is herein designated IRS product. This product comprises total solids in the range from about 3% to about 10%.

It is preferable that at least the screen system, the recycle tank and the product tank be housed in a structure that protects them from adverse atmospheric conditions, such as freezing temperatures. These constituents were housed in the present embodiment in a 24'×24'×16' process building or pole barn.

As shown in FIG. 11B, IRS product at α is directed to grinder 1080 and them to a digestion system that in this embodiment comprised three digesters 1071, 1073 and 1075 that provided a total digestion volume from about 300000 to about 1000000 gal depending on the operational regime. Heat Δ was supplied to the digestion system, and each digestor is preferably provided with an agitator such as agitators 1070, 1072 and 1074.

Feed to the digestion system is embodied by at least one of IRS product, screened oversize from plant feed slurry, entire organic waste, and combinations thereof. Different feed options are schematically illustrated in FIG. 11B by alternate path 1082. Economic considerations related to energy cost play an important role on whether to incorporate a digestion system in embodiments of the present invention.

Embodiments of the methods to treat organic waste and obtain fertilizer according to the present invention direct organic waste to a wet process for obtaining fertilizer. Other embodiments direct the organic waste to an IRS and then direct the IRS product to a wet process for obtaining fertilizer. Still other embodiments are provided with a digestion system. Furthermore, some embodiments include ammonia stripping. Table 2 schematically shows a plurality of embodiments according to the present invention, where "Y" means that the class of embodiments in a given column includes the feature in the corresponding row and "N" means that the class of embodiments in a given column does not include the feature in the corresponding row.

TABLE 2

| Feature | Class 1 | Class 2 | Class 3 | Class 4 | Class 5 | Class 6 | Class 7 | Class 8 |
|---|---|---|---|---|---|---|---|---|
| Organic waste | Y | Y | Y | Y | Y | Y | Y | Y |
| Digestion | N | Y | N | Y | N | Y | N | Y |
| IRS | N | N | Y | Y | N | N | Y | Y |
| NH$_3$ stripping | Y | Y | Y | Y | N | N | N | N |
| Fertilizer | Y | Y | Y | Y | Y | Y | Y | Y |

Examples of embodiments that comprise a reactor/clarifier include features such as those shown in FIGS. 1–6, 10F, 11C. Examples of embodiments that comprise in-line addition of flocculant include features such as those shown in FIGS. 4–6 and 11C. Examples of embodiments that comprise off-line addition of flocculent include features such as those shown in FIG. 10F. Examples of embodiments that comprise a digestion system include features such as those shown in FIGS. 1–3, 11B. Examples of embodiments that comprise an IRS include features such as those shown in FIGS. 10A, 10B, 11A. Examples of embodiments that comprise ammonia stripping include features such as those shown in FIGS. 6–8, 10E, 10G.

Thermophylic digestion is comprised in some embodiments of the present invention. Digestion is preferably incorporated to produce gas for product dryer and to increase product NPK analysis. Generated gas can be used to fuel a generator, and it can sustain or supplement a gas supply depending on the amount of organic waste treated and on the energy needs of any particular embodiment of the present invention under specific local conditions. Gas generation peaked in some embodiments of the present invention at the early digestive stages.

Biogas 1076 was obtained. This gas can be directed to energy demanding systems such as an electric generator and a fertilizer dryer. Parasitic heat was supplied to the digestors. Some embodiments have a parasitic load that consumes about 40% of the generated biogas and take about 10 days for digestion. Other embodiments have a parasitic load of about 70% and a digestion retention of about 5 days. Feed at α that comprises about 82% of volatile solids and is reduced by about 60% in volume in a digestion system according to the present invention leads to the obtention of fertilizer with an an analysis increased to about 15-15-15 NPK.

Digested product, preferably in the form of sludge or slurry 1084, is directed at 20 to a wet fertilizer production process. An embodiment of such process is schematically shown in FIG. 11C.

Some of the features schematically depicted in FIG. 11C are not relabeled because they are analogous to similar features already described herein. Feed at 20 in the flow chart shown in FIG. 11C comprises at least one of entire organic waste, IRS product, digested product, and combinations thereof.

Feed at 20 was provided at a flow rate of about 150 gpm with about 7% total solids. This feed was directed to a crystallizer system that comprised struvite crystallizer tank 22 with a capacity of about 10000 gal and provided a retention time of about one hour.

Potassium magnesium sulfate (for example in the form of langbeinite) from hopper 23 was transferred to tanks 24–25 for dissolution. The hopper was embodied by a 25 ton hopper that provided solid at a rate of about 5 tph. As indicated herein, other magnesium salts can also be used instead of or in combination with potassium magnesium sulfate, and the salts comprise salts in the form of aqueous solutions, including brine.

Tanks 24–25 were embodied by two tanks each, with an individual capacity of about 6000 gal. These tanks provided a retention time of about 12 h and solutions of about 12%. Centrate was used as feed liquor to dissolve magnesium salts in tanks 24–25, but fresh water can also be used in other embodiments.

Transfer pump 26 directed magnesium salt solution at a flow rate of about 8.33 gpm to the crystallizer and stabilization tanks. Tanks 27, 28, and 29 represent a series of base stabilization tanks, where the base was embodied by lime and the tanks were embodied by 10000 gal tanks that provided a retention time of about three hours. In embodiments with three stabilization tanks, the pH in tank 27 is increased by base addition to a value in the range from about 8 to about 9, preferably about 8.5, and the pH in tank 28 is increased by base addition to a value in the range from about 9 to about 10, preferably about 9.5. The pH is increased to a value in the range from about 10 to 11, preferably about 10.5, when ammonia is recovered as described herein.

Lime slaking at 30 consumed about 600 lb/h of lime when the pH was increased to about 9.5 and it consumed about 900 lb/h when the pH was increased to about 10.5. The lime supply was about 2600 tpy, or about 7.2 tpd and it was added as 20% solution. Although fresh water can be used in some embodiments for slaking, centrate was used to conserve fresh water resources. The bin size at 30 was such that about 20 tons of material could be accumulated. Lime slurry was directed by pump 31 to tanks 27–28 with a flow rate of about 6 gpm.

Reactor/clarifier 32 was designed in the form of a 36' device that was configured for flocculant polymer addition. The feed rate form tank 29 was about 177 gpm. The flocculant was prepared in polymer make-up tank 33 and it consumed about 4 lb/h of polymer that in some embodiments was NALCO 7194 emulsion added to obtain a concentration of about 1000 ppm. Although water could be used, centrate was used at 33 at a rate of about 8 gpm. Tank 33 had a capacity of about 500 gal and provided a retention time of about one hour. The flocculant was directed to the reactor/clarifier at a flow rate of about 8 gpm with, for example, pump 31.

The effective use of flocculant at a concentration of about 1000 ppm (about 0.1%) is in clear contrast with most conventional techniques that rely on flocculent at concentrations of at least 1%. A reduction in the amount of flocculant by at least one order of magnitude is an important feature, particularly in light of the cost of the flocculant material used in some embodiments of this invention.

Pump 35 directed sludge from the reactor/clarifier at a flow rate of about 88.5 gpm with about 14% total solids to centrifuge 37, that was embodied by a Pieralisi Jumbo 3 decanter centrifuge, but other equivalent devices could also be used. Reactor/clarifier overflow at a flow rate of about 88.5 gpm with about 1% total solids was obtained at 36, and it was mixed with centrate 38 that was obtained from centrifuge 37 at a flow rate of about 44 gpm with about 1% total solids. Effluents 39 were directed at a flow rate of about 132 gpm with about 1% total solids to pump tank 40 that had a capacity of about 300 gal. This tank provided process recycle liquor 41 at a flow rate of about 22 gpm that was used for at least one of the slaking, polymer preparation and magnesium salt dissolution operations.

High solid centrifuge product 49 was directed to a fertilizer plant at a rate in excess of 10 tph with about 28% total solids, equivalent to about 28000 dry basis tpy. Some volatile solids are lost when a digestion system was used in some embodiments of this invention.

Water and fertilizer recovery can optionally be enhanced by directing process effluent 42 to an aeration/mixing ditch upon mixing of the effluent with an acid to reduce, or even neutralize, the excess basicity of the effluent. Effluent 42 was obtained at a flow rate of about 110 gpm, about 178 acre-feet/year. For this purpose, sulfuric acid was provided from tank 43 and delivered with an acid transfer pump at a flow rate of about 1 gpm. Tank 43 had a capacity of about 5000 gal and about 3000 tons of sulfuric acid were consumed per year. Prior to directing effluent 50 at B to an ice field at a flow rate that was about 1200 gpm, this effluent can optionally be subject to pond aeration windmills 48 (four per pond were used). This aeration reduces COD and BOD loadings. Transfer pumps 47 were used to transfer effluent between ponds and to the ice field. Lagoons 46 received effluent and each lagoon had a capacity of about 100 acre-foot.

Effluent that is directed to an ice field at B is subsequently treated as described in U.S. patent application Ser. No. 10/038,294, filed on Oct. 23, 2001, which is incorporated herein by reference in its entirety. When ammonia stripping is desired, the process is modified as indicated for example in the embodiments illustrated in FIGS. 10E and 10G. Embodiments that do not incorporate the treatment of effluent 42 in ice fields can direct the effluent to land application with or without lagoon storage.

Organic waste treated according to some embodiments of the present invention includes any one of the forms of organic waste referred to herein together with lagoon sludge added to it. This form of organic waste permits the treatment of sludge from existing lagoons and consequently reduces land application and sludge disposal problems. Addition of sludge in embodiments of this invention takes place for an increase in production in the range from about 20% to about 50%.

Figure 12:
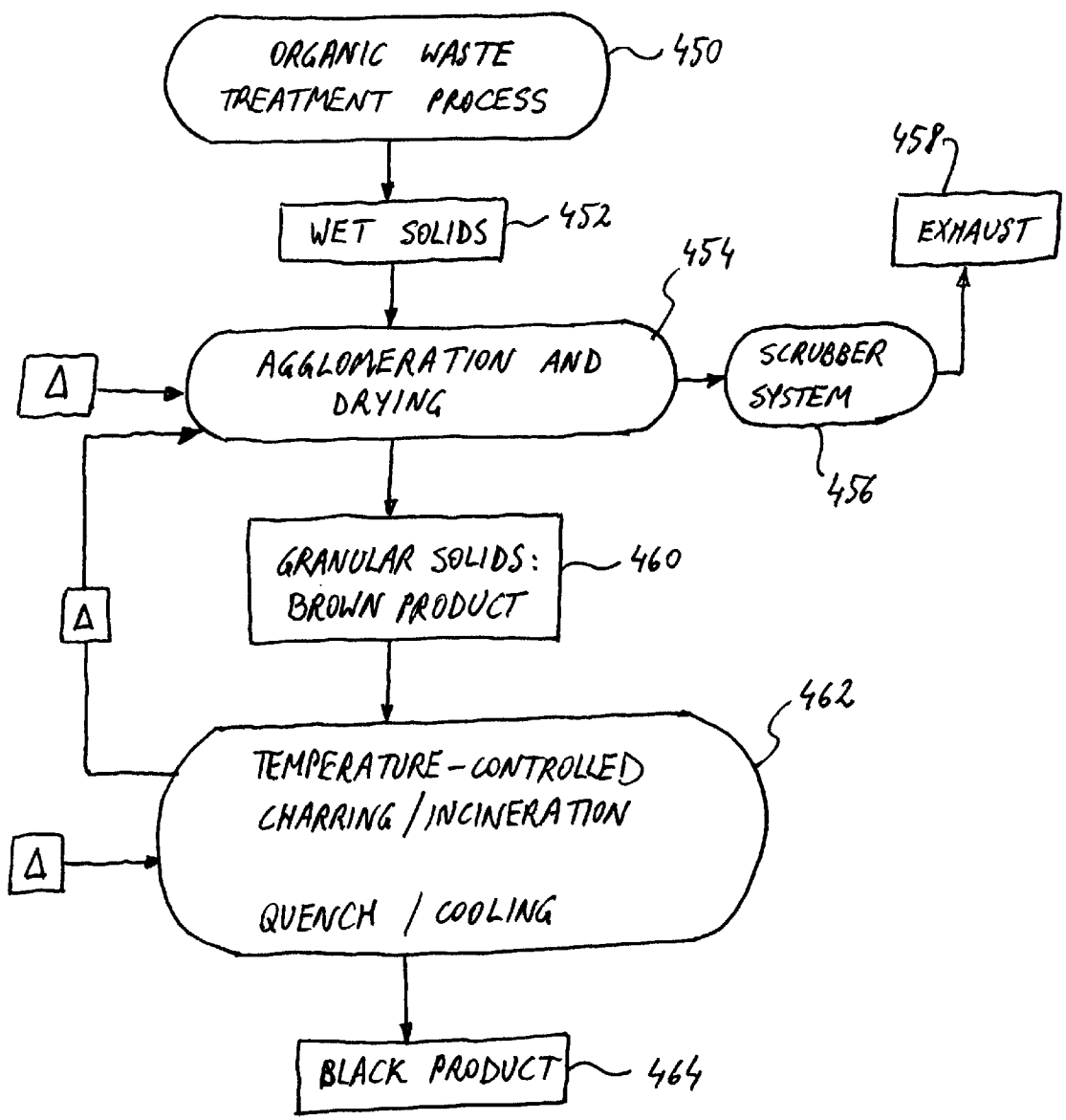
FIG. 12 schematically shows a flow chart for embodiments of a black fertilizer production process.
Figure 13:
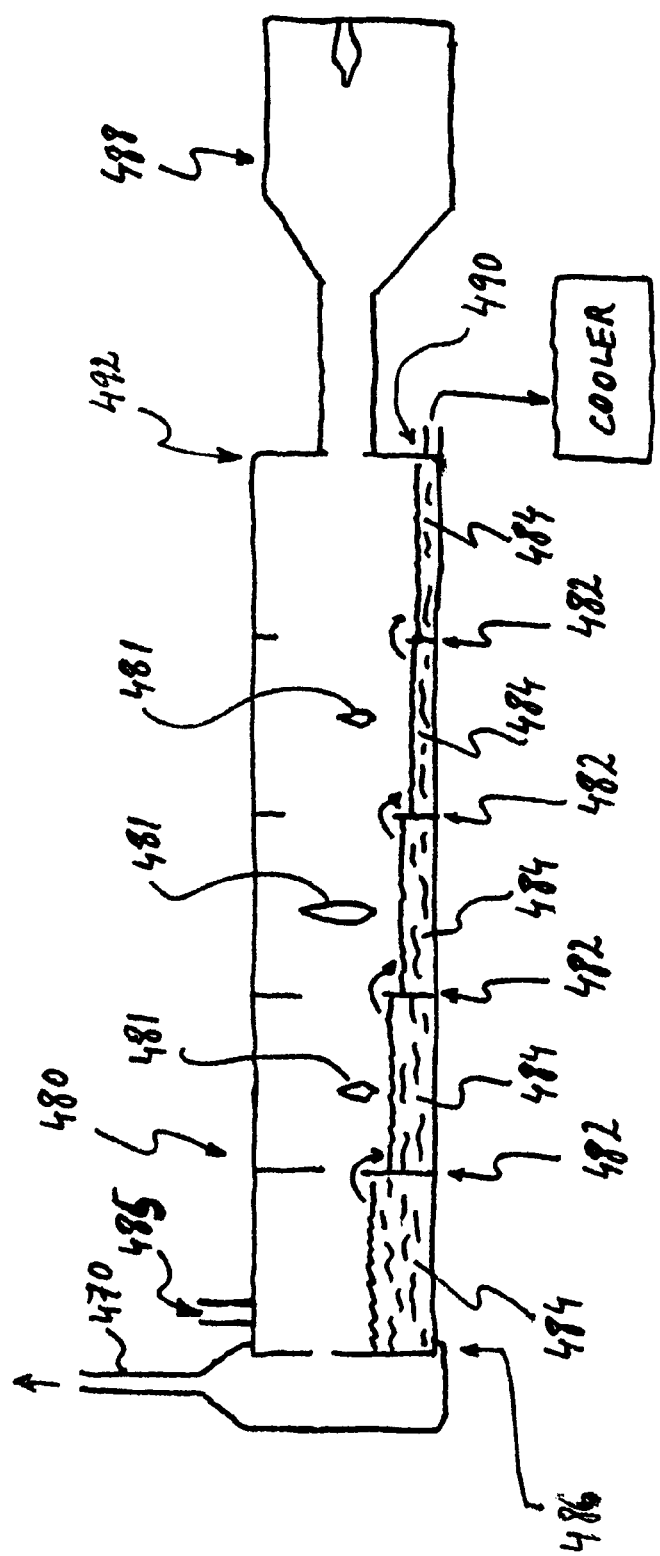
FIG. 13 schematically shows a kiln for the temperature controlled conversion of brown product into black product.

Other embodiments of the present invention do not include base stabilization and precipitation with magnesium salts. These embodiments comprise an IRS system that receives raw organic waste, a digestion system, and a fertilizer obtention process that comprises the addition of flocculent. This type of embodiments are comprised within class in Table 2. In some of these embodiments, mixing with the flocculant is preferably performed under low shear conditions, whereas in other embodiments mixing is performed under ordinary shear conditions. FIGS. 10A, 10B, and 11A provide examples of organic waste sources and IRS systems that are comprised in this type of embodiments. FIG. 11B provides examples of digestion systems that are comprised in this type of embodiments. Operations beyond the use of a reactor clarifier and/or thickener as schematically represented in FIGS. 1–6, operations as schematically represented in FIGS. 9 and 10F, operations as schematically represented in FIG. 11C at 32 and beyond this feature in the diagram shown therein, and operations as schematically represented in FIGS. 12–13 provide examples of fertilizer obtention processes that are comprised in this type of embodiments.

Embodiments that do not include base stabilization and precipitation with ammonium salts would yield low grade fertilizer because of their diminished capacity to recover potassium and nitrogen compounds as compared with the same recovery capacity of embodiments that comprise base stabilization and precipitation with magnesium salts, with or without ammonia stripping. To improve the fertilizer grade, these embodiments preferably comprise additional potassium and nitrogen recovery processes, such as freeze-thaw processes and/or evaporative processes.

Use of ice fields has already been referred to in regard to the embodiments represented by FIG. 11C. Effluent from a flocculation processing plant is sprayed in at least one ice filed to obtain brine that is concentrated in the nitrogen and potassium to be recovered, and a more diluted, or even fresh water, fraction. As indicated before, these techniques are described in U.S. patent application Ser. No. 10/038,294, filed on Oct. 23, 2001, which is incorporated herein by reference in its entirety.

In an embodiment of an anaerobic digestion system, ten IRS units pump slurry to a central plant digestor lift station. The total flow is transferred to one-of-five batch digestors. Anaerobic digestion reduces the IRS slurry volatile solids by about 60%. The anaerobic bacteria decompose the volatile solids releasing methane and carbon dioxide. The gas composition is approximately 60% methane, 40% carbon dioxide, and a trace of hydrogen sulfide.

A batch digestor has a total volume of about 1.3 million gallons, with a process cycle time of about one week to fill, three weeks of digestion, and one week to pump out 70% of the total volume. The remaining sludge (about 30%) will act as a bacteria seed for the next fill cycle of fresh slurry. Five digesters are sequenced on seven-day intervals for pumping down followed by refilling the next week.

Each batch digester has an about 400 gpm circulating pump that sucks the sludge from the bottom at one end of the digester. The pumped sludge goes through the digester box heat exchanger and is returned to the opposite end of the digester. In preferred embodiments, the operating temperature of the digester is maintained, solid buildup on the bottom of the digester is reduced, and the fresh slurry is mixed with the bacteria rich seed slurry upon refilling. Circulation is preferably maintained so that these regime is maintained.

The gas space of the five batch digesters is tied to a header that feeds the biogas compressor and the seal pot/flare. The seal pot maintains the common digester operating pressure and passes any excess biogas production to the flare for burning. The amount of excess biogas is expected to be minimal. The compressed biogas is stored for later use as fuel for the fertilizer plant rotary dryer.

In some embodiments, a paddle mixer combines brine from the ice fields, pulp from the centrifuge, and material from a recycle bin. Once mixed, the material goes to an Infeed Device that meters the flow into the rotary dryer, which is a 7-foot diameter by 42-foot long dryer. The first twelve-foot of the dryer is designed to granulate the material. The rotary dryer has a 10 mm BTU burner that is fueled by biogas from the digestors. At the outlet of the dryer, the solids and hot exhaust gases are separated. The exhaust gases go through a cyclone to reclaim product-fines, an acid scrubber to reduce odor & reclaim the heat, and the exhaust stack. The cyclone fines are fed back to the recycle bin. The solids exiting the dryer flow through a fluidized cooling hood and to the product classification equipment. The sized product is conveyed to product storage.

The oversize material is crushed and sent to the recycle bin. The undersize material goes to the recycle bin. The fluidized cooling hood exhaust air goes through a baghouse to collect product-fines and then is vented to the atmosphere. The baghouse fines are fed back to the recycle bin.

Another feature of the present inventive work comprises a new fertilizer, which is herein referred to as "black product", and process for its manufacture. Embodiments of this black product manufacturing comprise controlled temperature incineration. Sources for this manufacturing process include organic wastes such as livestock waste and municipal waste biosolids. Embodiments of the black product according to this invention have negligible odor and higher nutrient analysis with respect to other fertilizers that are obtained from organic waste by other processes. Embodiments of the black product according to this invention have a reduced or even negligible pathogen content.

Embodiments of the black product manufacturing process according to this invention use granular solids 460 that are herein referred to as "brown product" from an organic waste treatment process 450 that generates wet solids 452 and the subsequent agglomeration and drying of the wet solids. The term "granular" as used herein includes related terms, such as "pelletized", that refer to analogous structural characteristics. Embodiments of this process are schematically represented in FIG. 12. As disclosed hereinabove, a scrubber system 456 controls the chemical and/or physical characteristics of the products discharged with exhaust 458 upon agglomeration and drying of the wet solids.

The brown product is incinerated in a temperature-controlled incineration system 462. The term "incineration" is herein considered equivalent with terms such as "charring" and "calcination". Flame quenching and cooling of the incinerated product lead to the obtention of black product 464. Heat Δ is provided at various stages of this process, such as at stages 454 and 462. In some embodiments, this heat is generated by the combustion of biogas that is obtained according to this invention as described herein. Heat is generated from other fuels in other embodiments. Heat generated at stage 462 can be used in stage 454. In some embodiments of this invention this heat is generated at about 4000 Btu/lb for digested waste and it is used in the agglomeration and/or drying of the wet solids to form brown product.

Use of temperature-controlled incineration prevents the decomposition of inorganic compounds. Ignition temperature in some embodiments of this invention is about 330° F., and the maximum operating temperature in some embodiments of this invention is about 500° F. Brown product 460 in some embodiments is supplied for temperature-controlled incineration at a temperature of about 200° F.

Examples of embodiments of brown product include final product 128 (FIG. 1); granular NPK fertilizer 227 (FIG. 2); fertilizer 324 (FIG. 3); solid obtained from dryer/pelletizer as indicated in FIGS. 4–6; product 1536 (FIG. 10G); granulated fertilizer (FIG. 9); and product 49 (FIG. 11C) processed to a fertilizer as described in any one of the foregoing examples concerning the drying and/or granulating of a moist fertilizer base. Examples of embodiments of brown product that employed in the manufacture of black product according to this invention have a 10-10-10 NPK analysis. It is understood that the NPK analysis is given herein in approximate terms even though the term "about" is not used in this regard to avoid an awkward and longer expression. Furthermore, an NPK analysis such as 10-10-10 is an illustrative example, but not a limiting composition. Brown product NPK analysis figures in embodiments of this invention include compositions of at least 5 for at least one of each of the N, P and K constituents measured as described hereinabove.

Mass reduction upon temperature controlled incineration leads to an increase in NPK analysis. For example, 10-10-10 NPK brown product was converted according to this invention into black product with a 12.5-12.5-12.5 NPK analysis. In other embodiments, 10-10-10 NPK brown product was converted according to this invention into black product with a 14.5-14.5-14.5 NPK analysis. Still in other embodiments, the conversion was to NPK analysis in which at least one of the set of three analysis figures was in the range from about 12 to about 15. This NPK analysis increase permits the application of a greater amount of nutrients while using proportionally lees energy in the handling and transportation of the fertilizer.

Examples of embodiments of wet solids 452 include solid 123 (FIG. 1); filter cakes 211 (FIG. 2) and 315 (FIG. 3); product from press 420 (FIG. 4) that is directed to a dryer/pelletizer system; product from press 520 (FIG. 5) that is directed to a dryer/pelletizer system; product from press 620 (FIG. 6) that is directed to a dryer/pelletizer system; solid from press (FIG. 9); wet cake 1428 (FIG. 10F); product from centrifuge 1524 that is directed to system 1534 (FIG. 10G); and product 49 (FIG. 11C).

Temperature-controlled incineration according to this invention is performed in a preferably counter-current air flow kiln, such as the kiln schematically illustrated at 480 in FIG. 13. This device is preferably rotary, generally shaped like a drum, and it is configured in some embodiments so that the kiln is sloping from the feed end 486 downwards towards the discharge end 492. FIG. 13 schematically shows a cross-sectional view of an embodiment of such kiln in a generally horizontal configuration according to this invention. As already indicated, the generally horizontal configuration is not a limitation but merely an example, and other embodiments of the kiln according to this invention are slanted.

Brown product is fed, preferably at a temperature of about 200° F., at one end of the kiln, and the feed outlet is schematically illustrated in FIG. 13 at 485. Mass of brown or black product when such product does not contain an amount of moisture greater than the moisture that would be absorbed from the surrounding atmosphere under exposed conditions is referred to as "dry mass".

A burner, such as a biogas burner as illustrated at 488, injects hot combustion gases from the discharge end 492 of the kiln. These hot combustion products are preferably flameless combustion products. The brown product that is fed to the kiln is exposed to an ignition temperature of about 330° F. Sufficient residence time is allowed in the kiln so that the organic components in the brown product are burned.

The kiln comprises a plurality of chambers, such as chambers 482, that control the residence time of the feed and the incineration process. These chambers are formed in some embodiments by separators, and it has been found that separators shaped in a manner such that they provide openings of increasingly larger diameter as arranged from the feed end 486 to the discharge end 492, as shown schematically in FIG. 13, permit the control of the incineration extent and also the quenching of the flame near the discharge outlet.

The controlled incineration process and the quenching of the flame in the manufacturing method according to this invention are illustrated in FIG. 13 by tear shape features 481. These features illustrate features of the process such as the more intense combustion in the central region of the kiln and the flame quenching as the solid product 484 approaches the discharge end 492 and is eventually discharged through a discharge outlet as illustrated in FIG. 13 at 490. The region of the kiln near end 486 provides heating, the region near end 492 is the region where smoldering takes place because the combustible constituents at the controlled temperature have substantially been incinerated, and the region between the heating region and the smoldering region is where incineration takes place to various extents.

Once discharged, the black product is directed to a cooler. It is understood that any conventional cooler for solid products can be used for this purpose. Hot gases obtained at 470 are preferably recycled and utilized in other energy consuming operations in embodiments of organic waste treatment processes according to this invention, such as for drying wet solids. The overall heat required for the two-stage heat treatment is less than what is required for a single stage treatment. The heat value of anaerobically digested swine manure is about 4000 Btu/lb, where the mass unit refers to dry product.

As indicated herein, the manufacturing process of this invention can be used on a plurality of organic waste materials. The mass reduction that is obtained upon the temperature controlled incineration according to this invention varies depending on the organic waste. For example, a mass reduction in the range from about 20% to about 30% is obtained upon incineration of brown product that was obtained from swine manure, and the reduction increases to up to about 70% when the brown product was obtained from cattle manure and/or undigested waste products. The nutrient analysis of the black product is increased as the volatile solids in the feed product, such as the brown product, are reduced upon the temperature controlled incineration. To accomplish this effective increase, the incineration temperature is preferably maintained below the lowest temperature of decomposition of the inorganic compounds in the fertilizer, and inorganic compounds that would easily volatilize have been stabilized previously in the manufacturing process, as disclosed in examples disclosed herein. The maximum product temperature in the temperature controlled incineration is preferably below the ammonium sulfate decomposition temperature, preferably below about 540° F.

Conventional processes that include incineration comprise steps of incineration, grinding of the incinerated product to powder, re-wetting of the powder, pelletizing/agglomerating the re-wetted powder to form pelletized product, and re-drying of the pelletized product. In contrast, embodiments of the present invention comprise incinerating pelletized product at a controlled temperature, preferably in the range from about 290° F. to about 450° F., more preferably in the range form about 300° F. to about 400° F., and most preferably in the range from about 320° F. to about 350° F., and generally at a temperature that permits the substantial destruction of the pathogen content to render the product pathogen-free and below the ammonium sulfate decomposition temperature, preferably below about 540° F.

The black product manufacturing process is implemented in some embodiments according to this invention with agglomerated or "as dried" feeds. In its conversion to black product, the brown product that is fed as pellets remains in the bulk in pelletized form. Although there is a mass reduction of the black product in its conversion to the black product, it was observed that there was little change in particle size in the temperature controlled incineration as illustrated by the sieve analysis that was performed with some embodiments of this invention:

TABLE 3

| Size fraction/mm | Brown product [1] | Black product [2] |
|---|---|---|
| +4 mm (oversize recycle) | 11.9 | 12.5 |
| −4 to +2 mm (granular product) | 56.6 | 53.0 |
| −2 to 1 mm (turf product) | 24.1 | 26.6 |
| −1 mm (fines recycle) | 7.4 | 7.9 |

[1] As approximate percentage retained on the sieve. For example, the term "11.9" stands for "about 11.9% of brown product oversize recycle retained on the sieve". The same terminology applies to the remaining figures in this column.
[2] As approximate percentage retained on the sieve. For example, the term "12.5" stands for "about 12.5% of black product oversize recycle retained on the sieve". The same terminology applies to the remaining figures in this column.

Particle size retention is a desirable feature in applications such as those that use devices that are already configured for a particulate material, such as brown product, of a given size. It is understood that while black product in pellet form is preferred, black product can be formed in other forms for specialized applications, such as in powder form by grinding, and in other states of aggregation by processing according to techniques known in the art. Furthermore, black product is distributed in some embodiments in standardized form as described herein regarding the standardization with respect to constituents such as nutrients and micronutrients.

Abrasion resistance (friability) of the black product was proven to satisfy high standards. Abrasion resistance was measured by a test accepted in the art (Screen Method 1; see H. Rieschel, K. Zech, Comparison of various test methods for the quality control of potash granulate, *Phosphorus & Potassium* (September–October 1981), which is incorporated herein by reference). The brown product friability was about 0.6%, and the friability of the black product was about 0.8%. As determined by this method, friability results of less than about 5% are considered to be excellent. Embodiments of black product according to this invention had friability of less than about 5%, other embodiments had friability of less than about 2%, and still other embodiments had friability of less than about 1%. The high abrasion resistance of the black product obtained according to this invention, and its proficiency size screening show that embodiments of the black product contain negligible dust, as observed in the handling and storage of such product. Friability and screen analysis results such as those exhibited by embodiments of the black product according to this invention are referred to herein with the terms "dust-free".

Volatile constituents in most conventional fertilizers render them acrid, particularly after they have ben stored in a closed environment and/or exposed to a warm environment. Constituents that lead to the odor that characterizes conventional fertilizers include sulphides, ammonia, volatile fatty acids, and phenols.

It was observed that embodiments of the black product according to the present invention are substantially odor-free. The manufacture of the black product according to this invention comprises operations that include at least one of temperature controlled incineration, organic waste treatment, and air emission treatment to capture, convert and stabilize inorganic odorants, such as hydrogen sulfide and ammonia. Captured compounds add value to the fertilizer in some embodiments of this invention. Temperature controlled incineration removes from the solid product offending organic compounds.

Although no industry-wide test of odor has been adopted, major retailers of fertilizer products have developed in-house tests designed to test the odor potential. One of the more often employed test is the "trunk test". This test simulates the transport of a bag of fertilizer in a car trunk on a hot summer day. After several hours of closed heating, the test bag is opened to determine if there are objectionable odors. Most conventional organic fertilizers fail this test. Embodiments of the black product according to this invention passed this test and produced little or no detectable odor. This characteristic is referred to herein as "odor-free".

Pathogen destruction was analyzed at a number of temperatures. Stored 10-10-10 product, originally dried at about 200° F. had about 12000 cfu/g (coliform units per gram); stored product dried at about 250° F. had about 2100 cfu; and stored product incinerated at 330° F. had no detectable pathogen content. The characteristic of having no detectable pathogens as expressed in cfu/g units is referred to herein as being "pathogen-free". Drying temperatures in conventional organic sludge processing are generally confined in the low temperature range from about 180° F. to about 210° F., mainly due to safety concerns related to uncontrolled ignition. As the illustrative tests reported herein show, low temperature drying does not completely destroy pathogens in the fertilizer.

An increasing concern about fertilizers conventionally obtained from organic waste is that the pathogen content may be too high in the final product. One of the features of this invention is that the black product is pathogen free, except for the ordinary contamination due to the handling of the product in an open environment. Pathogen content due to the source of the organic waste and its processing is reduced to a negligible amount, or even eliminated, by the temperature controlled incineration. Biosolids that are generated in municipal waste, are therefore treated and converted to pathogen free black product according to the present invention. Organic waste that can be used in the manufacture of black product according to the present invention includes at least one of hog manure, cattle manure, turkey manure, poultry manure, municipal biosolids, llama manure, ostrich manure, and combinations thereof.

The fertilizer obtained according to embodiments of the temperature controlled incineration of this invention does not comprise significant amounts, or is even free from, materials that would decompose or ignite at a temperature below approximately the incineration temperature. This characteristic is referred to as being devoid of such materials. Some of these materials could under certain circumstances pose combustion problems once distributed in the market and/or could be used as a source of deflagrating and/or explosive materials.

In examples in which the brown product NPK analysis was 10.3-8.8-8.0, NPK analysis for brown product in which the production had been increased by about 20% by addition of lagoon sludge was 8.9-9.8-8.2, and it was 8.0-10.3-8.3 for brown product in which the production had been increased by about 50% by addition of lagoon sludge. In examples in which the black product NPK analysis was 12.9-11.0-10.0, NPK analysis for black product in which the production had been increased by about 20% by addition of lagoon sludge was 11.1-12.3-10.3, and it was 10.0-12.9-10.4 for black product in which the production had been increased by about 50% by addition of lagoon sludge.

The schematic and exemplary block diagrams shown in the accompanying figures illustrate some of the important characteristics of this invention. These characteristics include: (1) the reduction, or elimination, of acrid gas and greenhouse gas release, (2) the conversion of organic waste into effluents with reduced or no polluting levels of COD and BOD, (3) the availability of effluent for irrigation or wetland projects at the sites where the farms and the processing plant are located, (4) the reduction of lagoon size by diminishing lagoon load or even the elimination of the use of lagoons, (5) the recovery of methane-rich biogas that can be used for thermal and electrical energy generation and for synthetic and catalytic processes, (6) the beneficial and useful processing of organic and industrial residues, such as organic waste and fly ash, and mining products such as clays, (7) the demand for naturally occurring or low cost processing materials, such as zeolites, brine and lime, (8) the production of an organic based fertilizer whose composition and size are standardized, that is readily available to plants by slow release and that can be supplemented to contain the micronutrients that plants need for survival and growth, (9) the treatment of organic waste with no requirements of selective ion exchange columns, ion exchange resin regeneration, or ion exchange resins, and (10) the treatment of integral organic waste that does not rely on the primary lagoon treatment, namely, this invention does not require the separation of the waste into a plurality of solutions with merely a few chemical species each.

The schematic diagrams shown in the foregoing figures are not meant to be mutually exclusive. On the contrary, process steps and/or features represented in these figures can be suitably combined to generate additional embodiments of the present invention. These additional combinations however, can be performed with the aid of the objectives and teachings herein contained and ordinary skills in the art; thus no other combinations are offered as additional explicit examples. Furthermore, redundancy has been avoided wherever possible by describing in detail only once any individual step that repeatedly appears in several exemplary embodiments. Consequently, a detailed description of any given process step in any exemplary embodiment is also descriptive of the same or an equivalent process step in any other exemplary embodiment herein considered or equivalents thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for treating organic waste, comprising:
   mixing organic waste with a phosphate precipitating agent to obtain a precipitated phosphate mixture;
   mixing said precipitated phosphate mixture with a base to obtain a slurry;
   off-line low shear mixing said slurry with at least a flocculant to produce a mixture, wherein said off-line low shear mixing requires a significantly reduced amount of said flocculant compared to a process that employs in-line addition of flocculant; and
   obtaining wet solids from said mixture.

2. A method as recited in claim 1, wherein said base comprises slaked lime.

3. A method as recited in claim 1, wherein said mixing with a base comprises recovering ammonia.

4. A method as recited in claim 3, further comprising scrubbing said ammonia with sulfuric acid.

5. A method as recited in claim 4, further comprising crystallizing the products of said scrubbing said ammonia with said sulfuric acid.

6. A method as recited in claim 1, wherein said organic waste comprises digested organic waste.

7. A method as recited in claim 1, wherein said organic waste comprises organic waste with total solids in the range from about 3% to about 10%.

8. A method as recited in claim 1, wherein said organic waste comprises IRS product.

9. A method as recited in claim 1, further comprising:
   obtaining IRS product; and
   digesting said IRS product to form said organic waste.

10. A method as recited in claim 1, further comprising:
    agglomerating and drying said wet solids to form a brown product; and
    forming a black product from said brown product by incinerating said brown product at a temperature that does not exceed about 540° F.

11. A method as recited in claim 10, wherein said forming a black product comprises heating, calcination, smoldering, and cooling.

12. A method as recited in claim 1, further comprising standardizing said wet solids.

13. A method as recited in claim 1, wherein said phosphate precipitating agent comprises at least one magnesium salt.

14. A method as recited in claim 1, wherein said mixing with a base is performed in a plurality of stages.

15. A method as recited in claim 1, wherein said obtaining wet solids from said mixture comprises centrifugating.

16. A method for treating organic waste, comprising:
    mixing organic waste having unseparated settleable and unsettleable material with a phosphate precipitating agent to obtain a precipitated phosphate mixture, wherein said unseparated settleable and unsettleable material is present in said organic waste in excess of what said material would be present in a supernatant solution obtained from a primary lagoon treatment of waste;
    mixing said precipitated phosphate mixture with a base to obtain a slurry, off-line low shear mixing said slurry with at least a flocculant to produce a mixture; and
    obtaining wet solids from said mixture.

17. A method as recited in claim 16, wherein said mixing with a base comprises recovering ammonia.

18. A method as recited in claim 17, further comprising scrubbing said ammonia with sulfuric acid.

19. A method as recited in claim 18, further comprising crystallizing the products of said scrubbing said ammonia with said sulfuric acid.

20. A method as recited in claim 16, wherein said organic waste comprises digested organic waste.

21. A method as recited in claim 16, wherein said organic waste comprises IRS product.

22. A method as recited in claim 16, wherein said organic waste comprises lagoon sludge.

23. A method as recited in claim 16, further comprising:
    obtaining IRS product; and
    digesting said IRS product to form said organic waste.

24. A method as recited in claim 16, further comprising:
    agglomerating and drying said wet solids to form a brown product; and
    forming a black product from said brown product by incinerating said brown product at a temperature that does not exceed about 540° F.

25. A method as recited in claim 16, further comprising standardizing said wet solids to form a standardized brown product.

26. A method as recited in claim 25, wherein said standardizing comprises mixing with at least one of nitrogen-based nutrient, potassium-based nutrient, phosphorous-based nutrient, calcium-based nutrient, magnesium-based nutrient, sulfur-based nutrient, and combinations thereof.

27. A method as recited in claim 25, wherein said standardizing comprises mixing with at least one of iron-based micronutrient, manganese-based micronutrient, copper-based micronutrient, zinc-based micronutrient, boron-based micronutrient, molybdenum-based micronutrient, and mixtures thereof.

28. A method as recited in claim 16, wherein said phosphate precipitating agent comprises at least one magnesium salt.

29. A method as recited in claim 16, wherein said mixing with a base is performed in a plurality of stages.

30. A method as recited in claim 16, wherein said obtaining wet solids from said mixture comprises centrifugating.

31. A method for treating organic waste, comprising:
    obtaining a concentrated organic waste having unseparated settleable and unsettleable material, wherein said unseparated settleable and unsettleable material is present in said concentrated organic waste in excess of what said material would be present in a supernatant solution obtained from a primary lagoon treatment of waste;
    mixing said concentrated organic waste with a phosphate precipitating agent to obtain a precipitated phosphate mixture;
    mixing said precipitated phosphate mixture with a base to obtain a slurry, mixing said slurry with at least a flocculant to produce a mixture; and
    obtaining wet solids from said mixture.

32. A method as recited in claim 31, wherein said mixing with at least a flocculant comprises in-line mixing.

33. A method as recited in claim 31, wherein said mixing with at least a flocculant comprises off-line mixing.

34. A method as recited in claim 31, wherein said obtaining concentrated organic waste comprises obtaining an IRS product.

35. A method as recited in claim 34, further comprising digesting said IRS product.

36. A method as recited in claim 31, wherein said obtaining concentrated organic waste comprises mixing organic waste with lagoon sludge.

37. A method as recited in claim 31, wherein said mixing with a base comprises recovering ammonia.

38. A method as recited in claim 37, further comprising scrubbing said ammonia with sulfuric acid.

39. A method as recited in claim 38, further comprising crystallizing the products of said scrubbing said ammonia with said sulfuric acid.

40. A method as recited in claim 31, further comprising:
agglomerating and drying said wet solids to form a brown product; and
forming a black product from said brown product by incinerating said brown product at a temperature that does not exceed about 540° F.

41. A method as recited in claim 40, further comprising standardizing said wet solids to form a standardized brown product.

42. A method as recited in claim 41, wherein said standardizing comprises mixing with at least one of nitrogen-based nutrient, potassium-based nutrient, phosphorous-based nutrient, calcium-based nutrient, magnesium-based nutrient, sulfur-based nutrient, and combinations thereof.

43. A method as recited in claim 41, wherein said standardizing comprises mixing with at least one of iron-based micronutrient, manganese-based micronutrient, copper-based micronutrient, zinc-based micronutrient, boron-based micronutrient, molybdenum-based micronutrient, and mixtures thereof.

44. A method as recited in claim 31, wherein said phosphate precipitating agent comprises at least one magnesium salt.

45. A method as recited in claim 31, wherein said mixing with a base is performed in a plurality of stages.

46. A method as recited in claim 31, wherein said obtaining wet solids from said mixture comprises centrifugating.

47. A method as recited in claim 31, further comprising forming dry pellets from said wet solids.

48. A method as recited in claim 47, further comprising incinerating said dry pellets at a temperature that does not exceed about 540° F.

49. A composition of matter obtained by carrying out the method of any of claims 1–13, 16, 22, 24, 26, 27, 31, 32, 40, 47 or 48.

* * * * *

UNITED STATES PATENT AND TRADEMARK OFFICE
CERTIFICATE OF CORRECTION

PATENT NO. : 6,682,578 B2
DATED : January 27, 2004
INVENTOR(S) : Larry P. Sower

It is certified that error appears in the above-identified patent and that said Letters Patent is hereby corrected as shown below:

Column 9,
Line 67, insert -- . -- after "problem"

Column 11,
Line 7, insert -- . -- after "itself"

Column 15,
Line 37, change "water oil" to -- water, oil --

Column 16,
Line 35, change "big" to -- large --
Line 63, delete "U"

Column 18,
Line 27, insert -- . -- after "itself"

Column 23,
Line 15, change "is" to -- are --

Column 27,
Line 29, insert -- . -- after "thereof"
Line 44, insert -- . -- after "thereof"

Column 33,
Line 1, insert -- . -- after "medium"

Column 34,
Line 19, insert -- . -- after "thereof"

Column 35,
Line 40, delete "_" after "extensively"

Column 36,
Line 9, insert -- , -- after "example"
Line 56, change "bag house" to -- baghouse --

Column 37,
Line 13, insert -- . -- after "thereof"
Line 65, delete "of" after "integral part"

UNITED STATES PATENT AND TRADEMARK OFFICE
CERTIFICATE OF CORRECTION

PATENT NO.     : 6,682,578 B2
DATED          : January 27, 2004
INVENTOR(S)    : Larry P. Sower It is certified that error appears in the above-identified patent and that said Letters Patent is hereby corrected as shown below:

Column 38,
Line 39, change "This" to -- These --
Line 44, change "densifier" to -- a densifier --

Column 39,
Line 34, change "such complex" to -- such a complex --

Column 43,
Line 52, change "a." to -- $\alpha$. --

Column 44,
Line 63, change "preferable" to -- preferably --

Column 45,
Line 64, insert -- a -- after "for"

Column 48,
Line 13, change "This type" to -- These types --
Lines 19, 21 and 28, change "this type" to -- these types --
Line 43, change "filed" to -- field --

Column 49,
Line 6, change "these regime" to -- this regime --
Line 20, change "twelve-foot" to -- twelve feet --

Column 56,
Line 26, insert space after "about" to read -- about 540° F. --

UNITED STATES PATENT AND TRADEMARK OFFICE
CERTIFICATE OF CORRECTION

PATENT NO. : 6,682,578 B2
DATED : January 27, 2004
INVENTOR(S) : Larry P. Sower

It is certified that error appears in the above-identified patent and that said Letters Patent is hereby corrected as shown below:

Column 57,
Line 21, insert space after "about" to read -- about 540° F. --

Column 58,
Line 21, insert space after "about" to read -- about 540°F. --

Signed and Sealed this

Sixth Day of July, 2004

JON W. DUDAS
*Acting Director of the United States Patent and Trademark Office*